(12) United States Patent
Jakka et al.

(10) Patent No.: US 11,521,273 B2
(45) Date of Patent: Dec. 6, 2022

(54) IDENTIFYING FLOOD DAMAGE TO AN INDOOR ENVIRONMENT USING A VIRTUAL REPRESENTATION

(71) Applicant: Yembo, Inc., San Diego, CA (US)

(72) Inventors: Anoop Jakka, San Diego, CA (US); Siddharth Mohan, San Diego, CA (US); Devin Waltman, San Diego, CA (US); Marc Eder, San Diego, CA (US); Maciej Halber, San Diego, CA (US); Zachary Rattner, San Diego, CA (US)

(73) Assignee: YEMBO, INC., San Diego, CA (US)

( * ) Notice: Subject to any disclaimer, the term of this patent is extended or adjusted under 35 U.S.C. 154(b) by 0 days.

(21) Appl. No.: 17/193,779

(22) Filed: Mar. 5, 2021

(65) Prior Publication Data

US 2021/0279852 A1 Sep. 9, 2021

Related U.S. Application Data

(60) Provisional application No. 62/986,061, filed on Mar. 6, 2020.

(51) Int. Cl.
*G06Q 40/08* (2012.01)
*G06F 16/29* (2019.01)
(Continued)

(52) U.S. Cl.
CPC ......... *G06Q 40/08* (2013.01); *G06F 3/04842* (2013.01); *G06F 16/29* (2019.01);
(Continued)

(58) Field of Classification Search
CPC . G06Q 40/08; G06T 7/80; G06T 7/50; H04N 5/232933; G06N 20/00; G06N 3/0445; G06F 16/29; G06F 3/04842; G06V 20/00
(Continued)

(56) References Cited

U.S. PATENT DOCUMENTS 9,978,033 B1 5/2018 Payne et al.
10,289,760 B1 5/2019 Oakes, III et al.
(Continued)

FOREIGN PATENT DOCUMENTS

KR 10-2019-0117354 A 10/2019
WO 2019-016685 A1 1/2019
WO 2019-191329 A1 10/2019

OTHER PUBLICATIONS

Patent Cooperation Treaty, International Search Report issued in PCT/IB2021/051878, Jun. 4, 2021, pp. 1-4.
(Continued)

*Primary Examiner* — Hai Tao Sun
(74) *Attorney, Agent, or Firm* — Pillsbury Winthrop Shaw Pittman LLP

(57) ABSTRACT

Disclosed is a method for using a virtual representation of an indoor environment to identify contents that have been damaged (e.g., by flooding). A virtual representation of a physical scene of an indoor environment is processed to identify a list of contents in the physical scene. The virtual representation may include 2-dimensional representations of the physical scene (e.g., images or video) or a 3-dimensional representation of the physical scene (e.g., 3D digital model). A reference line is determined in the virtual representation that is indicative of a maximum vertical extent of the damage in the physical scene. The position of the reference line is compared with the position of the identified contents in the virtual representation to determine contents that are likely to be damaged. For example, the contents that are at or below a plane represented by the reference line in the virtual representation may be identified as damaged.

30 Claims, 47 Drawing Sheets

(51) Int. Cl.

| | |
|---|---|
| G06N 20/00 | (2019.01) |
| G06T 17/00 | (2006.01) |
| G06Q 10/08 | (2012.01) |
| G06Q 10/06 | (2012.01) |
| G06Q 30/02 | (2012.01) |
| G06T 7/00 | (2017.01) |
| G06N 3/04 | (2006.01) |
| G06N 3/08 | (2006.01) |
| G06T 7/80 | (2017.01) |
| G06T 7/50 | (2017.01) |
| H04N 5/232 | (2006.01) |
| G06F 3/04842 | (2022.01) |
| G06T 7/20 | (2017.01) |
| G06T 17/20 | (2006.01) |
| G06V 20/00 | (2022.01) |
| G01S 17/06 | (2006.01) |
| G06Q 50/16 | (2012.01) |
| G06K 9/62 | (2022.01) |
| G01S 19/42 | (2010.01) |

(52) U.S. Cl.
CPC ............. *G06N 3/0445* (2013.01); *G06N 3/08* (2013.01); *G06N 20/00* (2019.01); *G06Q 10/06395* (2013.01); *G06Q 10/0875* (2013.01); *G06Q 30/0205* (2013.01); *G06Q 30/0206* (2013.01); *G06T 7/0002* (2013.01); *G06T 7/20* (2013.01); *G06T 7/50* (2017.01); *G06T 7/80* (2017.01); *G06T 17/00* (2013.01); *G06T 17/20* (2013.01); *G06V 20/00* (2022.01); *H04N 5/232933* (2018.08); *G01S 17/06* (2013.01); *G01S 19/42* (2013.01); *G06K 9/6267* (2013.01); *G06Q 50/16* (2013.01); *G06T 2207/20081* (2013.01)

(58) Field of Classification Search
USPC ........................................................ 345/419
See application file for complete search history.

(56) References Cited

U.S. PATENT DOCUMENTS

| | | |
|---|---|---|
| 10,515,486 B1 | 12/2019 | Chavez et al. |
| 2010/0214284 A1 | 8/2010 | Rieffel et al. |
| 2015/0073834 A1* | 3/2015 | Gurenko ................ G06Q 10/10 |
| | | 705/4 |
| 2015/0294499 A1 | 10/2015 | Wagner et al. |
| 2017/0221152 A1* | 8/2017 | Nelson ................... G06Q 50/16 |
| 2018/0069932 A1 | 3/2018 | Tiwari et al. |
| 2019/0114717 A1 | 4/2019 | Labrie et al. |
| 2019/0147220 A1* | 5/2019 | McCormac ........ G06K 9/00208 |
| | | 382/103 |
| 2019/0188797 A1 | 6/2019 | Przechocki et al. |
| 2019/0220793 A1 | 7/2019 | Saarenvirta |
| 2019/0236732 A1 | 8/2019 | Speasl et al. |
| 2019/0295011 A1 | 9/2019 | Shi et al. |
| 2020/0151963 A1* | 5/2020 | Lee ........................ G06T 15/04 |

OTHER PUBLICATIONS

Patent Cooperation Treaty, International Search Report issued in PCT/IB2021/051875, Jun. 10, 2021, pp. 1-3.
Patent Cooperation Treaty, International Search Report issued in PCT/IB2021/051869, Jun. 9, 2021, pp. 1-4.

\* cited by examiner

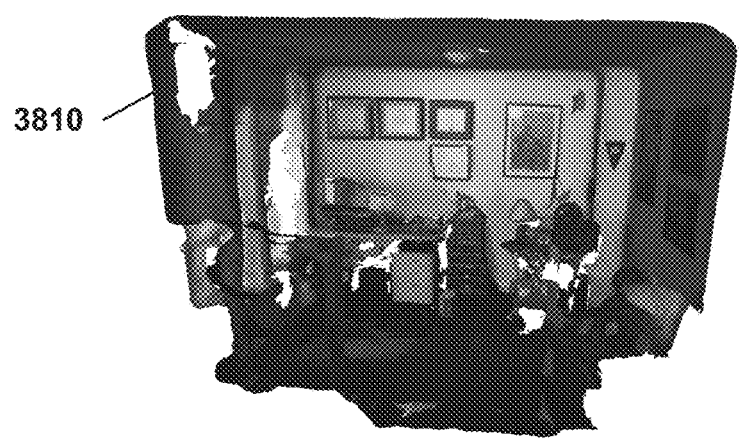
FIG. 38

IDENTIFYING FLOOD DAMAGE TO AN INDOOR ENVIRONMENT USING A VIRTUAL REPRESENTATION

CROSS-REFERENCE TO RELATED APPLICATIONS

The present application claims priority to U.S. Provisional Patent Application No. 62/986,061 filed on Mar. 6, 2020 entitled "Systems And Methods For Providing AI-Based Estimates", the contents of which are incorporated by reference in their entirety.

FIELD OF THE DISCLOSURE

This disclosure relates to systems and methods for providing artificial intelligence (AI)-based estimates.

BACKGROUND

A typical process for insurance claims adjustment may often begin with an insured individual contacting their insurance carrier with a description of damage due to a covered occurrence. A representative of the insurance carrier takes note of the described damage and sends a contracted repair person and often a claims adjuster to estimate the cost of the damage and perform any necessary repairs. The insured individual will typically provide some evidence of the type, scope, and extent of the damage through images and video during the initial contact. Corroboration is requested from the contracted repair person or performed by the adjuster, also taking the form of images and video. This in-person corroboration often comprises identification of damaged contents and structures, measurements of damaged areas, and the computation of repair and replacements costs. Once the necessary repair work is completed, the insurance company will cover the costs to the insured.

Because of the heavy reliance on in-person visits to the insured's location to evaluate the damage, the current process to identify damages does not scale well. In certain circumstances, like catastrophic hurricanes and floods, there may be a surge of insurance claims filed in a short period of time. This overload can result in a backlog that delays the repair or replacement of many insured individuals' properties, often escalating the impact of the catastrophic event. These and other drawbacks exist.

SUMMARY

Some aspects of the present disclosure relate to a method for identifying damage in an indoor environment by analyzing a virtual model of the indoor environment. The method comprises obtaining a virtual representation of a physical scene in an indoor environment; extracting data items from the virtual representation, wherein the data items correspond to contents in the physical scene; determining a reference line in the virtual representation indicative of a vertical extent of the damage in the physical scene; and determining content damage information based on the reference line, and indicative of the contents damaged in the physical scene.

Such a method may be used for evaluating flood insurance claims utilizing a machine learning model, for example, and/or other uses. In some embodiments, one or more hardware processors may be configured by machine-readable instructions to receive description data of a location. The description data may be generated via at least one of a camera, a user interface, or an environment sensor. The one or more hardware processors may be configured to, utilizing the machine learning model, generate an inventory list comprising a plurality of items in or around the location based on the description data. The inventory list may further comprise inventory attributes associated with the plurality of items related to positions of the plurality of items in the location. The one or more hardware processors may be configured to, utilizing the machine learning model, determine, based on the description data, a flood line level for a flood previously present at the location. The one or more hardware processors may be configured to, utilizing the machine learning model, project a virtual flood plane in or around the location based on the flood line level. The one or more hardware processors may be configured to, utilizing the machine learning model, determine, based on the positions of the items in the location and the flood line level, which individual items in the inventory list were likely to sustain flood damage, wherein determining which individual items in the inventory list were likely to sustain flood damage comprises comparing the positions of the plurality of items in the location to the virtual flood plane projection.

Other aspects of the present disclosure relate to systems and methods for providing insurance underwriting estimates utilizing a machine learning model. One or more hardware processors may be configured by machine-readable instructions such that description data of a location may be received. The description data may be generated via at least one of a camera, a user interface, an environment sensor, and an external location information database. An inventory list comprising a plurality of items in or around the location may be generated utilizing the machine learning model, based on the description data. The inventory list may further comprise inventory attributes associated with the plurality of items related to a context of the plurality of items in the location. Interior or exterior condition information may be determined, utilizing the machine learning model, based on the description data, for the location. The interior or exterior condition information may describe a quality of structural components of the location or hazards in or around the location. One or more insurance underwriting estimates may be generated, utilizing the machine learning model, based on the inventory list and the interior or exterior condition information, for insuring the location.

Other aspects of the present disclosure relate to systems and methods for estimating dimensions of items in or around a location utilizing a machine learning model. One or more hardware processors may be configured by machine-readable instructions to receive description data of a location. The description data may be generated via at least one of a camera, a user interface, an environment sensor, or an external location information database. The one or more hardware processors may be configured to generate, utilizing the machine learning model, an inventory list comprising a plurality of items in or around the location based on the description data. The one or more hardware processors may be configured to receive one or more dimensions for a reference item. The reference item may be included in the plurality of items in the inventory list. The one or more hardware processors may be configured to determine, utilizing the machine learning model, based on the one or more dimensions of the reference item, dimensions and relative positions of other items in the plurality of items.

Other aspects of the present disclosure relate to systems and methods for processing insurance claims utilizing a machine learning model. One or more hardware processors may be configured by machine-readable instructions to receive description data of a location. The description data may be generated via at least one of a camera, a user interface, an environment sensor, and an external location information database. The one or more hardware processors may be configured to generate an inventory list comprising a plurality of items in or around the location, utilizing the machine learning model, based on the description data. The inventory list may further comprise inventory attributes associated with the plurality of items related to a context of the plurality of items in the location. The one or more hardware processors may be configured to determine, utilizing the machine learning model, based on the description data, interior or exterior condition information for the location. The interior or exterior condition information may describe a quality of structural components of the location or hazards in or around the location. The one or more hardware processors may be configured to receive a request for an insurance payment related to one or more items of the plurality of items in the inventory list or related to the location. The one or more hardware processors may be configured to process, utilizing the machine learning model, based on the inventory list, the interior or exterior condition information, and the request for the insurance payment, payment for one or more items of the plurality of items in the inventory list or the location.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 38 illustrates an example of a 3D digital model of an indoor environment as viewed in three different ways, in accordance with one or more embodiments.

DETAILED DESCRIPTION

Figure 1:
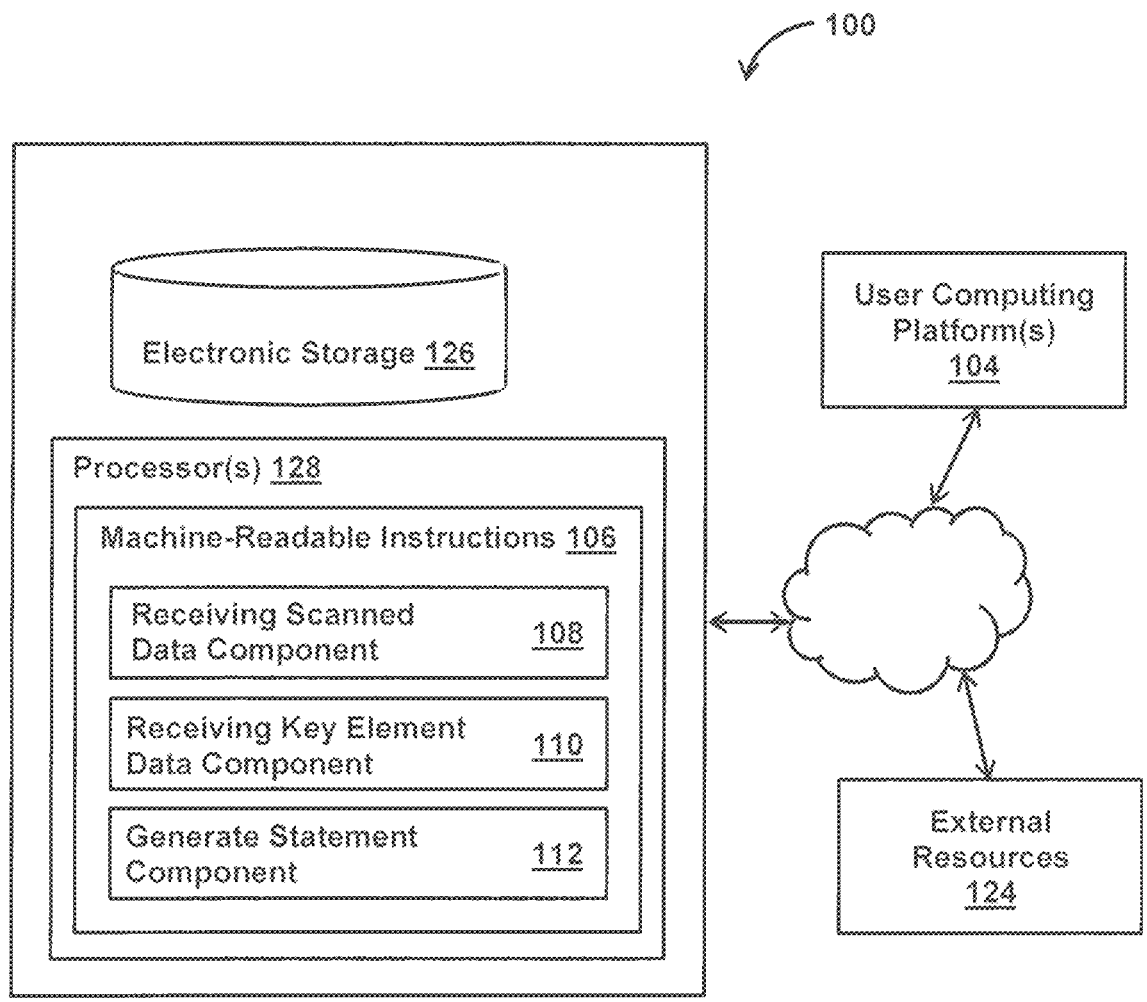
FIG. 1 illustrates a system for providing artificial intelligence (AI)-based cost estimates for services, in accordance with one or more implementations.

A typical process for insurance claims adjustment today often begins with an insured individual contacting their insurance carrier with a description of damage due to a covered occurrence. A representative of the insurance carrier takes note of the described damage and sends a contracted repair person and often a claims adjuster to estimate the cost of the damage and perform any necessary repairs. The insured individual will typically provide some evidence of the type, scope, and extent of the damage through images and video during the initial contact. Corroboration is requested from the contracted repair person or performed by the adjuster, also taking the form of images and video. This in-person corroboration often comprises identification of damaged contents and structures, measurements of damaged areas, and the computation of repair and replacements costs. Once the necessary repair work is completed, the insurance company will cover the costs to the insured.

Because of the heavy reliance on in-person visits to the insured's location to evaluate the damage, the current process to identify damages does not scale well. In certain circumstances, like catastrophic hurricanes and floods, there may be a surge of insurance claims filed in a short period of time. This overload can result in a backlog that delays the repair or replacement of many insured individuals' properties, often escalating the impact of the catastrophic event.

In order to provide a more scalable solution to claims adjustment in these circumstances, a method is provided for using a virtual representation of an indoor environment to identify the contents and structures that have been damaged by water. This method may be used for claims adjustment after catastrophic events, such as those described above, as well as other sources of indoor flood damage, like burst pipes, faulty appliances, and sprinkler system deployment, among others.

Some implementations according to the present technology provide a novel way of providing upfront, accurate cost/price estimates by using a deep learning/natural language processing (e.g., artificial intelligence (AI)) powered system or other machine learning models. The present technology may make home services price estimates into a more interactive experience. Some aspects of the present disclosure relate to systems and methods for providing insurance underwriting estimates utilizing a machine learning model. One or more hardware processors may be configured by machine-readable instructions such that description data of a location may be received. The description data may be generated via at least one of a camera, a user interface, an environment sensor, or an external location information database. An inventory list comprising a plurality of items in or around the location may be generated utilizing the machine learning model, based on the description data. The inventory list may further comprise inventory attributes associated with the plurality of items related to a context of the plurality of items in the location. Interior or exterior condition information may be determined, utilizing the machine learning model, based on the description data, for the location. The interior or exterior condition information may describe a quality of structural components of the location or hazards in or around the location. One or more insurance underwriting estimates may be generated, utilizing the machine learning model, based on the inventory list and the interior or exterior condition information, for insuring the location.

Some implementations according to the present technology may provide offers or services unrelated to the home services but related to the consumer. The interactive experience may also prompt the consumer to provide input that will improve the estimate, and services and products.

Some implementations, according to the present technology, may provide the ability to perform targeted actions based on items discovered by AI. One example may relate to moving. If, for example, a bed is discovered, a specific targeted action may be asking the consumer if disassembly is needed. A suggestion to provide upselling services (e.g., packing etc.) if a kitchen cabinet is detected with the actual cost being quoted. As another example, for insurance coverage purposes, the AI may ask the consumer for a make, model, date of purchase, etc., for one or more detected items.

Some implementations according to the present technology may include the ability to ask targeted questions automatically based on images or other data received by the system. Consider moving as an example. The system may ask if a wall unit is bolted to the ground once detected and use the consumer's answer to update a quote. As another example, for insurance coverage purposes, the system may ask what level of insurance a consumer wants (e.g., present value, replacement cost, etc.).

In some implementations, the ability for consumers to correct or update quotes may be provided. For example, if a bed was incorrectly detected as a sofa, consumers may interactively change the item name, and have it reflected in the cost. If the AI detects an item that the consumer wants to exclude from the quote (maybe they plan on moving it themselves), they may remove the item, and the quote may update in real-time or near real-time. Similar adjustments may be made for insurance quotes for example.

In general, analysis from AI may be used to predict the cost of a service (e.g., detecting number of items (e.g., objects), size and weight of items (objects), a location of items (objects, a home itself), brand of items, etc., and translating this into cost. Home service providers may further augment information sent by consumers to update a quote. The ability to automatically send targeted pictures from data sent by consumers as part of the quote, either in a web form or in a pdf, may be provided. This feature may be referred to as "visual quote." The ability to sell affiliate services (e.g., home insurance etc.) based on the inventory of items detected may be provided in some implementations. The inventory of items may include information in addition to a list of objects. The inventory of items may include information related to a type of media used to record or input an item/object into the system (e.g., images, video, voice recording, etc.), attributes of a given item/object (e.g., as described herein), a location of the given item/object, whether the given item/object belongs to a set of related items/objects, or other information.

FIG. 1 illustrates a system configured for facilitating AI-based cost estimates for services, in accordance with one or more implementations. In some implementations, system 100 may include one or more server 102. The server(s) 102 may be configured to communicate with one or more user computing platforms 104 according to a client/server architecture. The users may access system 100 via user computing platform(s) 104.

Digital media items may include one or more of digital photos, images, videos, audio, or other digital media items. Local digital media items may include digital media items stored locally at a given user computing platform 104. Connected digital media items may include digital media items stored remotely from a given user computing platform 104 such as at other user computing platforms 104, at other locations within system 100, or locations outside of system 100. Connected digital media items may be stored in the cloud.

The server(s) 102 or computing platform(s) 104 may be configured to execute machine-readable instructions 106. The machine-readable instructions 106 may include one or more of a receiving scanned data component 108, a receiving key element data component 110, a generate statement component 112, or other components. In some implementations, some or all of the components may be located in computing platform(s) 104. The AI work may be performed in one or more of the cloud, a mobile device, or other devices. The receiving scanned data component 108 may be configured to receive, at one or more hardware processors, data from a scan of a location, the scan performed by one or more of a camera, a computer vision device, an inertial measurement unit, a depth sensor, or other scanners. In some implementations, scanning includes data generated by video or image acquisition devices, voice recording devices, a user interface, or any combination thereof. The data may be generated responsive to a user request, or automatically by the system (e.g., without initiation by a user).

The receiving key element data component 110 may be configured to receive, at one or more hardware processors, data related to the identification of one or more key elements at the location. The generate statement component 112 may be configured to generate, at one or more processors, an itemized statement and quote of work to be performed. Various other components are contemplated. For example, a launch indication component may be configured to receive, at one or more hardware processors, an indication of a launch of an app or other messaging channel. As another example, one or more of components 108, 110, 112, etc. may include sub-components related to insurance (e.g., as described herein), or other applications of the present systems and methods.

In keeping with some implementations according to the present disclosure, estimating the cost for home painting may be a function of predicting the amount of material needed or the duration to complete the job. Generating cost estimates automatically through algorithms may be desirable since most painting companies currently require their employees to physically inspect the paint site before the job, which increases the cost of the painting service, or to reduce the time it takes for on-site estimators to provide the cost estimate.

To estimate the amount of material needed or the work duration, several factors may need to be considered, including the surface area of the components to paint, or other factors. Other factors may include one or more of surface type, surface texture, surface material, preparation work, blemishes, cleanup work, or other factors.

Surface type may include wall, baseboard, trim, ceiling, door, or other surface types. Paint type may be determined based on the surface type (e.g., high gloss white for trim, eggshell for walls, flat white for ceiling).

Surface texture or surface/material may include flat, textured, or other surface texture or surface/material. Surface texture or surface/material may determine how many coats of paint may be needed. Preparation work may include repairing blemishes such as old paint colors, ding/dents, scratches, marks, or other blemishes.

Other factors may include determining if primer, patching, sanding, caulking, or sealing may be needed. Other preparation work may include moving furniture, décor, or other items. Further preparation work may further include covering carpets, furniture, home wares, or other items. Still further preparation work may include removing, replacing, or covering electrical face plates or light switches. Other preparation work may include plant covering or protection. Other preparation work may include washing surfaces to be painted. Cleanup work may include disposing coverings, disposing leftover paint, or other cleanup work.

The present disclosure involves using computer vision, cameras, and optional depth sensors on the smartphone, or inertial measurement unit (IMU) data (e.g., data collected from an accelerometer, a gyroscope, a magnetometer, or other sensors) in addition to text data: questions asked by a human agent or an AI algorithm based on sent images, videos, and previous answers, as well as answers by the consumer on a mobile device (e.g., smartphone, tablet, or other mobile device) to come up with an estimate of how much it will cost to perform a moving job, a paint job, or other services. These examples are not intended to be limiting.

In some implementations, a workflow may include a user launching an app or another messaging channel (SMS, MMS, Facebook Messenger, web browser, etc.) and scanning a location (e.g., a home or another location) where camera(s) data or sensor(s) data may be collected. The app may use the camera or IMU, and optionally a depth sensor, to collect and fuse data to detect surfaces to be painted, objects to be moved, etc. and estimate their surface area data, or move related data, in addition to answers to specific questions. An AI algorithm (or neural network etc.) specifically trained to identify key elements may be used (e.g., walls, ceiling, floor, furniture, wall hangings, appliances, or other objects). Other relevant characteristics may be detected including identification of light switches/electrical outlets that would need to be covered or replaced, furniture that would need to be moved, carpet/flooring that would need to be covered, or other relevant characteristics.

For an example related to painting, the user may optionally enter what brands of paint may be preferred for each area. Areas may include walls, trim, ceilings, baseboards, doors, or other areas. The messaging channel may sell leads to paint suppliers to promote their products in relevant spaces. This may be optionally implemented as an automated advertising network where the bidding process may be started by an algorithm determining a category of product that would be useful to the consumer (e.g., high gloss trim paint), then auctioning off ad real estate to the highest bidder in the category (e.g., suggesting Dunn Edwards versus Sherwin Williams, for example).

In some implementations, a consumer app working along with a backend infrastructure may generate an itemized statement of work. For example, for one or more rooms, the system may give an estimated square footage for walls, trim, ceiling, baseboard, door, or other items (e.g., for a painting example); the system may give an estimated move time or move difficulty (e.g., for a moving related example), and or other information.

In some implementations, an AI algorithm may ask targeted questions based on images/videos sent by the user to perform further analysis. An AI improvement engine may give a dollar amount estimate for various rooms or locations. Itemized lists may include paint costs based on square footage and number of coats, setup costs based on time or work involved, cleanup costs based on type of work requested (e.g., for a painting related example); moving costs based on a quantity of items, a size and/or shape of the items, an amount of disassembly/assembly required, an accessibility of a building or house (e.g., for a moving related example), or other items.

Examples of setup costs, e.g., for a painting related example, may include, but are not limited to: "Move sofa, coffee table, and love seat to center of room, cover with plastic" (could use furniture detector from moving AI component); identify if ladder may be needed based on wall height, or whether ceilings may be included in the work estimate; or "Replace two damaged electrical outlet covers, tape over remaining three electrical outlet covers."

In some implementations, users may review itemized quotes or make changes if desired (e.g., painting trim may be too expensive, so they may choose to remove that item; they may decide they are going to move particular items themselves, etc.). Quotes may update in real-time or near real-time. Once a quote looks acceptable, the user may book the painting or moving job (as just two examples) from the app. Users may manually select items that the estimation algorithm has not discovered (e.g., a wall the user wants painted that was missed by the technology, disassembly of any items that would help the moving process, or other items) or add corrections to any possible mistakes made by the algorithm (e.g., the wall detected also contains some surface area of the ceiling or floor, two refrigerators were detected when there is only one refrigerator in a house). Users may add and remove items from the itemized quote. Adding or removing items may be similar to adding or removing items in an online shopping cart.

In some implementations, the app along with the backend may analyze the light in the room, color or texture of other items in the room to suggest appropriate paint colors (e.g., in a painting related example); analyze a room shape or doorway size and recommend disassembly of various objects (e.g., in a moving related example); or perform other analysis. Quote information with relevant photos or videos extracted from the surveying process may be sent electronically to the painter's or the mover's (as just two examples) backend system for fulfillment.

In some implementations, estimating the cost for washing windows (e.g., as another practical example of an application for the present system) may be a function of how many, how large, or how accessible the windows are. This may be automated with algorithms.

In some implementations, parameters may be desired or required to give an accurate window washing quote, including size of windows, number of windows, washing areas (e.g., inside, outside, or both), quality or condition of windows, accessibility (e.g., floor the windows may be on), outside impediments (e.g., trees, shrubs, HVAC units, or other impediments), type of wash required (e.g., hand squeegee, power wash, or other types of wash), or other parameters. As a problem prevention measure, notifying the user before scheduling a power wash may be desirable if the windows are detected to fit poorly. The present disclosure allows these parameters to be determined algorithmically so an accurate window washing quote may be given through an app.

In some implementations, a workflow may include the following. A user may launch an app or another messaging channel (SMS, MMS, Facebook Messenger, web browser, etc.) and walks around one or more of a home, office, or another location. A computer vision/IMU technique may be used similar to the painting solution where the windows may be detected, and their square footage may be estimated by AI algorithm. An AI algorithm (or deep neural nets etc.) may be trained to identify common impediments such as bushes, trees, HVAC units, patio furniture, or other items. The user may enter whether the quote may be for internal, external, or both. This information may be inferred using an AI algorithm (or deep neural nets) based on an analysis of the video itself (e.g., if half the video was shot indoors and half was taken outdoors, perhaps the user wants both). The user may enter the floor/number of stories that are desired to be washed. In some implementations, this may be inferred from the AI algorithm, GPS altimeter data, or IMU data. An AI algorithm may cause targeted questions to be asked based on images or videos sent by the user to perform further analysis. A user may enter the type of wash required. In some implementations, this may be accompanied by suggestions from the AI algorithm (e.g., if a lot of dirt/grime were detected on the windows, the app may suggest a power wash would be better). The app may work with a backend infrastructure and may generate an itemized quote(s) with line items for factors including a time estimate(s) based on number of windows, accessibility issues that could add delay/time to the work, type of wash requested, washing inside/outside/both, or other factors. A user may review an itemized quote(s) or make changes if desired (e.g., adding inside may be too expensive, and changes should be made to the outside and not the inside). Once the quote looks good, the user may book the window washing job from the app. Quote information with relevant photos or videos may be extracted from the surveying process and be sent electronically to the window washer's backend system for fulfillment.

Estimating for junk removal (as yet another example of an application of the present system) may be largely a volume estimation problem. Currently, junk removal companies require the customer to estimate themselves what proportion of a truck they need to remove their junk. This process may not be accurate since most customers are not experts at volume estimation, and may be commonly mitigated by sending human surveyors. It may be desirable from both a consumer and business provider standpoint to provide an automated way to obtain an accurate junk removal quote. The present disclosure describes one such way of doing so using computer vision techniques, artificial intelligence algorithms, or inertial measurement unit (IMU) data.

In some implementations, a workflow may include a user launching an app or another messaging channel (SMS, MMS, Facebook Messenger, web browser, etc.), and scanning junk they would like to have removed. The app may collect camera frames and IMU data to estimate the dimensions and volume of the material to be removed in addition to answers to specific question. An AI algorithm (or deep neural network) trained for object identification may be used to estimate the dimensions and volume of the material to be removed, or identify what the material or item may be (e.g., chair, sofa, paint, or other materials/items). An AI algorithm may instead directly estimate the total volume of all the items the consumer wants to remove without detecting individual items. An AI algorithm may ask targeted questions based on images or videos sent by the user to perform further analysis. The app working with a backend infrastructure may generate an itemized quote of the junk to be removed, or may just generate the total volume or total cost. The cost associated with the junk removal may be calculated based on the volume of the junk, or estimated time required to disassemble the junk. In some implementations, an external cloud server may provide time estimates for how long it would take to disassemble various items. The cloud server may perform logistic regression or other machine learning techniques to estimate disassembly time based on category, size, volume, or other factors. The cloud server may identify a blacklist of hazardous materials, or any surcharge items (e.g., oil, batteries, fireworks, or other hazardous materials) and notify the customer that such items require special disposal techniques. If available, other relevant service companies able to perform the task may be recommended (e.g., the ad network approach, as described above may be used to suggest a service provider).

In keeping with some implementations of the workflow, the user may review the itemized quote and make necessary changes as desired. By way of non-limiting example, if the disassembly of the dining table adds too much to the cost, they may remove that line item and the price will update in real time. The AI Improvement engine allows the AI algorithm to learn from human corrections (user or another human reviewer). Once the quote looks good, the user may book the junk removal job from the app or other messaging channels. Quote information with relevant photos or videos may be extracted from the surveying process, and may be sent electronically to the junk remover's backend system for fulfillment.

Figure 2:
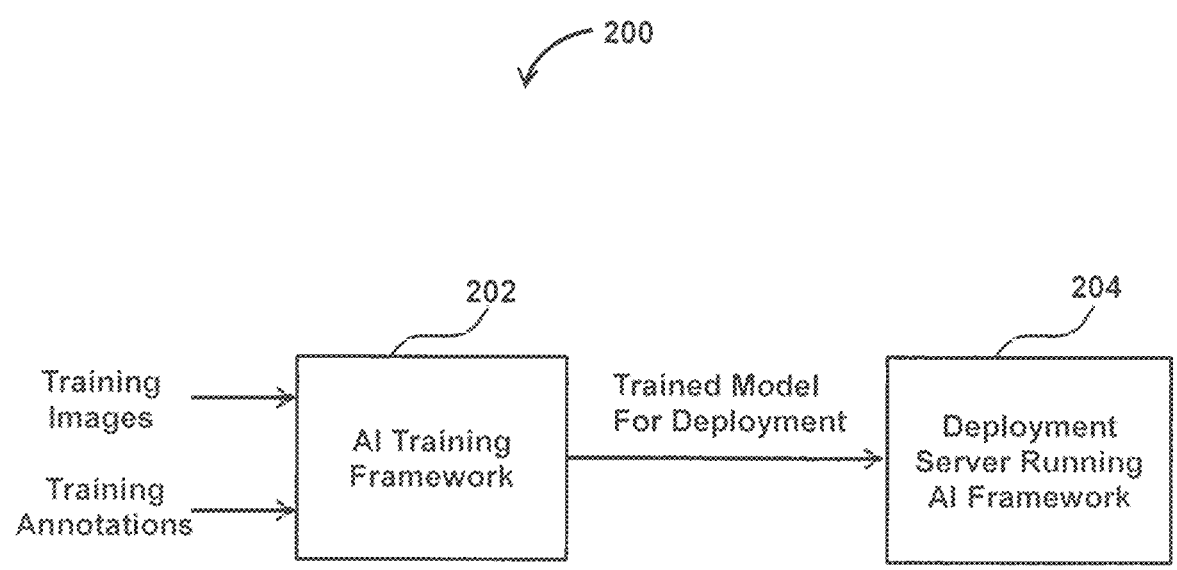
FIG. 2 illustrates an AI model that may be trained to recognize objects/surfaces, in accordance with one or more implementations.

FIG. 2 illustrates an artificial intelligence (AI) model 200 that may be trained to recognize objects, in accordance with one or more implementations. Multiple training images with objects that need to be detected may be presented to the artificial intelligence (AI) framework 202 for training. Training images may contain non-objects, such as walls, ceilings, carpets, floors, or other non-objects. Each of the training images may have annotations (e.g., locations of objects of desire in the image, coordinates, or other annotations) or pixel wise classification for objects, walls, floors, or other training images. Training being complete, the trained model may be sent to a deployment server 204 running an AI framework. It should be noted that training data is not limited to images, and may include different types of input, such as audio input (e.g., voice, sounds, etc.), user entries or selections made via a user interface, scans or other input of textual information, or other training data. The AI algorithms may, based on such training, be configured to recognize voice commands or input, textual input, etc.

The deployment server 204 may be a standalone server or a module that may be deployed as part of an app in a user's smartphone, tablet, or other personal computing device, in accordance with one or more implementations.

Figure 3:
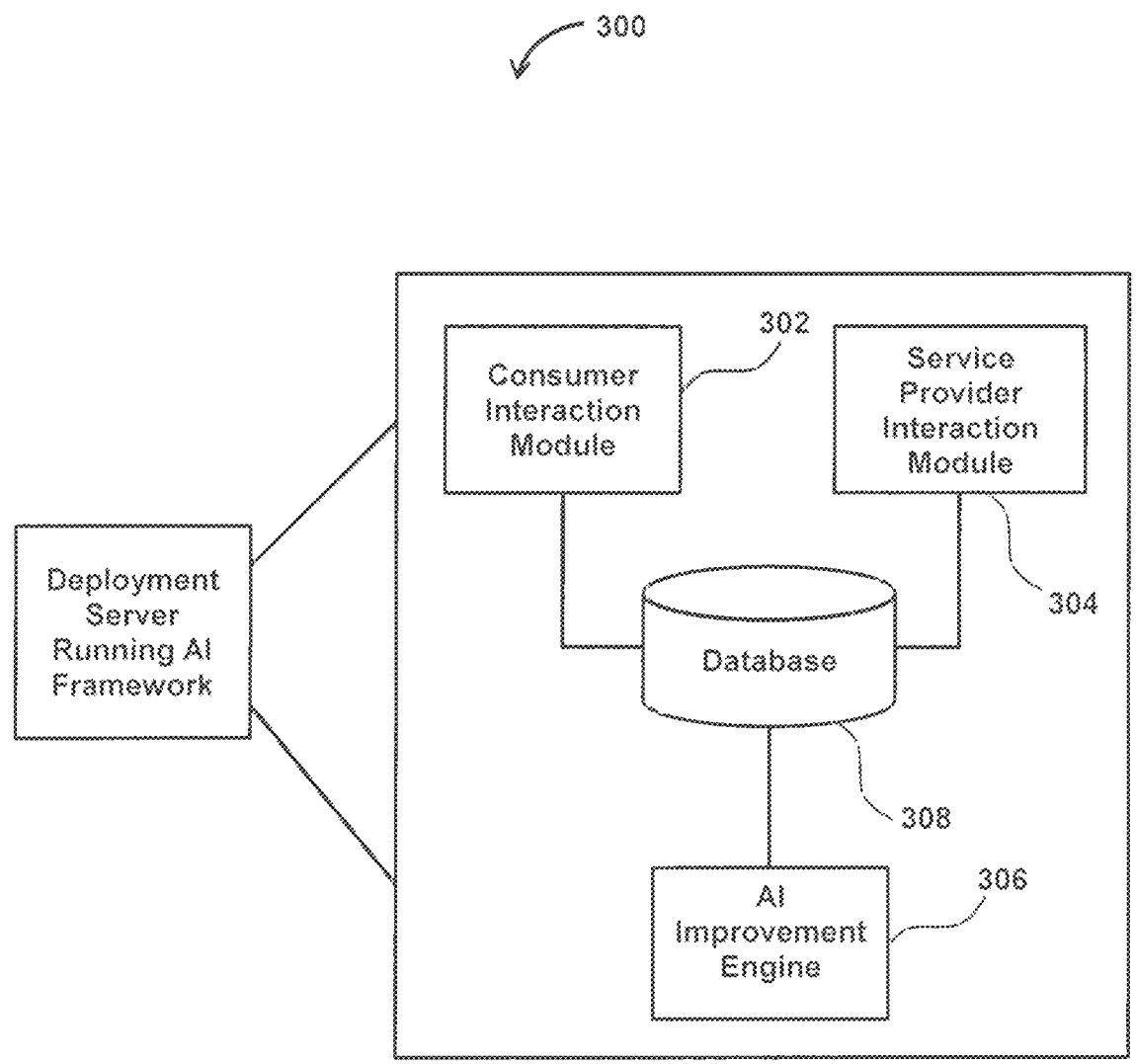
FIG. 3 illustrates an exemplary system wherein a deployment server running an AI framework may include a consumer interaction module, a service provider interaction module, a database, and an AI improvement engine. The AI improvement engine may run on one or more of machine learning algorithms, AI algorithms, or other algorithms, in accordance with one or more implementations.

FIG. 3 illustrates details of how a deployment server 300 running AI framework may be architected. It may include one or more of a consumer interaction module 302, a service provider interaction module 304, an AI improvement engine 306, a database 308, or other elements.

The consumer interaction module 302 may ingest data from a consumer, store the data in database 308, analyze the data with AI models for processing, and possibly communicate a quote back to a consumer. The consumer interaction module 302 may ingest one or more of text, video, pictures, audio, or other things from a user.

In some implementations, the service provider interaction module 304 may serve as an interface to allow service providers to review information from consumers and AI analysis, make corrections if needed, and communicate with a user. The provider interaction module 304 may have the capability for a service provider to review the quote, send it back to the user through the appropriate messaging channel, or export to pdf and send it via another channel.

The AI improvement engine 306 may combine the original analysis output from the AI with any changes made by a consumer, service provider, or dedicated human reviewer, and provide feedback to the AI framework to improve the trained model. The AI improvement engine 306 may also host the AI framework, which runs multiple machine learning models to be used on the data sent from the consumer, as well as a service provider.

Figure 4:
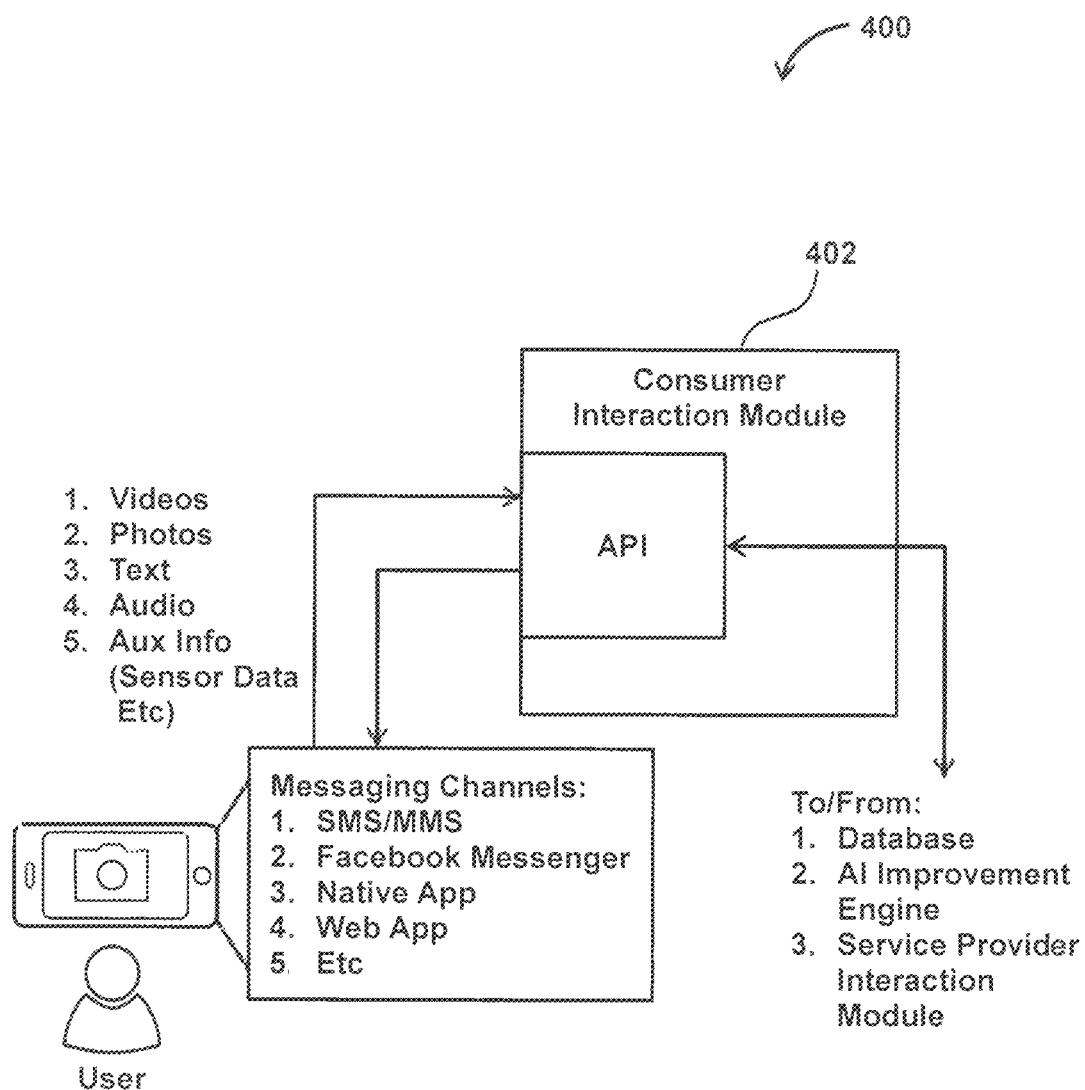
FIG. 4 illustrates an exemplary system wherein a user may send and receive information to/from a consumer interaction module in a deployment server running an AI framework, in accordance with one or more implementations.

FIG. 4 illustrates an exemplary system 400 wherein a user sends information to a consumer interaction module running on a deployment server 402. The user's app or another messaging channel (SMS, MMS, Facebook Messenger, web browser, etc.) may record camera frames, sensor (IMU) information, or other information, including text data (answers to questions asked by a human agent, or targeted questions asked by an AI algorithm based on data that was already sent). Objects may be tracked on the user's smartphone, tablet, or other personal computing device to send the relevant camera frames to the deployment server 402. The deployment server 402 may use the camera frames and detect objects in the camera frame. The deployment server 402 recognizes and finds size of object through other computer vision techniques leveraging the sensors (e.g., IMU). As output the deployment server 402 may generate lists of detected objects or detected non-objects as well as any size, dimension and weight information. The deployment server may reside on-device, or the functionality may be split between an on-device server and a server in the cloud.

Figure 5:
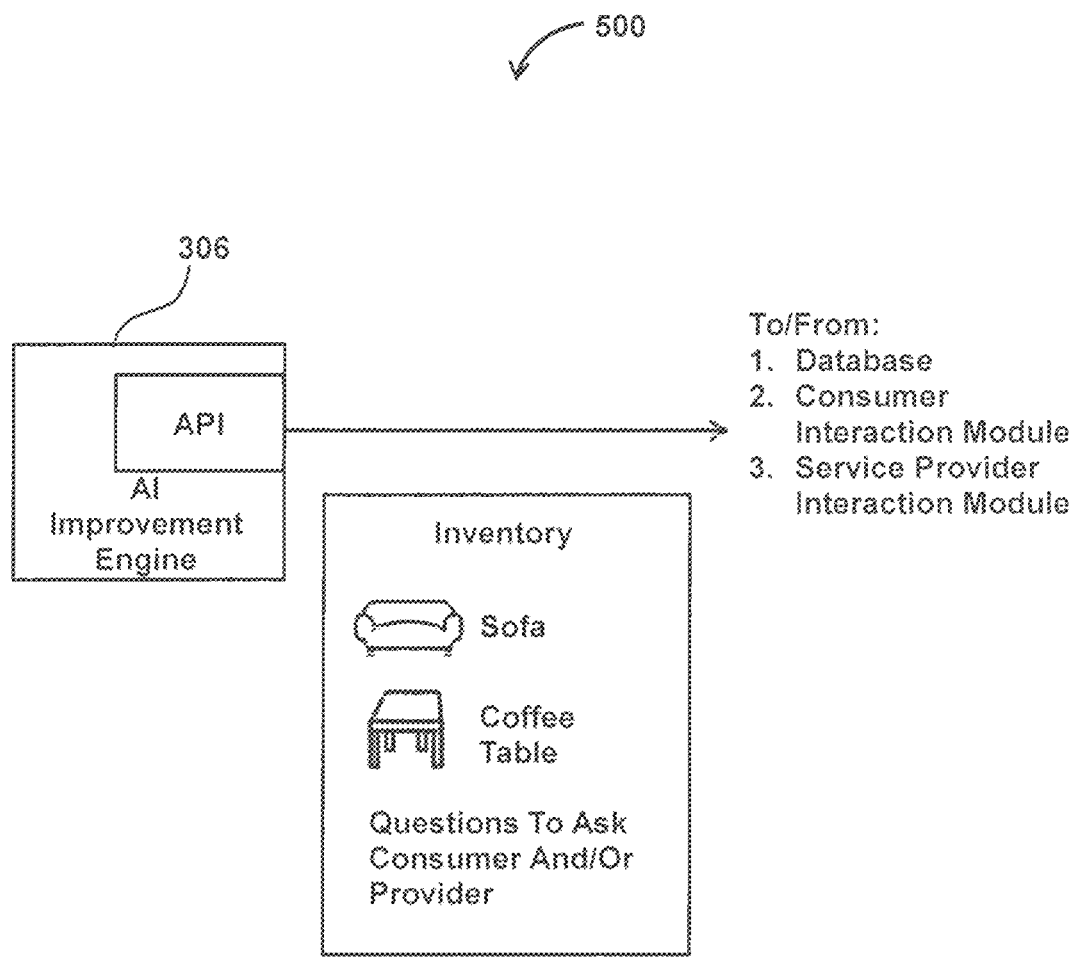
FIG. 5 illustrates an exemplary system wherein the AI improvement engine may output detected objects and other non-objects with various attributes (size, dimensions, locations, area, etc.) (and may create an inventory), as well as follow-up questions to ask of a consumer(s) or service provider(s), in accordance with one or more implementations.

FIG. 5 illustrates an exemplary system 500 wherein detected objects may create an inventory, size, or weight information for objects that are detected, as well as create a list of questions that the AI algorithm may need to provide a more accurate data to a service provider or user (for example, questions on the pictures sent by the user, or follow up questions based on past responses). This may be facilitated by a question answering component (not shown for purposes of clarity) which can reside in the AI improvement engine or the consumer interaction module. The inventory with the request for additional inputs may be sent to the user or to a service provider.

Figure 6A:
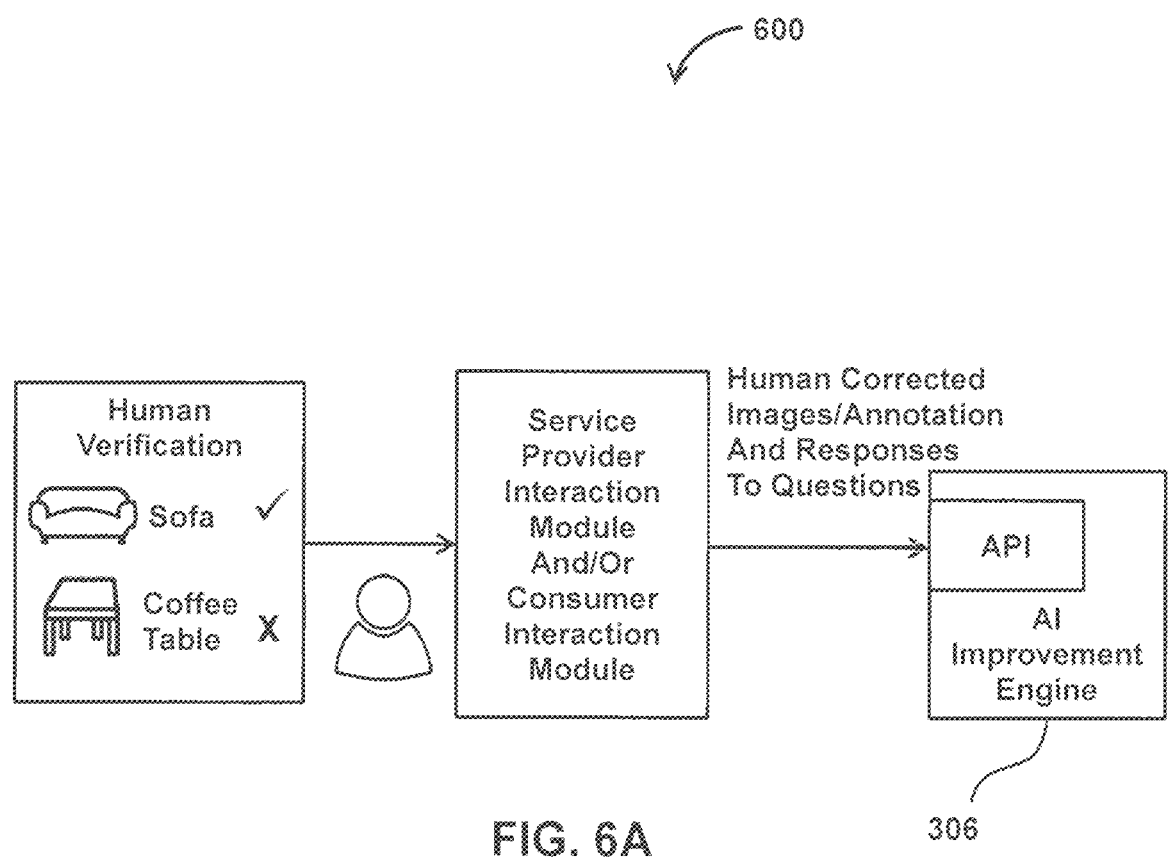
FIG. 6A illustrates an exemplary system where the output of the AI improvement engine is optionally human-verified and fed back into the AI improvement engine for better performance, in accordance with one or more implementations.

FIG. 6A shows a system 600, and how the inventory may be optionally human verified, in accordance with one or more implementations. During a human verification step, any mistakes by the detection algorithm may be corrected, or the training framework may be updated with new images for training. The human verification may happen on end consumer devices where the user may correct the misdetections, or in the cloud where a different human operator or service provider may issue the corrections. The human verification may include human corrected images, annotations, translations, interactive quote changes, added text, user interface inputs, or other information. The output may be an updated inventory. The inventory may additionally contain size or weight information for the objects that are detected. The corrections may be sent back to the AI algorithm for further processing.

Figure 6B:
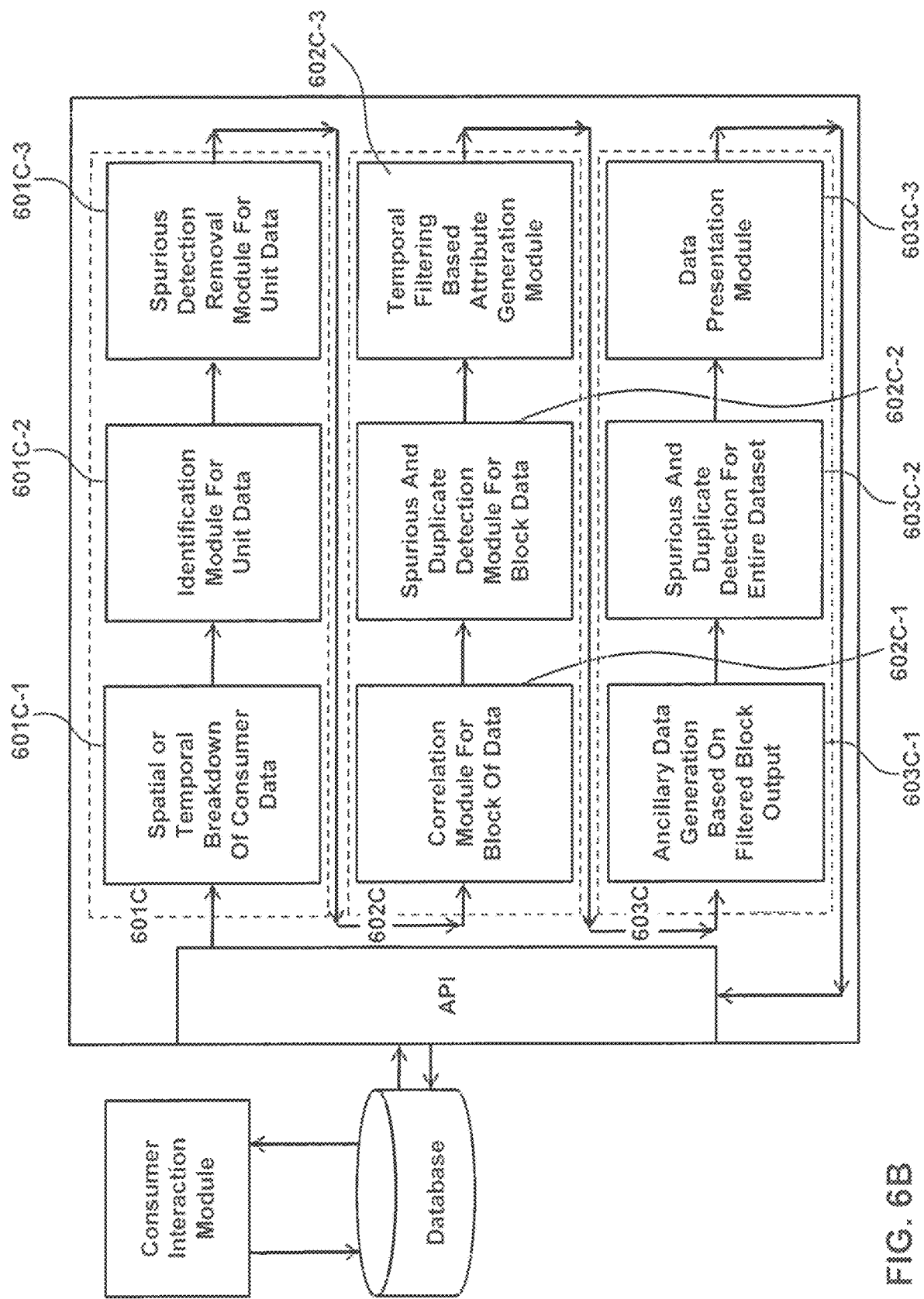
FIG. 6B illustrates an exemplary implementation of artificial intelligence (AI) algorithms, in accordance with one or more implementations.

FIG. 6B illustrates an exemplary implementation of artificial intelligence (AI) algorithms. The AI algorithms may include natural language processing algorithms, machine learning algorithms, neural networks, regression algorithms, or other artificial intelligence algorithms. The AI algorithms described related to FIG. 6B may be representative of the descriptions of AI given elsewhere in this disclosure. At an operation 601c-1, FIG. 6B illustrates how the data, such as video or audio (e.g., provided by a user such as a consumer) is divided into smaller segments (units) using spatial or temporal constraints, as well as other data, such as context data. For example, a video may be divided into multiple frames, and poor-quality images with low lighting or high blur may be filtered out. Similarly, an audio input may filter out segments comprising background noise and create units of audio where a speaker (e.g., the consumer) is actively communicating.

At an operation 601c-2 an AI algorithm such as a deep neural network comprising a convolutional neural network, or a recurrent neural network is used to detect objects or areas of interest in individual units of the data provided by the user (e.g., consumer). For example, individual images in a video may be presented as an input to a convolutional neural network that performs detection for objects belonging to classes needed to generate an accurate itemized statement (e.g., as described herein). Other AI algorithms, such as linear regression, etc. may also be used. Multiple different AI algorithms may be used to process one or more different inputs. As an example, besides object detection using a convolutional neural network, another convolutional neural network may be used to classify a location of the user to be a type of room, such as a bedroom, kitchen, etc. As another example, the unit of data, such as an image frame may be first processed by an AI algorithm, such as a Convolutional Neural network, and the output of this network may be further processed by another algorithm, such as a Recurrent Neural Network. The output of these algorithms can be a 2D or 3D bounding box, or a mask around the objects of interest, or, for audio data, a text string that processes and translates the user voice input, etc. Similarly, the output of these networks can also include confidence values for the predictions, and the ordered set of classes that the detected object can be classified into.

As an example, a neural network (e.g., convolutional or recurrent) may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In an embodiment, each individual neural unit may have a summation function that combines the values of all its inputs together. In an embodiment, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In an embodiment, the one or more neural networks may include multiple layers (e.g., where a signal path traverses from front layers to back layers). In an embodiment, back propagation techniques may be utilized by the neural networks, where forward stimulation is used to reset weights on the "front" neural units. In an embodiment, stimulation and inhibition for the one or more neural networks may be freer flowing, with connections interacting in a more chaotic and complex fashion. In an embodiment, the intermediate layers of the one or more neural networks may include one or more convolutional layers, one or more recurrent layers, or other layers.

The one or more neural networks may be trained (i.e., whose parameters are determined) using a set of training data. The training data may include a set of training samples. Each sample may be a pair comprising an input object (typically a vector, which may be called a feature vector), and a desired output value (also called the supervisory signal). As described above, training inputs may be images, for example. A training algorithm analyzes the training data and adjusts the behavior of the neural network by adjusting the parameters (e.g., weights of one or more layers) of the neural network based on the training data. For example, given a set of N training samples of the form $\{(x_1, y_1), (x_2, y_2), \ldots, (x_N, y_N)\}$ such that $x_i$ is the feature vector of the i-th example and $y_i$ is its supervisory signal, a training algorithm seeks a neural network $g: X \rightarrow Y$, where X is the input space and Y is the output space. A feature vector is an n-dimensional vector of numerical features that represents some object (e.g., an image of a room with objects to be moved as in the example above). The vector space associated with these vectors is often called the feature space. After training, the neural network may be used for making predictions using new samples (e.g., images of different rooms).

At an operation 601c-3 spurious identifications and detections can be filtered out by using techniques such as non-max suppression (this example is not intended to be limiting) between objects from the same or different classes needed to generate an itemized statement. An AI algorithm may use variable optimized thresholds for achieving greater spurious suppression without (or substantially without) affecting true detections. For example, it may be likely to have two chairs or moving boxes next to each other. Thus, detections of two chairs with highly overlapping bounding boxes is likely to be correct. However, two detections of large refrigerators with high overlap are likely to contain one spurious detection (e.g., because it is unlikely that one house has two refrigerators, or further, two refrigerators positioned right next to each other). Similarly, the system is configured to recognize that detection of a jet-ski and a kayak next to each other is plausible, however, detection of a jet-ski next to a bed may be spurious.

The AI algorithm can also utilize context, such as room (e.g., bedroom, hallway, kitchen, garage, living room, etc.) and object class (e.g., furniture, appliances, etc.) for suppression. Outputs from multiple data units may be combined on a logical basis (such as data belonging to a particular room or area) and form a block of data that is used for generating part of the inventory (e.g., for that room or area). For example, frames for a video segment recorded for a particular room may form a block of data. An object may be present in multiple data units, and thus be counted multiple times within a block of data.

At an operation 602c-1, an AI algorithm can be used to correlate an object across multiple past and future data units present in a block of data and ensure that the inventory estimate for the block is accurate.

At an operation 602c-2, an AI algorithm may use multiple techniques such as feature matching for objects, detecting a pan change in the input video, etc., to determine whether some data units within a block of data are duplicates of previous inputs. As an example, a user (e.g., a consumer) may inadvertently make multiple recordings of a given area, such as by recording first from left to right and then right to left in order to arrive at a new location for recording. Similar to the operations described above, the system may be configured to use techniques for suppressing spurious identifications or transforming identified classes using context. These suppression algorithms can benefit from the processing of the data at the block level. For example, spurious detections at the level of an image frame can be suppressed using weighted temporal filtering. As another example, objects detected inside the bounding box of other objects such as mirrors and television sets may be suppressed. As another example, if a mattress is detected close to a headboard, the mattress is determined to likely be on top of a bed-frame, and the AI algorithm can lower the confidence threshold for detecting bed-frames in the block of data.

At an operation 602c-3, the system may recognize that many objects may not be identifiable within a unit of data. As an example, an object may be partially occluded from a particular view, but may become more visible later in a user (e.g., consumer) recorded video. Similarly, a large object may never be completely visible within a single unit of data. As another example, an object may be identified as belonging to different classes in different units of data. An AI algorithm may utilize techniques such as weighted temporal filtering, strict class rank hierarchy, and contextual information, etc., to generate attributes of the objects identified in the block of data. As an example, the size of a bed may be detected as a king, queen, or indeterminate during detections on individual frames. However, at the block level the AI algorithm may use the outputs, such as the confidence values, for predictions and other meta-data to classify the object. Similarly, if an object is predicted to belong to two closely related classes that vary on sizes, such as a loveseat and a large sofa, the AI algorithm may use the confidence values of the predicted classes to adjust the volume and weight of the object.

At an operation 603c-1, an AI algorithm may utilize outputs of one or more blocks of data to generate ancillary data that is useful in accurate inventory estimate generation. For example, packaging requirements for a bookshelf can be estimated by the system as a function of the size of the bookshelf.

At an operation 603c-2, an AI algorithm may be used to remove spurious objects across multiple blocks of data. For example, an inventory estimate of kitchen items may inadvertently include items from the living room that were present in a video segment for the kitchen as well as the living room.

At an operation 603c-3, an AI algorithm may also be used to select the units or fractions of units that can be used to present to the user. For example, an object may be present in multiple units. However, to present the object to the user only a single unit or a box identifying the object within that unit may be selected. The algorithm to select these presentation segments can optimize for one or more metrics, such as review time, aesthetics, etc.

Figure 7:
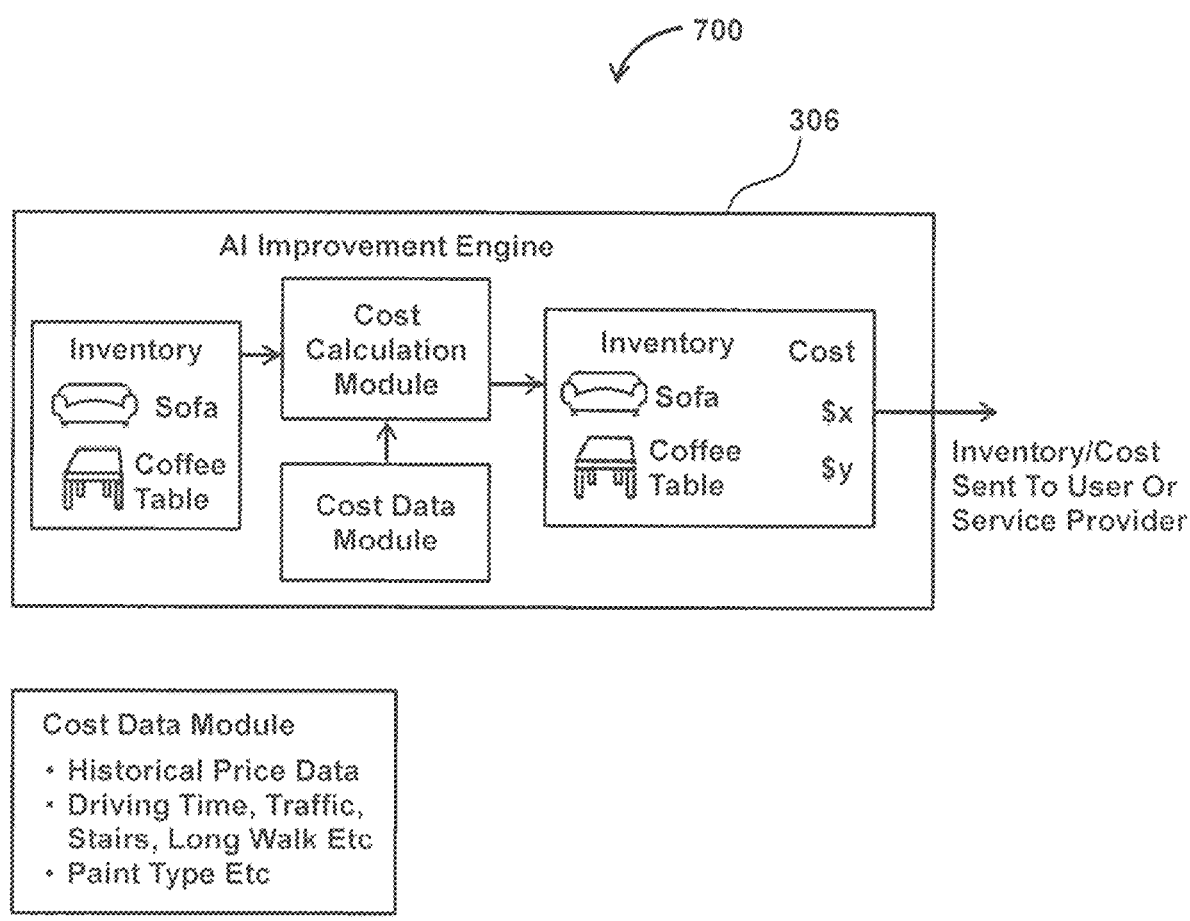
FIG. 7 illustrates an exemplary system for cost creation, in accordance with one or more implementations.

FIG. 7 illustrates an exemplary system 700 for cost creation. The inventory information may be fused with other cost data to generate cost per item for a specific service (e.g., moving, insurance, painting, widow cleaning, junk removal, or other services). Information for cost creation may be received from the consumer interaction module, third parties, the quote monitoring module, or other sources of input. Cost creation operations may be performed for based services along with additional service and product offerings related to the quoted base service, including additional service and product offerings not directly related to the quoted base service (e.g., as described herein).

Figure 8A:
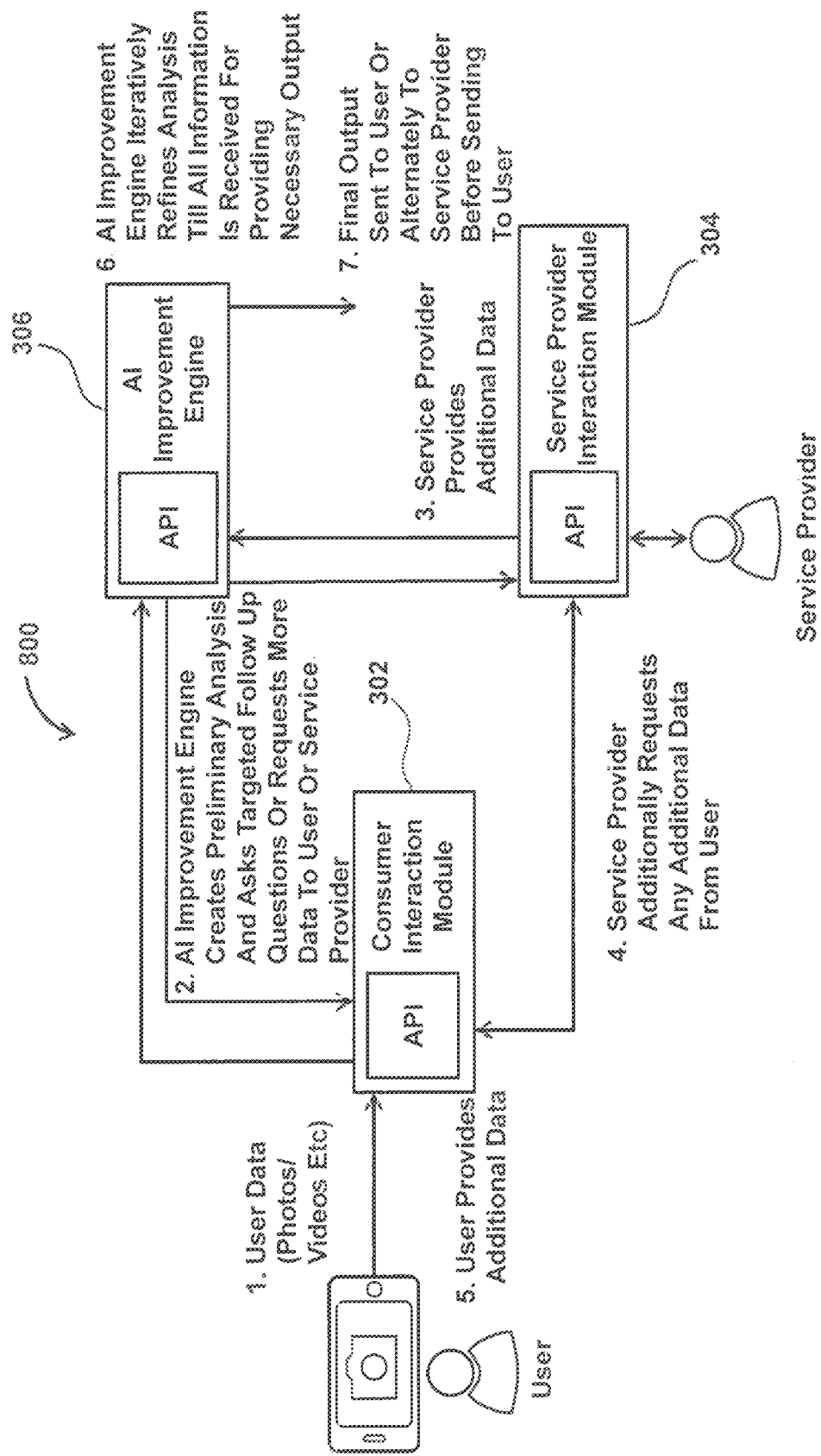
FIG. 8A illustrates an iterative way the user collects data, the AI improvement engine analyzes the data and asks relevant questions of either the service provider or user, in accordance with one or more implementations.

FIG. 8A illustrates a flow diagram 800 of an iterative way that AI or a human agent may ask relevant questions based on user data (text, image, videos, etc. sent, input, or otherwise acquired by the system (e.g., as in the case of sensor data)) to collect additional information needed to generate the quote.

Figure 8B:
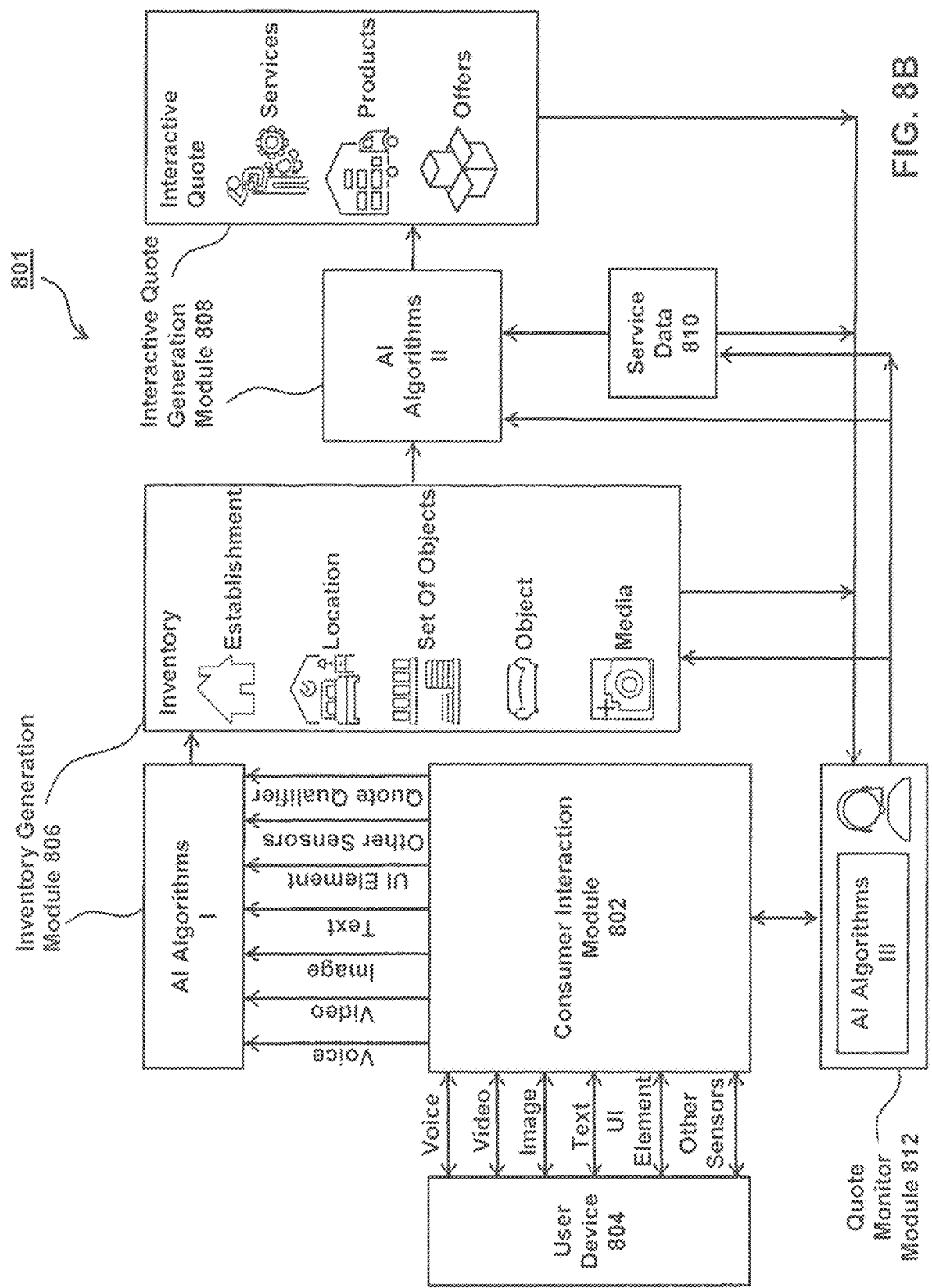
FIG. 8B illustrates an iterative way the user collects, data, the AI improvement engine analyzes the data and interactive quotes for products and service including in accordance with one or more implementations.

FIG. 8B illustrates an exemplary implementation of the AI-based cost estimates for relocation services of FIG. 1 comprising a system 801 configured for providing interactive quotes for relocation cost estimates utilizing a machine learning model comprising one or more hardware processors configured by machine-readable instructions to execute the exemplary implementations described herein.

As shown in FIG. 8B, system 801 includes user device 804, consumer interaction module 802, inventory generation module 806, interactive quote generation module 808, service data module 810, and quote monitor module 812. In some implementations, as described herein, inventory generation module 806, interactive quote generation module 808, and quote monitor module 812 may include machine learning or predictive models including AI algorithms, which are trained in a similar fashion as the artificial intelligence model 200 of FIG. 2. In some implementations, as described herein, inventory generation module 806, interactive quote generation module 808, and quote monitor module 812 may include machine learning models or predictive models, and correspond to AI improvement engine 306 and the deployment server running the AI framework.

In some implementations, as described herein, inventory generation module 806, interactive quote generation module 808, and quote monitor module 812 may operate in the same as or similar manner as receiving scanned data component 108, receiving key element data component 110, and generate statement component 112, respectively.

In some implementations, inventory generation module 806, interactive quote generation module 808, and quote monitor module 812 may operate in a similar fashion as the AI improvement engine 306 of FIG. 3. In some implementations, consumer interaction module 802 may operate in a similar fashion as the consumer interaction module 302 of FIG. 3. In some implementations, service data module 810 may operate in a similar fashion as service provider interaction module 301 FIG. 3.

In some implementations, estimating the cost of moving one's belongings from one place to another may be a function of multiple variables. The multiple variables may include the number of items (e.g., furniture, boxes, special items like a piano, delicate items, or other items); the size and weight of the above items; if assembly or disassembly may be needed; if items need to be packed, and if special care needs to be given while packing (e.g., fragile items); if the two or from address(es) have a dedicated or shared elevator(s), the number of stairs a mover needs to carry the items; the walk between the front door of the house or apartment to the truck; the distance between the from and the to address, as well as traffic during time of day; or any other regulatory restrictions that may depend on the location of the user (city, county, state, country, etc.).

Currently, movers may be unable to give an accurate upfront quote to end customers without sending an appraiser to a home (for example). Even if an appraiser was sent to a customer's home, they most likely end up only visiting the address the customer moves from and not the address to which the customer moves. The present disclosure improves computer functionality, and describes providing accurate moving estimates using techniques in computer vision, artificial intelligence, deep learning, or sensor (IMU) data in addition to text data: questions asked by a human agent or an AI bot based on sent images, videos, and previous answers, as well as answers by the consumer from a smartphone or other device.

In some implementations, a workflow may include a user launching an app, via user device 804, or another messaging channel (SMS, MMS, Facebook Messenger, web browser, etc.), the app may reside on user device 804. User device 804 may include a smartphone, tablet, or other device configured for scanning their room(s) or other locations. In some implementations, scanning the room may facilitate generating description data of a location. As shown in FIG. 8B, consumer interaction module 802 is configured to receive description data of a location, the description data generated via at least one or more of a camera, a user interface, or one or more environment sensors transmitted from user device 804. In some implementations, receiving description data comprises receiving sensor data from the one or more environment sensors, the one or more environment sensors comprising at least one of a GPS, an accelerometer, a gyroscope, a barometer, a microphone, or other physical environment sensors. In some implementations, receiving description data comprises receiving user demographic data, or other information. The user demographic data may comprise physical characteristics of a user, socioeconomic information of the user, geolocation information of the user (e.g., determined based on phone number area code, GPS sensor information for a phone associated with a user, etc.), or other information.

In some implementations, a user may interact with the system 801 through consumer interaction module 802. The user may input descriptive data about the location in the form of videos, images, voice, text, display or information. In some implementations, consumer interaction module 802 prompts the user to generate data consisting of at least one or more of voice, video, image, and text data. Consumer interaction module 802 may also prompt the user to generate data, via user device 804, in the form of user interface elements such as bounding boxes, buttons, and other graphic user interface features of user device 804. Consumer interaction module 802 uses display systems such as a display screen, touchscreen, computer mouse, tracking pad, or pressure sensor. Consumer interaction module 802 may also capture data from sensors such as a GPS, gyro, accelerometer, Wi-Fi-receiver, cellular-modem, or a barometer, via a user device 804.

In some implementations, consumer interaction module 802 can interact with the consumer using voice, video, image, text, UI elements such as dropdown list, and haptic feedback.

In some implementations, sensor data is captured by user device 804 and transmitted to the one or more processors at predetermined intervals with or without user interaction. Descriptive data may be acquired automatically through context aware and location aware environment sensors, such as a GPS, accelerometers, gyroscopes, barometers, or other context aware or location aware environmental sensors. In some implementations, user device 804 may be configured to periodically transmit descriptive data to consumer interaction module 802. The periodic intervals may include 5 seconds, 10 seconds, or other periodic durations.

In some implementations, the description data comprises one or more media types, the media types comprising at least one or more of video data, image data, audio data, text data, user interface/display data, or sensor data. For example, in some implementations, a user may dictate a voice input stating the location of the room in a building, the items inside the room, the attributes of the items, or other descriptive information about the contents within a location. In some implementations, attributes describe or indicate properties of an object or objects (e.g., type (furniture, appliance, etc.), size, weight, shape, quantity, fragility, importance (family heirloom, a single copy, expensive, etc.), etc.), a location of the object (a room, a house, an apartment, a warehouse, an office, at a mall, in a supermarket, in a consumer shop, on the third floor, on the patio, etc.), whether an object is related to one or more other objects (e.g., a dish in a set of dishes, a section of a sectional couch, etc.), a type of media used to record or input an object into the system (e.g., an image, a video, a voice recording, user entry or selection of information via a user interface, etc.), or other attributes. In some implementations, the user may transmit a video showing the contents within a location or a building.

In some implementations, consumer interaction module 802 may direct the consumer to record a voice narration of different objects in the establishment or a location in the establishment. For example, consumer interaction module 802 may ask the user to describe the objects in the kitchen that they want to be moved. The users' narration is then processed by the AI based algorithm to generate an inventory list. In some implementations, the AI based algorithm may cause the asking of follow up questions such as "what size is the refrigerator" by presenting the user images of different sized refrigerators and capturing the users' choices to estimate the size of the refrigerator.

Similarly, consumer interaction module 802 can request input in the form of images, or text. In some implementations, consumer interaction module 802 may request the use a camera on a smartphone device, and prompt the user to touch the display on objects of interest. Consumer interaction module 82 may overlay a UI element, such as a button or a bounding box around the touch screen display area, and provide user a dropdown list of items using the location as a context (for example, in a kitchen area the dropdown list may contain fridge, microwave, dining table, dining chairs, wine-rack, etc.). In some implementations, the image captured from the camera along with the overlaid UI elements and the categories chosen by the user are then used to generate the inventory list.

In some implementations, the above implementations may be used in combination. For example, in a video, while the images from the video are used for object detection and other attribute determination as discussed herein, the user comments may be processed to determine the attributes of the object such as "this piano is fragile" or "please be extra careful with this painting" or "This fridge and stove range will not be moving". The attribute values can be used to provide feedback by augmenting the camera display with the UI elements, such as a bounding box, or a button, or a color coded icon display scheme that provides the user information on the objects attribute values: for example, green boxes or buttons for objects that are classified to be part of the move, and red as those that are not part of the move, or a gloves icon for objects that need to be handled with extra care, or tools icon for objects are going to be dismantled during the move and assembled at the end of the move. Similarly, the estimated dimensions, weight, volume, material, and object class of the object may be displayed in the UI overlaid on the camera in an augmented fashion. The user may also receive feedback using voice, such as a copy of a user's narration associated with the object. Similarly, objects such as a door or a narrow pathway that may require objects that are being moved to be disassembled can be marked using a UI element in similar to an augmented reality system.

In some implementations, consumer interaction module 802 may direct the user to capture the contents in the establishment in a video (i.e., descriptive data). It may then select different images from the video and detect various objects in those images using AI based algorithms. In some implementations, inventory generation module 806 is configured to receive the video from consumer interaction module 802, and may further process the image or parts of the image using AI based algorithms to determine attributes of the objects in the image.

As shown in FIG. 8B, consumer interaction module 802 is configured to receive descriptive data from user device 804 and communicate the descriptive data to inventory generation module 806. In some implementations inventory generation module 806 is configured to generate an inventory based on the descriptive data, and determine attributes of each item in the inventory list.

In some implementations, generating an inventory list includes generating an inventory list comprising a plurality of items, utilizing machine learning models (e.g., the AI described herein), based on the description data or other information. The inventory list comprises inventory attributes associated with the plurality of items related to a context of the plurality of items in the location. In some implementations, generating the inventory comprises determining the one or more inventory attributes or other information. The inventory attributes comprise one or more of establishment attributes indicating, at least, the physical dimensions of a building corresponding to the location, location attributes indicating a location of the item within the building or structure, attributes of a set of objects indicating shared attributes of a set of items on the inventory list, attributes of an object indicating attributes of a specific item on the inventory list, media attributes indicating attributes that apply to items within the scope of the one or more media types, or other information. In some implementations, inventory generation module 806 utilizes machine learning (e.g., the AI described herein) to generate an inventory list and inventory attributes for items in the inventory list. In some implementations, generating an inventory list applies machine learning based techniques such as deep learning, linear regression, neural networks, or other machine learning based techniques to create an inventory list.

In some implementations, each item on the list can describe attributes for any of the following: all objects in a given image, a specific object, a set of objects that share a property (e.g., class material that require special handling during move, walls in a given area that require a different type of paint, expensive items that may increase the cost of insurance) a location (e.g., a room, garage, backyard, or kitchen) at an establishment, (e.g., home, office, or any other service location). In some implementations the machine learning algorithms in the inventory generation module 806 may produce one or more attributes for each type of item in the inventory list. In some implementations, when the inventory type refers to multiple objects (e.g., a room or an establishment) each inventory attribute can be either a list of the individual object attributes, or some function of the individual attribute values (e.g., a sum, a mean, median, mode). In some implementations, the inventory may refer to a value that is determined using an artificially intelligent algorithm (such as a deep convolutional network, a neural network, or linear regression) that utilizes individual attribute values as an input (e.g., determining the quality of objects in a household).

In some implementations, object attributes, or inventory attributes, may include object type and quantity, volume, dimensions, area, density, weight, material, location inside the establishment. The attribute corresponding to the items may include quality, value, model, brand, color, style, finish, fragility, or labor requirements. In some implementations, attributes of the items may include clutter, (e.g., small objects, close items that can be packaged in a box). In some implementations, attributes may include whether the item causes an obstruction. In some implementations, obstruction can be an attribute for two different types of objects. For example, large objects such as a bed that require disassembly may be identified as an obstruction. Objects such as a door that are not part of the move but will become an obstruction for a set of objects may also be associated with an obstruction attribute. For example, in some implementations, discussed in further detail herein, the interactive quote generation module 808 can estimate the most obstructive among multiple doors for example and determine which objects/items in the inventory list require disassembly/reassembly and may facilitate a quote or service to offer such.

In some implementations, as discussed above, the inventory can be of different types and can have differing attributes. The inventory type groups the objects listed under the type to a spatial location (such as a room), or temporal segment (video recording segment), or to a shared attribute (e.g., fragile objects that require packaging). In some implementations, each inventory list can have different attributes such as: volume, quality, weight, labor requirements, object type & quantity, small objects/clutter, density, area, dimensions, value, color, object location, fragility, style, material, texture, finish, model, brand, obstruction, object list, packaging requirements, foldable, stackable, recline, item included in service quote, etc. In some implementations, the attributes generated are dependent on the type of service (e.g., painting, moving, insurance, etc.) and the subset of the service (e.g., packaging estimation, object value estimation, dimension estimation, etc.).

In some implementations, inventory generation module 806 may break down the inventory list to various levels of hierarchy and groups that share certain attribute values. For example, the inventory attributes may apply to a particular object such as a bed, or a couch, or a table. Similarly, inventory generation module 806 may consolidate or compartmentalize the output to a location and the attributes may apply to all objects in the specified location such as all items in a bedroom, or a living room.

In some implementations, inventory generation module 806 can generate an inventory for an image, or consolidate the output for a set of images. Similarly, the consolidation can be done for segments of voice recordings, textual inputs, or other media types.

In some implementations, inventory generation module 806 may also consolidate the objects based on shared attribute values. For example, inventory generation module 806 may consolidate objects that require packaging (e.g., all books in a bookshelf, glassware in kitchen, dishes in kitchen, clothes in a wardrobe/closet, small items or in a room, or items in the garage).

In some implementations, inventory generation module 806 can also provide a consolidated inventory for the entire establishment. An attribute of an inventory for the entire establishment can be either a list of individual attributes (for example, list of volume of each object), or a function of the individual values (for example, a sum of individual object volumes), or can be a value that is determined using an artificially intelligent algorithm (such as a deep convolutional network, a recurrent neural network, linear regression, some combination thereof, etc.) that utilizes individual attribute values as an input (for example, determining the quality of objects in a household). Such a scheme that utilizes multiple individual object attributes to determine the value of the attribute can also happen at other levels of hierarchy (for example, for objects in an image).

In some implementations, inventory generation module 806 may also generate the attribute values in multiple processing steps. For example, an object's type or category is first determined using artificial intelligence algorithms (such as determining an object to be a refrigerator), then the object may be classified to a size by choosing amongst a standard set of sizes, shapes, material, brand, among others. This enables the attributes such as the dimension, area, weight, value etc. to be estimated. In some implementations, the classification amongst the set of standard sizes may be done by requesting additional data from input, third party, a database of images (e.g., via external resources 124 of FIG. 1), textual inputs, etc. Similarly, as an example, the object's brand, make and model may be useful in computing the value and quality attributes.

In some implementations, inventory generation module 806 may serve various functions and process different inputs and outputs. For example, inventory generation module 806 may select a subset of images from the video and apply object detection on these images. In some implementations, inventory generation module 806 may also determine the dimensions of the objects and structure (such as a door).

In some implementations, inventory generation module 806 may estimate the time and labor requirements for objects that will require disassembly and assembly and increase the labor requirements attribute of the objects. Inventory generation module 806 may also determine the material and style of the object that may in turn be used to estimate the density and thickness of the object, which in turn can be used for estimating weight.

In some implementations, determining inventory list attributes include material detection that can be used for determining the packaging requirements for the object. For example, glass or marble on top of a table can be used as an input to the algorithms that generates the value for packaging requirements attribute. The object type can also be used as an input into the packaging requirements. For example, if a flat screen TV is detected then the packaging attribute for this object (or an inventory type that includes this object) will be increased. In some implementations, the object type can also be used as an input into the packaging requirements for objects placed or stored inside the object. For example, detection of a china cabinet, or kitchen cabinet can be used to estimate the fragility and packaging requirements for the objects inside.

In some implementations, inventory generation module 806 may also be used for estimating increased service time due to the establishment's distance to a parking space, for example. This can be done by estimating the horizontal distance, and time spent in moving objects across staircases, or inside elevators. In some implementations, inventory generation module 806 may estimate the additional time by using a video or a set of images or analyzing the voice recordings or by using sensor data such as a barometer. In some implementations, discussed in further detail below, inventory generation module 806 may also make use of service data provided by service data module 810, to estimate, part or whole of the above time requirements, such as previously analyzed data, or third-party data. In some implementations, the one or more processors are configured to adjust a relocation cost estimate based on at least one or more of physical attributes of the plurality of items in the inventory list including fragile items, small items, or other special care items determined based on the inventory attributes, and physical attributes of the location including accessibility, distance from main road, presence of elevators or stairs or other physical attributes of the location.

In some implementations, consumer interaction module 802 is configured to receive a quote qualifier from quote monitor module 812. In some implementations, the particular prediction model or machine learning model that is used for a particular input is determined by a quote qualifier input. The quote qualifier also includes input data such as the service data that may not be received directly from the user or user device. The quote qualifier may consider information related to the user's previous history or demographic data and adjust quotes and offers for products and services.

In some implementations, quote monitor 812 may be configured to implement reinforcement learning-based techniques for machine learning models. For example, if the interactive quote module provides a deeper level of service, and the user ends up lowering the level of service before choosing the service, or provides the associated high cost as a reason to decline the service, quote monitor module 812 utilizes reinforcement learning to lower the default quality of service for other services to the user, or adapt, for other future users that share similar demographics and other similar qualities. Conversely, quote monitor 812 may also increase a quality of service or the default service quality level.

In some implementations, consumer interaction module 802 takes inputs from the user and quote monitor module 812. Consumer interaction module 802 provides input to inventory generation module 806. As discussed above, inventory generation module 806 receives input in the form of voice, video, image, text, display data, or other environmental sensor data, as well as directives in the form of quote qualifiers, and generates an inventory list using particular prediction model/machine learning models based on the quote qualifier. In some implementations, consumer interaction module 802 may function similarly as consumer interaction module 302, 402 of FIGS. 3 and 4, respectively.

As shown in FIG. 8B, in some implementations, system 801 includes service data module 810. Besides the inventory and inventory attributes, directly related to the service there is other data that may be useful in providing the user with an interactive quote for the service and other useful products and services. For example, service data module 810 may receive as input source and destination addresses, zip codes, appraisal data, source and destination statistics, topology maps, street maps, which may be useful. For example, the distance to the closest available parking space can be estimated using street view or satellite maps. Similarly, the vertical distance may be estimated using the topology maps.

In some implementations, service data module 810 may be configured to estimate a typical quality of service. The typical quality of service expected by a user can be estimated by data not associated with the move. For example, a user communicating via a premier device or in a zip-code with a high average house price, or average income may expect high quality of service. Similarly, if the user is communicating using high speed internet, or newer operating system, the default quality of service offered to the user may be higher than other users. Other third-party data such as the demographic information about the user can be used to determine the quality of service and price, and auxiliary service offered to the user.

In some implementations, service data module 810 includes data utilized in selecting objects that require direct or auxiliary service. For example, if a user is moving from a suburb to an apartment in a high-rise that lacks a patio, the patio-furniture will not be selected for the moving service. However, the user may be interested in selling or discarding the patio-furniture and may need to connect with a reseller marketplace, or junk removal or charity organization. In this case, service data module 810 is used to provide an accurate quote for the service and an auxiliary service of interest to the user.

In some implementations, service data module 810 may be configured to receive service data directly through consumer interaction module 802. This includes demographic information, source and destination addresses, and types (apartments, independent house, and floor), service options, profession and annual income, family information, and other interests (such as sports, games, indoor and outdoor activity). Other information that may be directly provided by the user may include whether the destination address is bigger or smaller than the existing house, reasons behind the move, or whether they are new to the area. This information may be used to provide relevant products and services to the user.

In some implementations, service data module 810 may be configured to receive temporal data including but not limited to, the seasonal, weekly and daily demands for the dates of requested service, weather and road conditions, resource availability, and other information related to the service dates. This information may be used by one or more other modules of the system to generate or adjust the interactive quote, or for other purposes.

In some implementations, the cellular provider for the user may also be part of the service data included in service data module 810. Service data module 810 may be configured to receive demographic data of the user. In some implementations, demographic data of the user may be communicated via the device 802. In other implementations, demographic data may be obtained from a third-party (e.g., via external resources 124 of FIG. 1).

In some implementations, service data module 810 may function similarly to service provider interaction module 304 of FIG. 3. For example, the service data module 810 may serve as an interface to allow service providers to review information from consumers and AI analysis, make corrections if needed, and communicate with a user. The service data module 810 may have the capability for a service provider to review the quote and send it back to the user through the appropriate messaging. Demographic data of the user may also be acquired from service providers via service data module 810. Service data module 810 may also include the area code for the phone number of the user, operating system, and make/model of the user CPU platform 204. Demographic data may also be used to make offers of products and services unrelated to the move but related to the user.

In some implementations, service data module 810 may also receive projections and predictions related to the move, including but not limited to weather, road conditions, and seasonal/weekly/daily demand for moving services and supplies. Such information may be used to determine or adjust an interactive quote, offers and products, or other information based on conditions such as weather, road conditions, seasonal/weekly/daily demand for goods and services, etc.

In some implementations, service data module 810 may be configured to receive the input as discussed above and generate various information used by system 801. In some implementations, service data component 804 is configured to generate data received directly from a user as input through consumer interaction module 802 via the user device 804. For example, an image could be used for the determination of a height of the establishment acquired from the sensors.

In some implementations, service data module 810 via consumer interaction module 802 receives information acquired from the sensors of the user CPU platform 204 for example a location of the establishment using the GPS, or height of the establishment, the pressure surrounding an establishment using the barometer, or other information. In some implementations service data module 810 may generate information acquired or inferred through user communication. For example, the operating system and device make/model. In some implementations, service data module 810 generates information acquired or inferred through other means such as demographic information input by the user or attained from a third party.

In some implementations, service data module 810 processes data that is presented as input to the interactive quote generation module 808. This includes source or destination establishment data and establishment attributes. For example, source and destination establishment data may include data related to the location of the source building or the destination building, appraisal data and statistics of the source building or the destination building, a satellite view of the source building or the destination building, and topology maps of the source or destination building, and a street view of the source or destination establishment. In some implementations, interactive quote generation module 808 may receive as input service data from service data module 810.

In some implementations, interactive quote generation module 808 may be configured to generate, utilizing the machine learning models (e.g., the AI described herein), one or more interactive quotes for relocation cost estimates comprising at least one or more offers for products or services based on the plurality of items in the inventory list and the inventory attributes. In some implementations, interactive quote generation module 808 may take the inventory, attributes, and service data as input and generate an Interactive Quote comprising details of primary service (e.g., price, fleet or crew, service dates, etc.), add on service and products related to the primary service (e.g., labor costs for packing, unpacking, dismantling, assembling, junk removal or donations, re-seller marketing, etc.), and auxiliary products and services (e.g., packing material, paint, brushes, insurance, new furniture for a bigger house, etc.). In some implementations, for example, the interactive quotes comprise one or more of a relocation cost estimate, and add-on relocation services or products comprising at least one or more of packing/unpacking services, disassembling/reassembling, junk removal, donations, reseller marketplaces, packaging material, insurance/maintenance contracts on service, or other information.

In some implementations, interactive quote generation module 808 may estimate the relocation labor costs by using the attributes of the inventory and service data provided by the inventory generation module 806 and interactive quote generation module 808, respectively. This may occur over multiple steps and iterations or refinements. For example, the time required for moving objects from the establishment to the parking lot may be estimated using the service data such as street maps, satellite view, and topology maps around the source and destination. The time may be estimated using historical records around the addresses provided. When such estimates are unavailable, an approximate time may be assumed, or direct user input may be used. In some implementations, quote monitor module 812 may be utilized for this purpose, and the user may be asked to provide data (either as an estimate, or for example, through a video recording that is processed by inventory generation module 806).

In some implementations, interactive quote generation module 808 may select a subset of objects for the service. For example, if the destination does not have a patio, any patio furniture at the source establishment may be removed from the moving service quote. Similarly, if during the interaction the service attribute of an inventory object is changed, for example, the user may request that appliances need to be moved, then the subset of the inventory items that is selected for service will be modified accordingly.

Interactive quote generation module 808 may combine inventory attributes based on shared attributes. For example, chairs that are similar and can be stacked may be combined to produce a smaller volume. Interactive quote generation module 808 block may use the weight and volume of different inventory objects selected for the service to estimate the labor costs of moving the objects through the establishment to the parking space and vice versa at the destination.

In some implementations, interactive quote generation module 808 may also estimate volume requirements that can be used for fleet and crew requirements by the service provider. Interactive quote generation module 808 may also flag certain voluminous objects (for example, beds, or large tables) that may need to be disassembled to reduce transportation cost. Interactive quote generation module 808 may detect bottlenecks in moving the objects out of the service establishment (or inside the destination when data is available). Interactive quote generation module 808 can use the attributes of the objects such as weight, volume, dimensions, value, quality, material, finish, fragility, etc. to provide a quote for labor requirements to disassemble and assemble the object.

In some implementations, interactive quote generation module 808 may use the clutter and packaging requirements of the inventory to estimate the packaging-unpackaging costs. For example, interactive quote generation module 808 may estimate costs for packaging material such as boxes, tape, and the labor requirements for packaging-unpackaging small objects (clutter), books, clothes, etc. In some implementations, interactive quote generation module 808 may also estimate the packaging-unpackaging requirements for fragile objects such as chinaware, glassware, flat screen television sets, glass top tables, mirrors, wall art, etc. This includes packaging material such as boxes, bubble-wrap, tape, etc. and the labor costs.

In some implementations interactive quote generation module 808 may use attributes such as value, quality, and fragility from the inventory as well as service data to offer insurance for protecting the objects such as expensive television sets, or wall decoration or painting, etc. during the service.

In some implementations, interactive quote generation module 808 may use attributes such as quality, value, etc. of the inventory objects that are not included in the moving service and offer junk removal service for these objects. Similarly, interactive quote generation module 808 may provide users access to reseller marketplace services. It may also provide an estimate of the selling price of similar objects in these marketplaces. As an alternative, interactive quote generation module 808 may provide means for donating the objects to charity organizations.

In some implementations, interactive quote generation module 808 may offer services that may be related to the primary service being requested. For example, interactive quote generation module 808 may estimate the cost of cleaning the source or destination establishment and provide the offers for this service. Similarly, a painting service may be offered at the source or destination of the move.

Interactive quote generation module 808 may estimate the requirements for material required for the services and offer these products such as boxes, tape, label-makers, etc. for moving or paints, brushes, putty, etc. for painting.

In some implementations, interactive quote generation module 808 may offer products and services that may be auxiliary to the primary service. For example, using the inventory attributes, such as object types, serve, location, material, finish, color, texture, model, make, material, brand, style, etc. and the service data such as number of bedrooms, number of floors, and other physical features of the establishment. Interactive quote generation module 808 may offer additional furniture, equipment, appliances, etc. at the destination. For example, if the refrigerator is not being moved, interactive quote generation module 808 may provide offers for refrigerators that match the style of other kitchen items that are being moved. In some implementations, if the move destination has a patio whereas the move source did not have a patio, interactive quote generation module 808 may use the inventory attributes such as style to provide offers for patio furniture that it may determine to be preferred by the user. Similarly, yard tools and storage for yard tools may be offered in such a scenario. In some implementations, if the move destination has additional bedrooms, interactive quote generation module 808 may use inventory attributes to offer beds that may match the color, style, finish, size, etc. of the beds at the source of the move. For example, if the source has more rooms, such as two separate rooms for children and the destination has one room for children, interactive quote generation module 808 may offer a bunk bed.

In some implementations, interactive quote generation module 808 may also provide offers for upgrading objects in the inventory using the attributes such as value, weight, material, quality, color, style, size, finish, etc. For example, if an inventory item has high volume and or/weight, and low value quality attributes, such as a large old refrigerator, then interactive quote generation module 808 can offer the user access to a reseller marketplace at the source location of the move, access to marketplace to buy an upgraded or higher quality refrigerator at the destination and save on the costs of moving the refrigerator. Interactive quote generation module 808 may use product offers for objects that are not present in the inventory, but are commonly used at the destination. For example, weather related products such as umbrellas, sun-screen, or outdoor activity related products such as a kayak, bicycle, or other outdoor equipment. In some implementations, interactive quote generation module 808 can also offer access to products and services at the destination such as homeowners' insurance or renter's insurance, or auto insurance using contextual data such as the user's inventory and service data.

In some implementations, interactive quote generation module 808 can offer services at the destination such as cleaning service, gardening service, auto maintenance and service, handyman, electrician and plumbing and repair services, etc. using the contextual information from the inventory and service data. For example, regular garden maintenance costs can be estimated using service data such as satellite view and historical pricing data for such services in the area. Similarly, offers for cellular service providers and internet and cable service providers can be made based on the quality and availability of user's existing service providers at the destination and contextual information. As another example, offers from local dealerships and auto repair shops for the type of vehicles in the inventory or provided by the service data can be provided to the user.

In some implementations, interactive quote generation module 808 can offer services such as gym memberships, transportation service passes, club memberships, classes, events and organization advertisements, restaurant coupons, etc. using contextual information from the inventory and the service data. For example, if the gym equipment is marked as not being moved, the user may be offered a gym membership at the destination. Similarly, interactive quote generation module 808 may use the service data and inventory to infer consumer interests such as indoor/outdoor sports, music and arts, food and drinks, cooking, children's activities, etc. and may provide consumer the offers of interest for these activities.

In some implementations, as shown in FIG. 8B, quote monitor module 812 obtains inputs from the user through consumer interaction module 812 and provides inputs to inventory generation module 806 and interactive quote generation module 808. Quote monitor block 812 also received as input inventory and inventory attributes generated by inventory generation module 806 and modifies the attributes of the inventory, and provides such modifications as input to the service data module 810. Quote monitor block 812 also processes the services, products and offers generated by the interactive quote generation module 808 and presents them to the user through the consumer interaction module 802.

In some implementations quote monitor 812 includes machine learning models or predictive models including AI algorithms for performing the following features. Improving the estimate of inventory attributes by observing the attribute values and requesting appropriate data from user. Creating inputs for consumer interaction module 802 such as presentation of follow up questions to the user, user directives instructing the user to input more descriptive data, setting of the quote qualifier input for inventory generation module 806. In some implementations, quote monitor module 812 may receive input from consumer interaction module 802 that is not directly related with generating the inventory. Quote monitor module 812 may provide inputs to the interactive quote generation module 808 to create services and products for the consumer. In some implementations quote monitor module provides inputs to service data module 810, and presents an interactive quote to the user. In some implementations, quote monitor module 812 may prioritize offers created by interactive quote generation module 808.

In some implementations, quote monitor module 812 may request the user to move to a new location and change a viewing angle of the camera on their device using the Inventory as an input. In some implementations, interactive quote generation module 808 may guide the user to this new location for multiple reasons. For example, if inventory generation module 806 determines that a large object is detected, the user may be guided to a different location to improve the estimates on the dimensions, material, weight, object type, density or other inventory attributes of the object. Similarly, a different location and view can be requested for determining brand, make, model, value, quality, and attributes of the object. If the object is determined to require disassembly the user may be requested to input descriptive data that is useful in estimating the volume of disassembled pieces. Another reason may be to ensure that the entire establishment is covered in the video and there are no occluded objects (for example filing cabinets behind desks, or a piece of furniture behind a curtain).

In some implementations, quote monitor module 812 may request user actions based on the inventory attributes. For example, if a wardrobe is detected, the AI algorithms may request the consumer to open the doors to improve the estimated packaging requirements. Similarly, if a cabinet is detected, quote monitor module 812 can request that the user to open the cabinet to improve the estimate for packing objects inside the cabinet.

In some implementations, quote monitor module 812 may request follow up questions from the user based on the inventory attributes. For example, if an object that may recline is detected (such as a reclining sofa), quote monitor module 812 may request a confirmation from the user. It can then modify the attribute value using the response from the user. As another example, if appliances such as washing machines, refrigerators, etc. are detected, quote monitor module 812 can ask the consumer if the appliances are to be moved.

In some implementations, quote monitor module 812 may change the Inventory attributes in response to inputs from the user or the Service Data module. For example, if the user selects a white glove service the packaging requirements attribute of Inventory may be increased.

In some implementations, quote monitor block 812 may request user feedback for inventory attributes with undetermined object type value, or where the confidence on the object type is low. Quote monitor block 812 may provide the user some likely choices on selecting the object types.

Quote monitor module 812 may move items of certain inventory attributes out of service using inputs from the service data module. As an example, if the service data indicates that the destination does not have a yard or a patio, quote monitor module 812 may remove yard tools, and patio furniture items from the moving service.

In some implementations, quote monitor module 812 may infer user interests based on the inventory. For example, if the user has books on cooking, the system may infer the user is interested in outdoor activities and may obtain responses from the user to prioritize the offers presented to the user. Quote monitor module 812 may also create service and product bundles from interactive quote data. For example, it may apply a discount on the service if the packaging material is bought from the service provider.

Quote monitor module 812 may also provide input to the interactive quote generation module 808 in order to change the subset of algorithms that need to be applied. For example, if the user chooses a white glove service, quote monitor module 812 may request the generation of inputs to the inventory generation module 806 to process the packaging and handling inputs and recreate the interactive quote produced by interactive quote generation module 808.

In some implementations, the one or more processors are further configured to determine a user directive based on the user input, the one or more inventory attributes, or the plurality of items in the inventory list. The user directive comprises an indication to change the descriptive data determined based on the user's location and camera angle, change the descriptive data based on the user directive, and determine an adjusted interactive quote based on the change in the descriptive data. In some implementations, quote monitor module 812 may direct the consumer interaction module to provide user cues through the use of UI elements, or voice, text, and haptic feedback (e.g., a vibration function of a smartphone), etc.

In some implementations, an AI algorithm may cause the asking of targeted questions based on images or videos sent by the user to perform further analysis (e.g., questions may relate to whether the cabinet is full or empty, whether the user can also send a video or picture after opening the cabinet, whether the cabinet is bolted to the floor, etc.). The AI algorithm may also ask for additional pictures or video. An AI algorithm may use answers to questions asked by a trained human agent to perform further analysis.

In some implementations, the targeted questions include user directives. In some implementations, the one or more processors are further configured to determine a user directive based on the user input, the one or more inventory attributes, or the plurality of items in the inventory list; wherein the user directive comprises an indication to change the descriptive data determined based on the user's location and camera angle.

For example, in some implementations, the descriptive data including the voice, video, image, or text data may not clearly show the items in the location. Accordingly, quote monitor 806 may generate a user directive that instructs the user to reacquire the descriptive data (i.e., perform another scan of the location) in order to generate more accurate quotes for services and products and other offers.

For example, in some implementations, quote monitor block 806 can receive input from consumer interaction module 802, inventory generation module 806, interactive quote module 808, and other service data related modules, and quote monitor module 812 can monitor the inventory list and direct consumer interaction module 802 to create a change in the user's location and camera angle. The change can be requested for improving the estimate of any of the attributes in the inventory for example if occlusion is detected in an image or video the user is directed to a newer location and to change the viewing angle to improve on included objects for volume estimation.

In some implementations consumer interaction module 802 may achieve the change by providing cues on a display, voice or haptic feedback via the user mobile device. In some implementations, quote monitor module 812 may receive input from the service data module 810 and inventory list from inventory generation module 806 to direct consumer input by issuing user directives. For example, if the distance to the closest parking space used for moving services is not available with high confidence, quote monitor module 812 can issue a user directive that can direct the consumer to provide input on the distance to the park space. The user may be directed to input video, voice, images, text and or other descriptive data. In some implementations, consumer interaction module 802 can request this input from the user using multiple means of such as voice, image, video, text. Quote monitor module 812 can also use consumer interaction module 802 to prompt user actions. For example, if the cabinet is found in the inventory the user may be asked to open the cabinet to improve estimates for packing. Quote monitor module 812 may direct consumer interaction module for user input to modify the contents of interactive quote. For example, if the destination does not have a patio or backyard, quote monitor module 812 may remove the marked patio item related costs from the interactive quote and request a confirmation from the consumer.

In some implementations quote monitor module 812 may receive input from consumer interaction module 802 and adjust inventory attributes. For example, if the consumer requests extra care for an item (e.g., an old plano) quote monitor module 812 can increase the fragility attributes of this object. Quote monitor module 812 may also observe the consumer input, service data, and inventory list and associated attributes of items of the list and suggest add-on services such as insurance, packaging for additional items. For example, quote monitor module 812 may detect an expensive TV, mirror, sculpture, or other fragile item, and can offer a packaging box to protect the TV, mirror, sculpture, or other fragile item during the move.

Example workflow may include location information (e.g., the from/source or to/destination address) may be taken as input either from the user or automatically by turning on location sensors in the phone or other device. This information may be combined with various sources of data (publicly available or otherwise) such as driving time, driving distance, number of floors in all locations, if any intermediate stop may be needed, the availability of a shared or dedicated elevator, or the distance of the walk from the home to the where the truck may be parked, or other regulatory information based on the location of the user. An itemized quote may be generated by combining the above information with the objects detected in the room or other location and thereby providing an accurate cost estimate for moving every single object or for additional services (disassembly, packing, etc.). The itemized quote may be provided to the consumer app (with the app working with a backend). The object detection algorithm may identify objects and their dimensions or may generate insightful options based on the detection (e.g., if a delicate piece of china is detected, the technology may suggest a packing service to the customer and the cost for packing while simultaneously comparing the time it may take the customer to pack it themselves). The technology may identify items that need assembly and disassembly and suggest it as options with the appropriate cost. The app may call a junk removal service for items that the customer does not want to have moved but would rather have it donated or discarded. The user may review the itemized quote and make necessary changes as desired. By way of non-limiting example, if the disassembly of a dining table adds too much cost, the user may remove that line item and the price may update in real-time. Once the quote looks good, the user may book the moving job from the app. Users or service providers may manually select items that the estimation algorithm has not discovered and label them (e.g., a chair that was partially occluded by a dining table). In case the object may be not detected, users may be able to draw a simple bounding box in the app which may then be sent to the backend for further processing to select the item. Users may add or remove items from the itemized quote in a similar fashion to how they may add or remove items to an online shopping cart or through a simple user interface such as swiping left to discard an item (that is not part of moving quote) and swiping right to add the item to the moving quote. Quote information (which could be an inventory list, cube sheet, etc., and may or may not contain price information) with relevant photos or videos extracted from the surveying process may be sent electronically to the mover's backend system for fulfillment.

There may be multiple concerns shoppers face when shopping for furniture. Aside from cost and comfort considerations which consumers may be able to experience when they visit a furniture showroom, there may be several considerations which may not be solved in a feasible way even with visiting a furniture shop. Considerations may include, "Will my new furniture fit my room?," "How well would it go with my existing items?," "Does the color match the overall decor?," or other considerations. The present disclosure may solve such problems using a combination of smartphone technology where the camera or sensor (IMU) information may be fused with techniques in computer vision or artificial intelligence.

In some implementations, a workflow may include a user launching an app or another messaging channel (SMS, MMS, Facebook Messenger, web browser, etc.) on one or more of a smartphone, tablet, or other devices and scanning their room(s) or other locations. The app may collect one or more camera frames, IMU data, or other data. An AI algorithm (or deep neural network) trained for object identification may be used to identify objects (furniture, lamps, or other items) in the room, or to estimate the dimensions or volume of the objects. Such a technique may combine artificial intelligence techniques such as a deep neural network or sensor (IMU) data to generate an accurate identification of the object, including the object's size or weight. Users may be able to tap on objects detected by the detection algorithm they want replaced. In case the object may be not detected, users may be able to draw a simple bounding box in the app which may then be sent to the backend for further processing to select the item. The algorithm may automatically match the item size with a similar item of a similar size. Users may then add preference of selection of one or more of color, material, fabric, or other preferences. The app working with a backend may suggest recommended items based on one or more of size, type or other aspects of an item chosen or on how well the recommended item matches with other items or paint color in the room. An AI algorithm may ask targeted questions based on images/videos sent by the user to perform further analysis (e.g., asking the user to take a picture from a different angle etc.). An item may be then displayed on the screen superimposed on the actual image with the correct dimensions. To choose a single item, the user may want the AI to completely redecorate the house or other location. In that case, the AI with knowledge of existing items, their relative location, or other surrounding information (e.g., accessories, wall color, or other surroundings) may recommend items or lay the items out in a virtual pattern for display to the user via a user interface on the smartphone screen. The users may be given a choice to purchase one or more items directly from the smartphone or other device. The app may sell leads to furniture suppliers to promote their products in relevant spaces. This may grow into an automated advertising network where the bidding process may be started by an algorithm determining a category of product that would be useful to the consumer (e.g., leather sofa etc.), then auctioning off ad real estate to the highest bidder in the category.

Currently, the process of obtaining a renter's insurance, homeowner's insurance, homeowner's warranty, or hazard insurance quote may depend on the value of the user's individual possessions. The process of getting a quote may rely on users calling the insurance company and describing their possessions. The present disclosure describes an automated way for users to obtain insurance quotes, save their data, or automatically verify with insurance companies in case of loss.

In some implementations, the workflow may include the following. A user may launch an app or another messaging channel (SMS, MMS, Facebook Messenger, web browser, etc.) on a smartphone, tablet or other device and scan their room(s) or other location(s). The app may collect camera frames, IMU data, or other data. An AI algorithm (or deep neural network) trained for object identification may be used to identify objects in the room, or to estimate the dimensions or volume of the objects. To identify items, the object detection technology may be able to identify auxiliary information such as the brand of item or its estimated cost. The app working with a backend may generate an itemized list of objects that the user owns (or possesses). The user may be able to select items the object detection technology may not be able to detect on the app by drawing a simple bounding box or annotating the object with the correct label (e.g., TV, speakers, or other objects). The app may ask for further information (e.g., brand, year of purchase, or other information). An AI algorithm may ask targeted questions based on images/videos sent by the user to perform further analysis. Once the user is sufficiently satisfied, the list may be sent to different insurance companies to get a competitive quote. The data for the user may be saved until it needs to be updated or a claim event happens. In case of a claim event, the claim may be verified, or users may be paid automatically based on the list of items in their possession as verified by the app. In some implementations, the claim verification process may be performed in the app using visual or audio inspection trained by deep neural nets. Additional descriptions of aspects of the present systems and methods related to insurance are described below (e.g., related to FIG. 15+).

Figure 9:
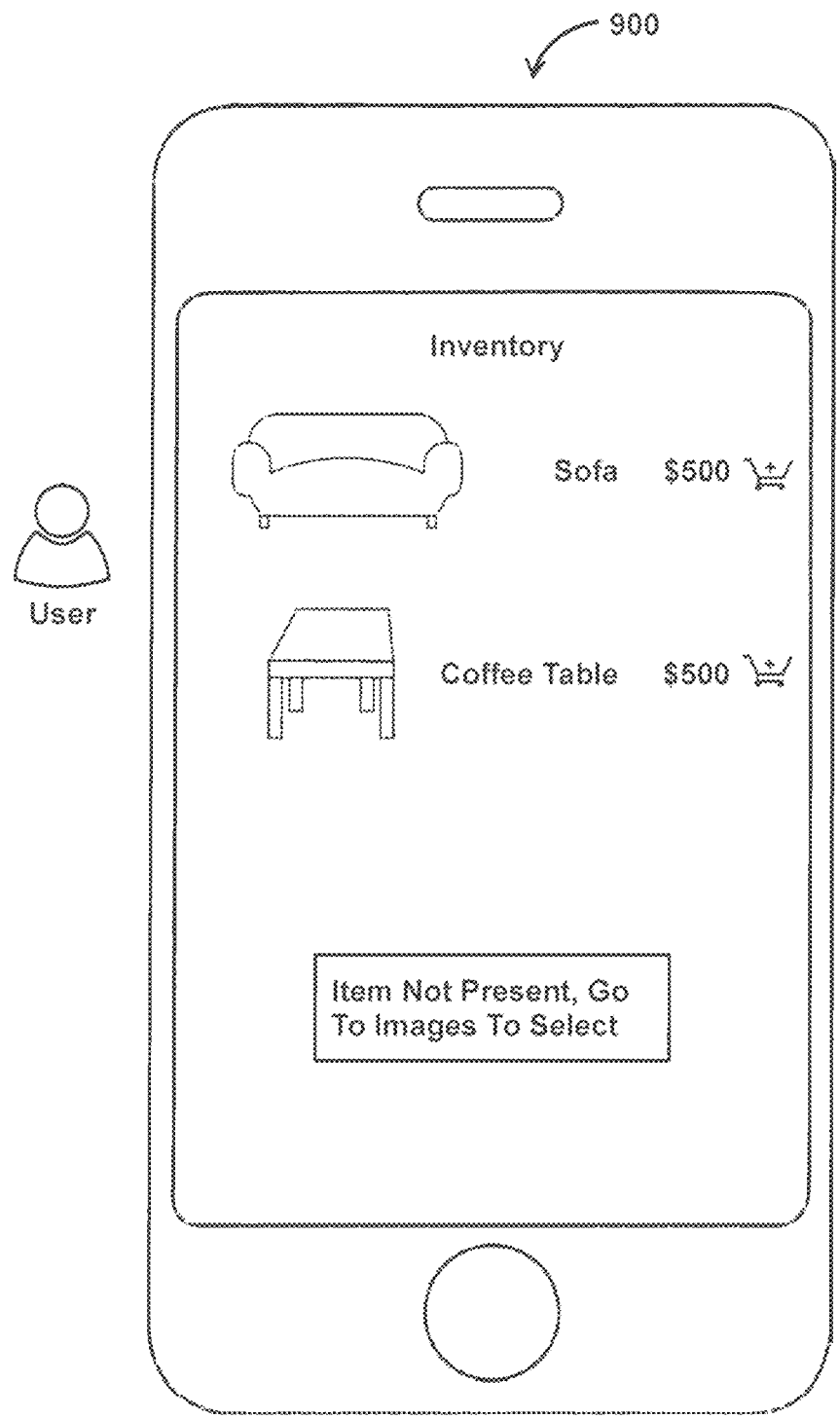
FIG. 9 illustrates user additions to cart, in accordance with one or more implementations.

FIG. 9 illustrates a device 900 showing user additions to a cart, in accordance with one or more implementations. The inventory or cost may be shown to the user. The user may add the needed items to cart (e.g., items needed to move, walls needed to be painted, or other items). The user may be given a choice of items that may be missing. The user may go back to the original image and draw a simple bounding box to highlight items which are to be added back to the cart.

Figure 10:
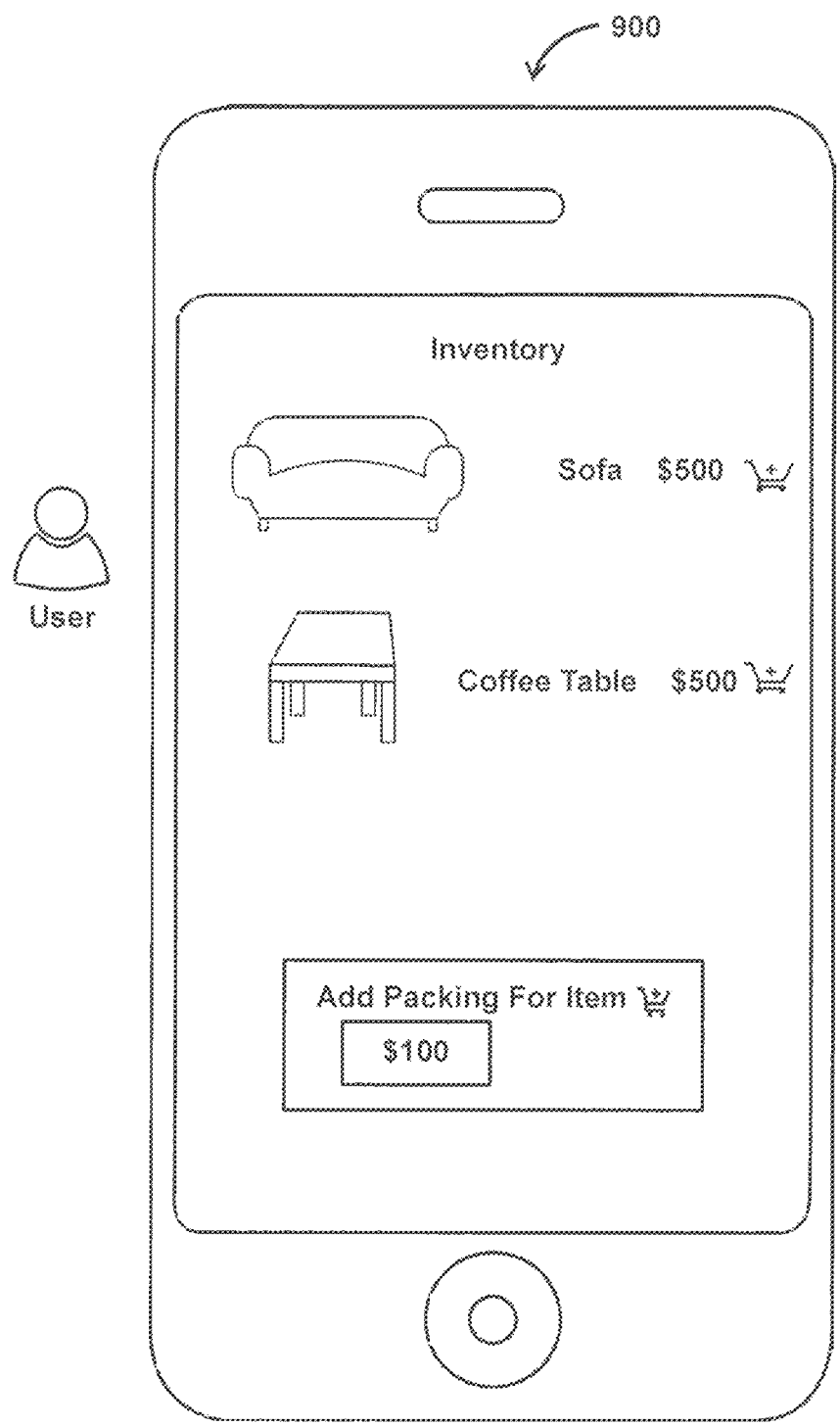
FIG. 10 illustrates additional services, in accordance with one or more implementations.

FIG. 10 illustrates the device 900 showing additional services, in accordance with one or more implementations. When a user adds an item to the cart, auxiliary services may pop up (e.g., a prompt to package the item or cost where the cost is dependent on the item, detection algorithm, premium quality paint, multiple coats needed, or other services).

Figure 11:
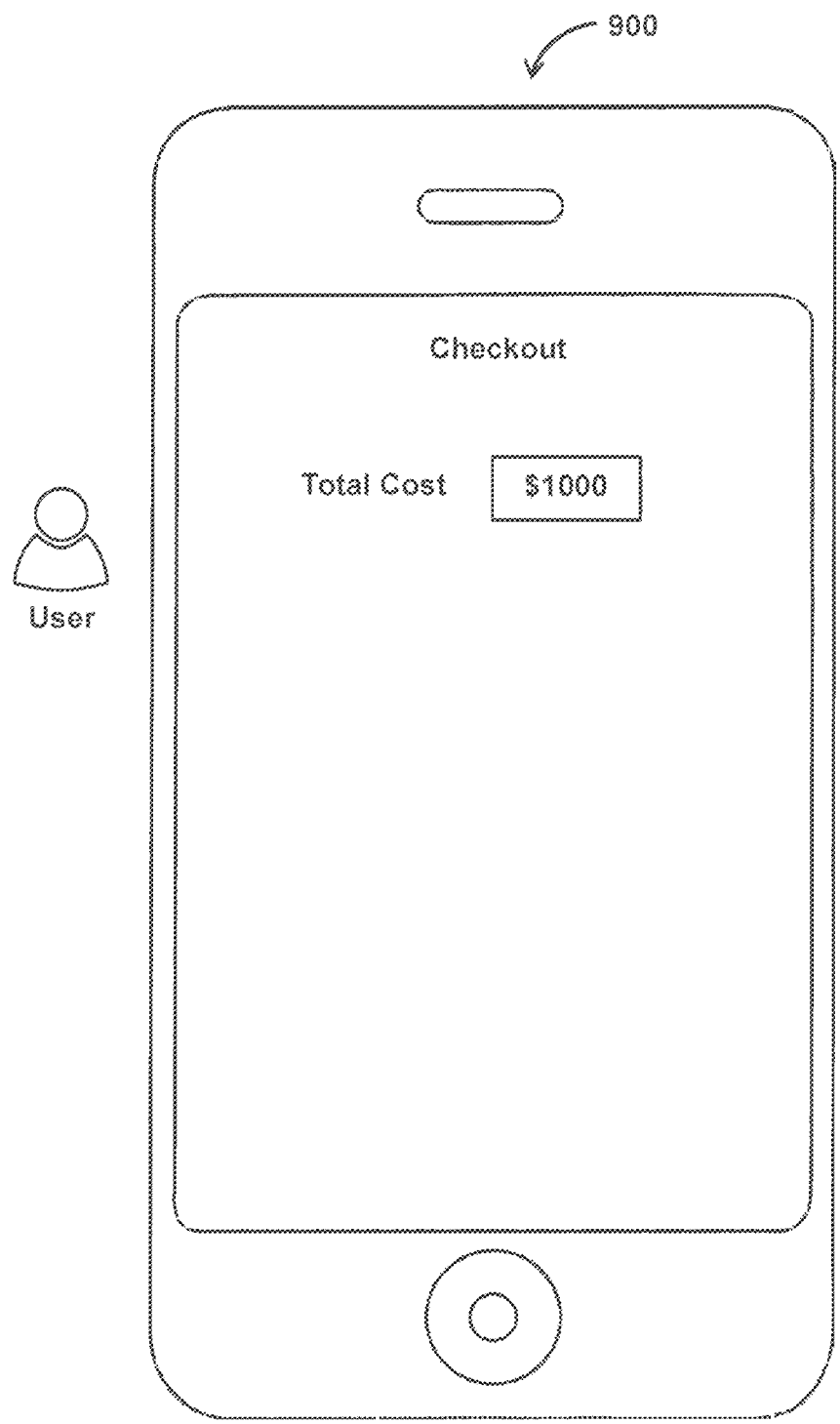
FIG. 11 illustrates a completed transaction, in accordance with one or more implementations.

FIG. 11 illustrates the device 900 showing a completed transaction, in accordance with one or more implementations. The user may pay for the needed services in the app. The information may be transmitted to the service provider.

Figure 12:
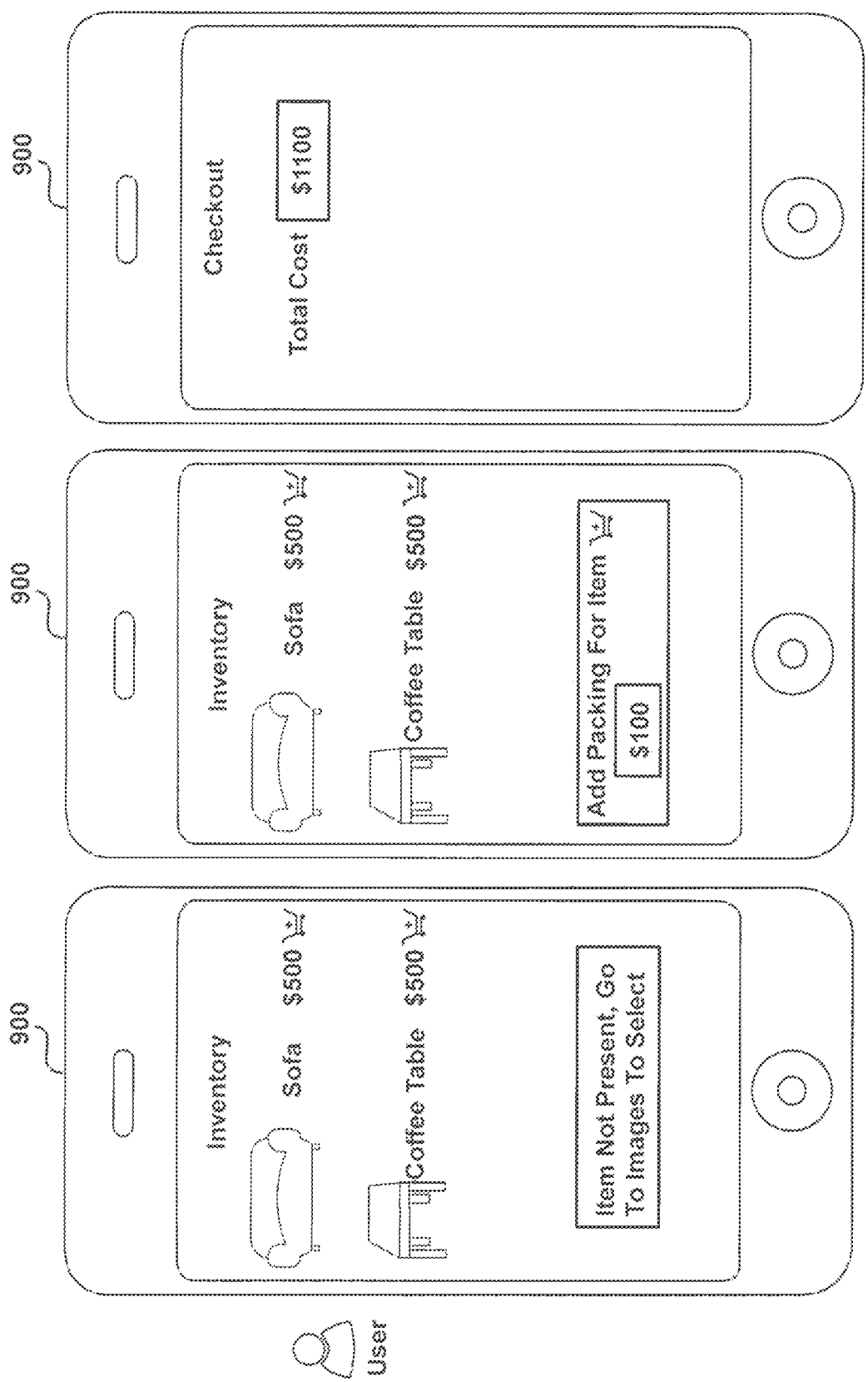
FIG. 12 illustrates providing AI-based cost estimates for services, in accordance with one or more implementations.

FIG. 12 illustrates providing AI-based cost estimates for services, in accordance with one or more implementations.

Figure 13:
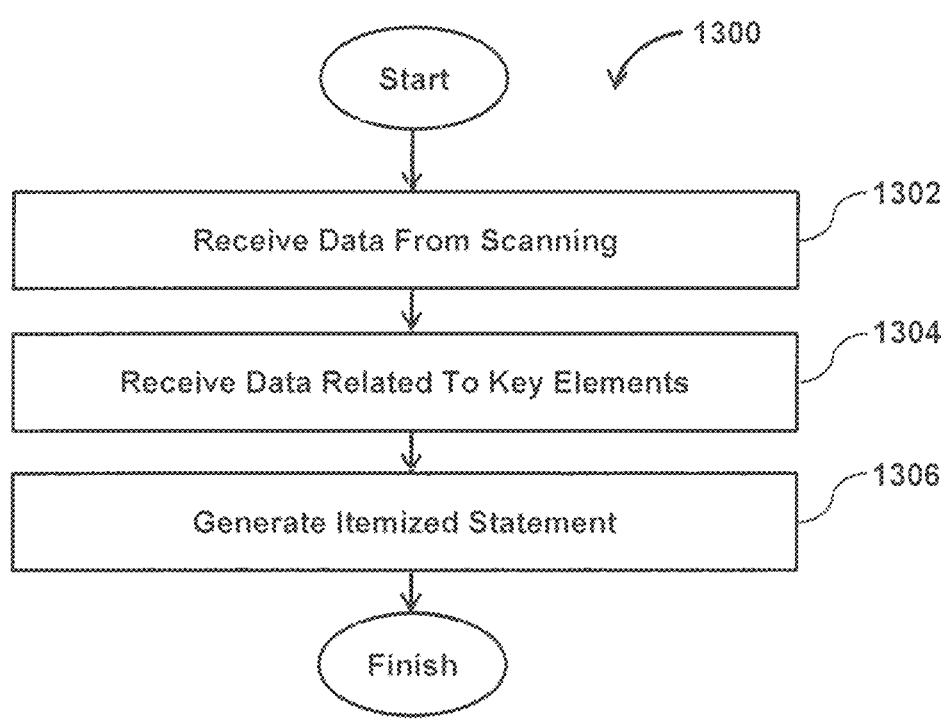
FIG. 13 illustrates a method for providing AI-based cost estimates for services, in accordance with one or more implementations.

FIG. 13 illustrates a method 1300 for providing AI-based cost estimates for services, in accordance with one or more implementations. The operations of method 1300 presented below are intended to be illustrative. In some implementations, method 1300 may be accomplished with one or more additional operations not described, or without one or more of the operations discussed. Additionally, the order in which the operations of method 1300 are illustrated in FIG. 13 and described below is not intended to be limiting.

In some implementations, method 1300 may be implemented in one or more processing devices (e.g., a digital processor, an analog processor, a digital circuit designed to process information, an analog circuit designed to process information, a state machine, or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, or software to be specifically designed for execution of one or more of the operations of method 300.

At an operation 1302, data from a scanning of a location may be received, at one or more hardware processors. The scanning may be performed by one or more of a camera, a computer vision device, an inertial measurement unit, or a depth sensor. Operation 1302 may be performed by one or more hardware processors configured to execute a machine-readable instruction component that is the same as or similar to receiving scanned data component 108 (as described in connection with FIG. 1), in accordance with one or more implementations.

At an operation 1304, data may be received, at one or more hardware processors, related to the identification of one or more key elements at the location. Operation 1304 may be performed by one or more hardware processors configured to execute a machine-readable instruction component that is the same as or similar to receiving key element data component 110 (as described in connection with FIG. 1), in accordance with one or more implementations.

At an operation 1306, an itemized statement and quote of work to be performed may be generated at one or more processors. Operation 1306 may include generating an insurance quote for example, determining which objects at a location are insured/uninsured or covered/not covered in response to a claim, or other insurance related operations. Operation 1306 may be performed by one or more hardware processors configured to execute a machine-readable instruction component that is the same as or similar to generate statement component 112 (as described in connection with FIG. 1), in accordance with one or more implementations.

Figure 14:
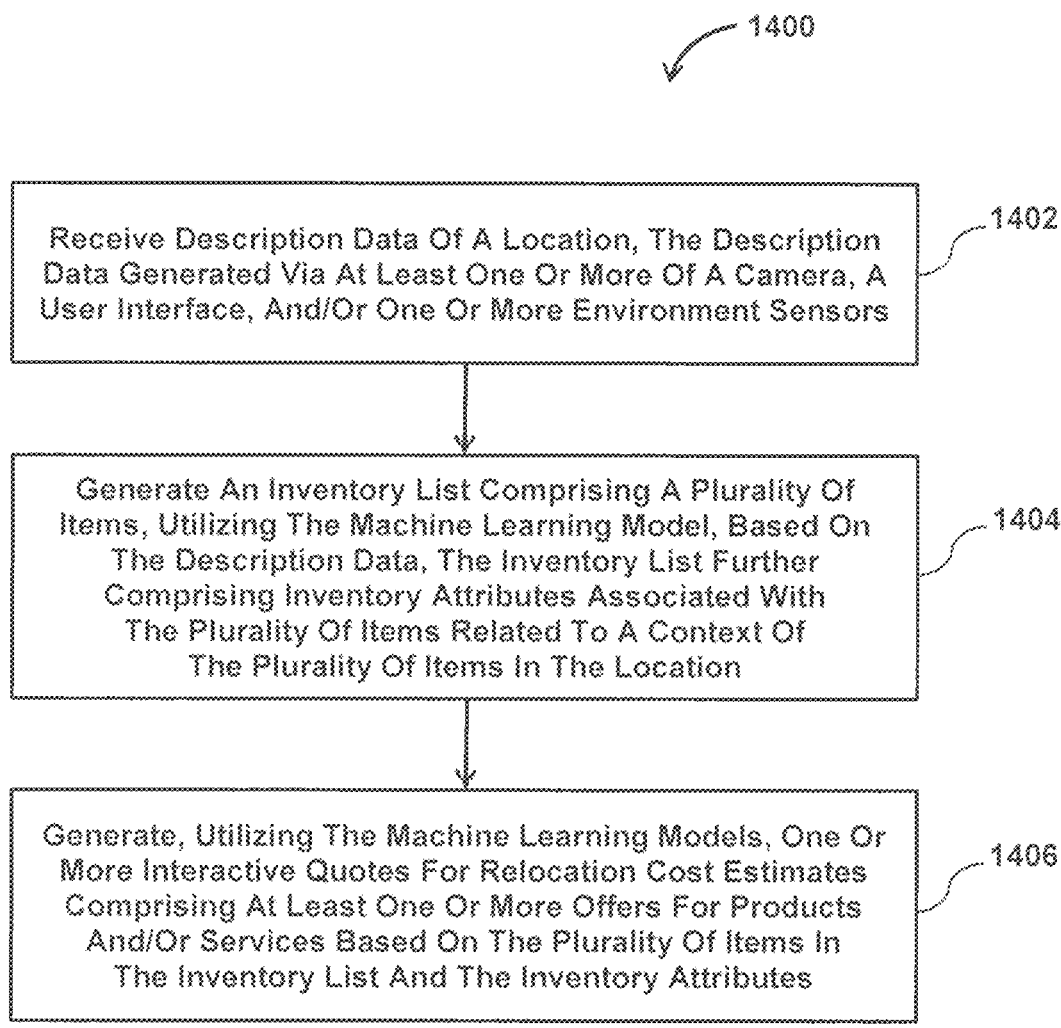
FIG. 14 illustrates a method for providing AI-based relocation cost estimates for services and products, in accordance with one or more implementations.

FIG. 14 illustrates a method 1400 for providing AI-based cost estimates for services, in accordance with one or more implementations. The operations of method 1400 presented below are intended to be illustrative. In some implementations, method 1400 may be accomplished with one or more additional operations not described, or without one or more of the operations discussed. Additionally, the order in which the operations of method 1400 are illustrated in FIG. 14 and described below is not intended to be limiting.

In some implementations, method 1400 may be implemented in one or more processing devices (e.g., a digital processor, an analog processor, a digital circuit designed to process information, an analog circuit designed to process information, a state machine, or other mechanisms for electronically processing information). The one or more processing devices may include one or more devices executing some or all of the operations of method 1400 in response to instructions stored electronically on an electronic storage medium. The one or more processing devices may include one or more devices configured through hardware, firmware, or software to be specifically designed for execution of one or more of the operations of method 1400.

At an operation 1402, method 1400 may start and receive description data of a location, the description data generated via at least one or more of a camera, a user interface, or one or more environment sensors. Operation 1402 may be performed by one or more hardware processors configured to execute a machine-readable instruction component that is the same as or similar to receiving scanned data component 108 (as described in connection with FIG. 1), in accordance with one or more implementations.

At an operation 1404, method 1400 generates an inventory list comprising a plurality of items, utilizing the machine learning model, based on the description data, the inventory list further comprising inventory attributes associated with the plurality of items related to a context of the plurality of items in the location. Operation 1404 may be performed by one or more hardware processors configured to execute a machine-readable instruction component that is the same as or similar to receiving key element data component 110 (as described in connection with FIG. 1), in accordance with one or more implementations.

At an operation 1406, method 1400 generates, utilizing the machine learning models, one or more interactive quotes for relocation cost estimates comprising at least one or more offers for products or services based on the plurality of items in the inventory list and the inventory attributes. Operation 1406 may be performed by one or more hardware processors configured to execute a machine-readable instruction component that is the same as or similar to generate statement component 112 (as described in connection with FIG. 1), in accordance with one or more implementations.

Insurance Underwriting

The process of getting a property insurance quote (premium) today is currently based on information filed via online forms. Insurance companies primarily use the consumer inputted text data from online forms to provide a quote for property insurance and for insurance underwriting. To complete the underwriting, the insurance companies have to make assumptions on various factors; for example, what type of content the consumer owns, its value, type of structure that is found at a location, and its condition, among several other factors. It is desirable to get more accurate data on the objects a user intends to insure, the structure and layout of a location, as well as other factors (e.g., the location is on a canyon or subject to other natural hazards) in an automated fashion which would let insurance companies underwrite policies with a more accurate risk profile as well as save costs by not having to send an onsite inspector.

In order to provide an accurate representation of risk, the present systems and methods are configured to consider the following factors or other factors: inventory of items (e.g., the objects detected by the present system or identified by the user) inside a location (e.g., a home) and outside the location, value of the inventory, age or condition of the inventory (e.g., used, broken, worn, etc.), the brand, serial number, type of material the inventory is made of, and exterior condition of a location, type and condition of a roof, walls, etc., a location of the property, identified hazards or other conditions associated with a location such as a flood zone, a location on a canyon, proximity to brush, a tree hanging over the roof, a tree touching the roof, multiple stories, etc., an interior condition of a location including a condition of walls, ceilings, etc., interior hazards or other conditions such as a set of stairs with no handrails, etc.

The present systems and methods may be configured to provide an insurance quote by analyzing the above parameters through a combination of expert human knowledge and computer vision (e.g., the machine learning, or other AI algorithms described herein), enabled by cameras and IMUs available on a user's mobile device (e.g., user computer platforms 104 shown in FIG. 1), for example.

As a brief summary example, a consumer (or a representative of an insurance company) may launch an app (web app or native) on their smartphone to take pictures and quick videos of the interior and exterior of a home. The photos and videos may be time-stamped, geo-stamped (e.g., with latitude/longitude), device stamped (e.g., with device details including device model, operating system, IP address, browser information, etc. of the device generating the information) and user stamped (e.g., user profile details such as name, address, phone number, email address, etc.). Other accessorial details may be captured through voice or text via the smartphone, for example.

In some implementations, one or more processors (e.g., the computer vision, machine learning, or other AI technology detailed in the description herein) uses these videos and pictures to: create a unique inventory of the objects (e.g., furniture, appliances, walls, roof, doors, windows, etc.) inside and outside a location (e.g., a home) after performing duplicate detection; estimate the value of the detected inventory, taking brand name into consideration as well as risk assessment based on exterior attributes; and estimate the premium, fair market value of contents and replacement market value of contents. The above information can be combined with historical information for neighborhoods (e.g., zip codes, square footage of other locations, prior natural disasters in the area, etc.—obtained from external resources 124 shown in FIG. 1 for example) to adjust the premium.

The present systems and methods may be configured to present the analysis to a desk underwriter for adjustment. The desk underwriter may follow up with the user (consumer) for additional information to make adjustments for the premium estimation. Upon successful underwriting, the information can be fed back to a machine learning model/algorithm that can refine an insurance premium estimation for future premiums. The output of the underwriting process can also be used to estimate Fair Market Value (FMV) and Replacement Market Value (RMV) for contents in the case a claim is made in the future, for example.

Figure 15:
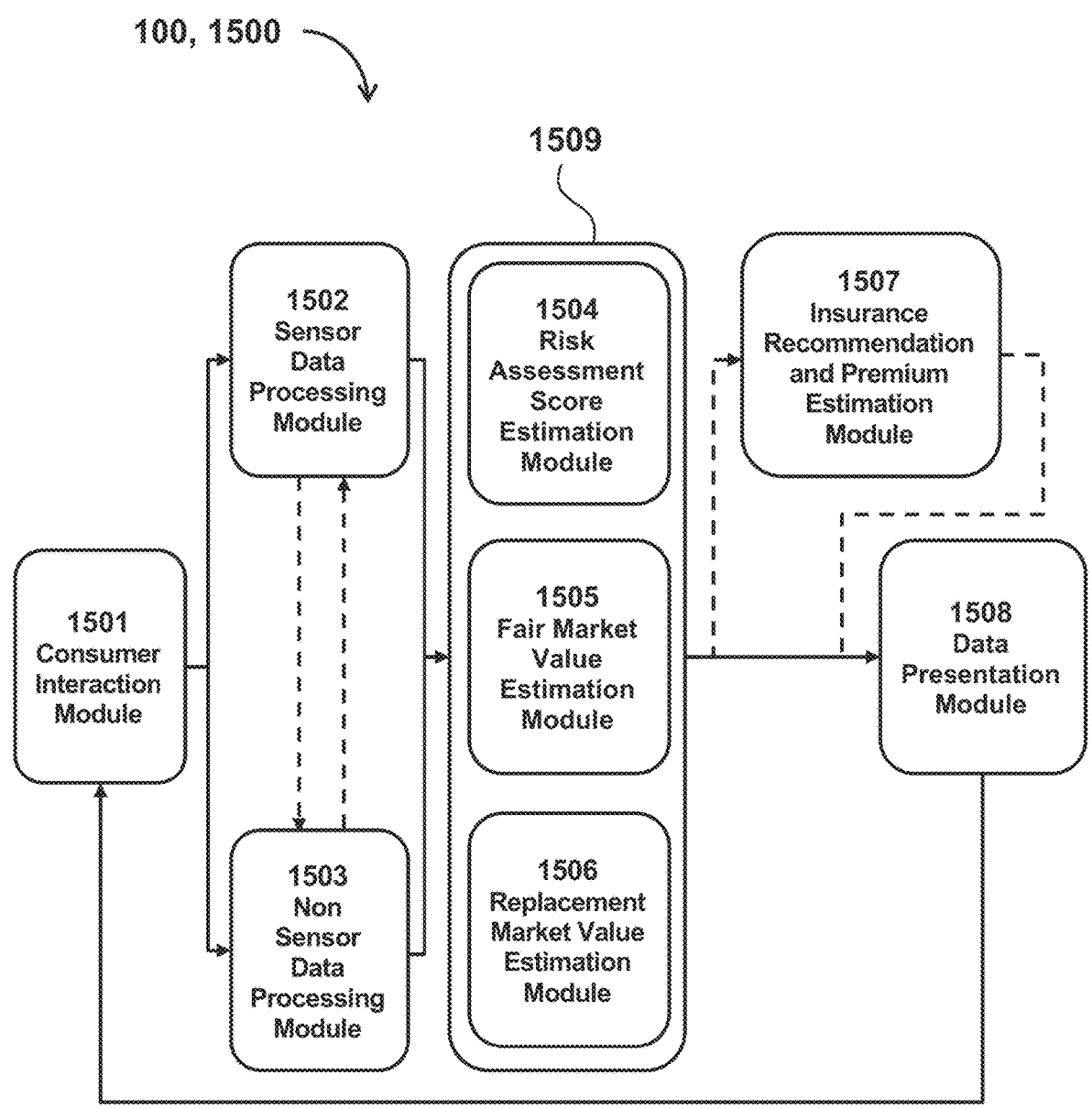
FIG. 15 illustrates an example embodiment of the present systems and methods configured for insurance underwriting, in accordance with one or more implementations.

FIG. 15 illustrates an example embodiment 1500 of the present system 100 (and method) configured for insurance underwriting. System 100 is configured for providing insurance underwriting estimates utilizing a machine learning model/algorithm. System 100 may comprise one or more hardware processors (e.g., processors 128 shown in FIG. 1) configured by machine-readable instructions (e.g., 106 shown in FIG. 1) to perform various insurance underwriting operations. Machine-readable instructions 106 may include various components (e.g., modules 108, 110, 112, etc. shown in FIG. 1). These components may include various modules or other components. The modules may include programmed instructions or code, instructions stored on a storage medium, or other components configured to facilitate the operations described below.

In some implementations, the one or more processors may be configured to receive description data of a location. The description data may be generated via at least one of a camera (e.g., included in a user computing platform 104), a user interface (e.g., presented by a user computing platform 104), an environment sensor (e.g., a microphone, etc. included in a user computing platform 104, or other sensors not included in a user computing platform such as weather sensors, etc.), an external location information database (e.g., as described related to component 108 and in other paragraphs herein), or other sources. The description data may comprise one or more media types, the media types comprising at least one or more of video data, image data, audio data, text data, user interface/display data, or sensor data. Receiving description data may comprise receiving sensor data from the one or more environment sensors. The one or more environment sensors may comprise at least one of a GPS, an accelerometer, a gyroscope, a barometer, a microphone, or other sensors. In some implementations, sensor data may be captured by a mobile computing device associated with a user or estimator (e.g., a first user computing platform 104 associated with a user (consumer) or a second user computing platform 104 associated with an estimator) and transmitted to the one or more processors with or without user or estimator interaction.

In some implementations, the description data may be time stamped, geo stamped, or user stamped. Time stamps are useful for creating a chronological history of user interaction. Geo stamps are useful for verifying the user address. User stamps are useful for grouping data for users and verifying the user identity.

The one or more processors may be configured to generate an inventory list comprising a plurality of items (e.g., objects) in or around the location, utilizing the machine learning model, based on the description data. The plurality of items may comprise one or more of a piece of furniture, an appliance, carpet, a wall, a roof, a window, a floor, or other objects. The inventory list may comprise inventory attributes associated with the plurality of items related to a context of the plurality of items in the location. This may be performed substantially as described above related to moving for example.

In some implementations, generating the inventory list comprises determining the one or more inventory attributes. The inventory attributes may comprise one or more of locations of the items (e.g., objects) in or around the location, a quality of items in or around the location, brand names of the items in or around the location, dimensions of the items in or around the location, values of the items in or around the location, an age of the items in or around the location, a damage level associated with the items in or around the location, or other information.

The one or more processors may be configured to determine, utilizing the machine learning model, based on the description data, interior or exterior condition information for the location. The interior or exterior condition information may describe a quality of structural components of the location or hazards in or around the location, or other information. In some implementations, the interior or exterior condition information comprises a description of a geographical position of the location relative to potential natural hazards (e.g., edge of a canyon, near brush or forest that may burn, in a flood zone, in an earthquake zone, etc.). The description of the geographical position of the location relative to potential natural hazards may be determined at least in part based on information from the external location information database (e.g., that is included in external resources 124 shown in FIG. 1). For example, the external location information database may comprise a mapping database.

The one or more processors may generate, utilizing the machine learning model, based on the inventory list and the interior or exterior condition information, one or more insurance underwriting estimates for insuring the location. Generating the one or more insurance underwriting estimates utilizing the machine learning model may comprise causing a neural network to determine the one or more insurance underwriting estimates using at least one or more of the inventory attributes, the quality of structural components of the location, and the hazards in or around the location as inputs for the neural network. This may also or instead include using other learning algorithms like random forest, etc., which may work in combination with a neural network as an ensemble machine learning model. In some implementations, generating the one or more insurance underwriting estimates utilizing the machine learning model may comprise causing a neural network to determine the one or more insurance underwriting estimates using at least one or more of the inventory attributes, the quality of structural components of the location, and the hazards in or around the location as inputs for the neural network. In some implementations, generating the one or more insurance underwriting estimates for insuring the location comprises determining a risk level for the location, a fair market value for the items in the inventory list, a replacement market value for the items in the inventory list, or other information.

In some implementations, the one or more hardware processors (e.g., processors 128) may be further configured to receive adjustments to a given insurance underwriting estimate, and use the adjustments and corresponding inventory attributes, quality of structural components of the location, or hazards in or around the location, as input to (1) update the one or more insurance underwriting estimates, or (2) retrain the neural network. In some implementations, the one or more hardware processors may be configured such that a user or an estimator can adjust the description data, the inventory list, the interior or exterior condition information, the insurance underwriting estimates, or other information (e.g., via a user computing platform 104 associated with a user or an adjuster).

Looking at FIG. 15, a goal of the present system is to collect relevant information for underwriting an estate based on sensor or non-sensor data (e.g., from the consumer interaction module, the sensor data processing module and the non-sensor data processing module shown in blocks 1501, 1502, and 1503) to estimate a risk assessment score (with a risk assessment score estimation module shown in block 1504), a fair market value (block 1505), and replacement market value of the estate (block 1506), as well as recommend whether to insure or not insure the estate and estimate a premium for the estate (block 1507). Collectively, blocks 1504-1506 may form an underwriting estimations module 1509, for example.

Relevant insurance information that could be identified through sensor data in block 1502 could include, but is not limited to, items detected at the location and features that describe the location. The present system is agnostic to interior/exterior context differences. Both contexts can take advantage of sensor and non-sensor data processing to aid in the underwriting process.

Relevant insurance information that could be retrieved or looked up (e.g., obtained) from a database or third-party source (e.g., external resources 124 shown in FIG. 1) in block 1503 could include, but is not limited to, potential surrounding environmental or societal risks for the location, as well as previous work or damage done to the location. Relevant insurance information discovered through sensor data processing can be used to enhance the relevant insurance information gathered via lookup/retrieval in non-sensor data processing and vice versa, for example.

An (e.g., AI or other machine learning) algorithm, such as a neural network, may be used for estimating a location's risk assessment score in block 1504, fair market value in block 1506, and replacement market value in block 1507, as well as for recommending whether to insure or not insure and estimating the insurance premium in block 1508.

In some implementations, the consumer interaction module (shown in block 1501) may be part of, or control an app on the user end (e.g., running on a user computing platform 104) that is used to collect data and present processed results. The sensor data processing module (shown in block 1502) may be configured to process sensor data and generate a list of detected items/inventory (objects) as well as a list of detected features/conditions/hazards relevant to underwriting. The non-sensor data processing module (shown in block 1503) may be configured to processes non-sensor data to assist in underwriting or to retrieve/lookup other relevant information to underwriting. The risk assessment score estimation module (shown in block 1504) may be configured to use relevant sensor and non-sensor processing results to estimate the risk assessment score of the collective property (e.g., items/objects, structural features, etc.) detected in and described by the input description data. The fair market value estimation module (shown in block 1505) may be configured to use relevant sensor and non-sensor processing results to estimate the fair market value of the collective property (e.g., the collection of items/objects, structures, etc.) detected in and described by the input description data. The replacement market value estimation module (shown in block 1506) may be configured to use relevant sensor and non-sensor processing results to estimate the replacement market value of the collective property detected in and described by the input description data. The insurance recommendation and premium estimation module (shown in block 1507) may be configured to receive the risk assessment score, fair market value, and replacement market value estimates, and recommend whether to insure or not insure, as well as estimate a premium for the collective property detected in and described by the input description data. The data presentation module (shown in block 1508) may be configured to summarize output across the data. This output can include, but is not limited to, a set of images/3D model with AI results, as well as an insurance recommendation, premium estimation, risk assessment score estimation, fair market value estimation, replacement market value estimation, or other information.

It is to be understood that the recitation of individual modules is not intended to be limiting. As described above, the modules may be formed by the one or more processors, or portions of the one or more processors. In some implementations, some or all of the recited modules may or may not be used, may be included with other modules, etc.

Figure 16:
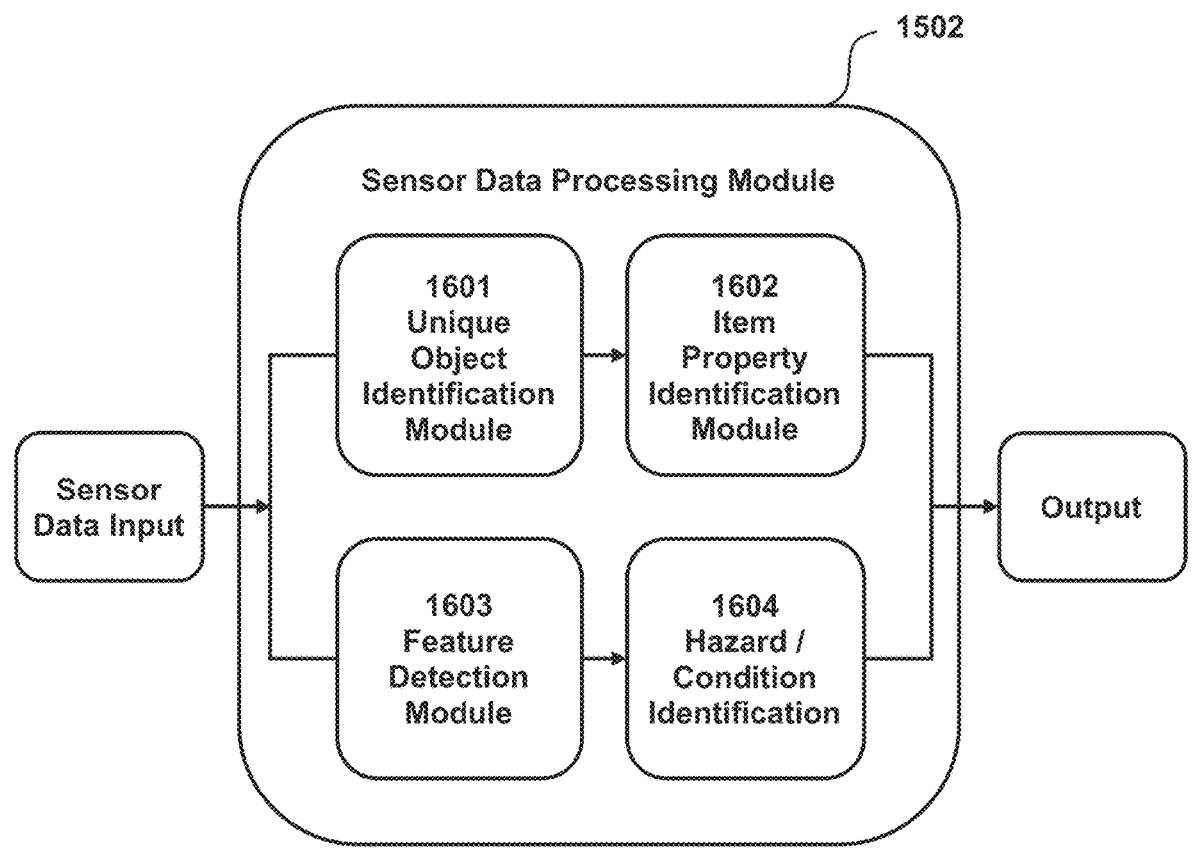
FIG. 16 illustrates an example of a sensor data processing module of the present system, in accordance with one or more implementations.

FIG. 16 illustrates an example of the sensor data processing module 1502. Description data (e.g., generated by one or more sensors as described herein) may be used to identify unique items (block 1601) for compiling an inventory of items (objects) and their attributes (properties —block 1602). It is also used to detect features of the location (block 1603) that could indicate potential hazards or conditions (block 1604).

The unique object identification module (shown in block 1601) may be configured to uniquely identify items/objects in the sensor data such that detections are associated correctly (e.g., the same television is detected twice) and spurious detections are removed (e.g., only one television is identified, not two in this example). The item property identification module (shown in block 1602) may be configured to identify various attributes/properties of the items to compile a detailed inventory for a location. The feature detection module (shown in block 1603) may be configured to features that indicate hazards or conditions for a location. The hazard/condition identification module (shown in block 1604) may be configured to identify hazards or conditions affecting a location based on the features detected that are relevant to underwriting or future claims.

Figure 17:
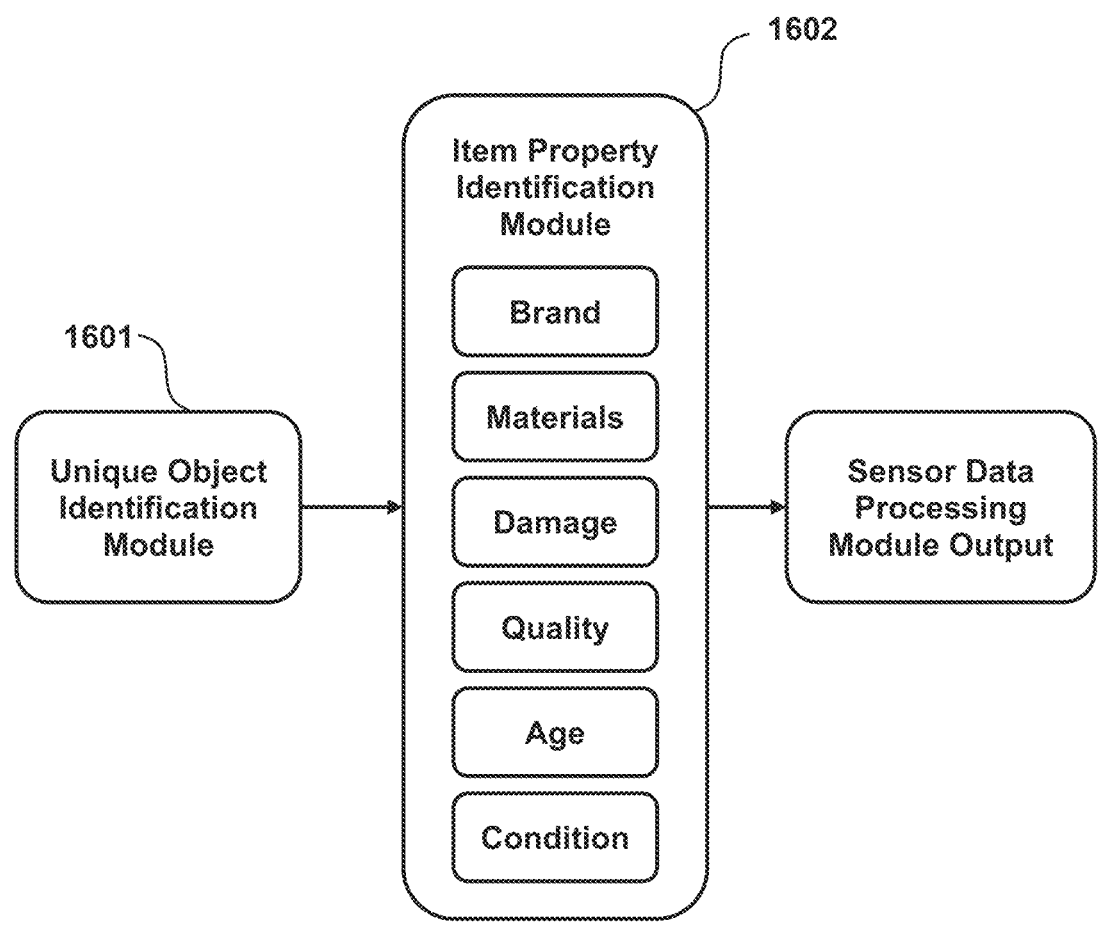
FIG. 17 illustrates an item property identification module of the present system, in accordance with one or more implementations.

FIG. 17 illustrates aspects of the item property identification module (block 1602). The item (object) attributes/properties that can be detected/identified/estimated by the item property identification module can include, but are not limited to, brand, materials, damage, quality, age, condition, etc. One method for detecting the materials comprising an item could be detecting the various textures of the item and inferring what the materials are based on these textures. Such detection may be done using object detection, semantic segmentation, or instance segmentation. Materials that could be detected include, but are not limited to, plastic, wood, metal, fabric, leather, concrete, glass, ceramic, rubber, foam, clay, and stone.

Brand detection may be done using methods such as object detection and instance segmentation for detecting the brand's symbol/icon. Image classification could also be used to identify the brand of an item for brands that have distinct visual styles. Brand detection could also be improved by feeding the item's detected materials as extra input to the detector/classifier as some brands may use a distinct combination of materials.

Damage detection may be done using methods such as image classification, object detection, and instance segmentation. This detection could detect the type of damage as well as estimate the severity of the damage relative to damage of this type. For the case of object detection, the annotation needed for this type of data would be similar to standard object detection where the input data is a bounding box and the expected output data is a label describing the type of damage, as well as a decimal value indicating how severe the damage is relative to all damage. Damage that could be detected includes, but is not limited to, dents, scratches, weathering, rust, cracks, cuts, chips, and warping.

Quality estimation may be done using image classification, or by using the results from brand and material detection to estimate the quality with a learning algorithm, such as a neural network. Age estimation may be done using image classification, or by using the results from brand, material, and damage detection to estimate the age with a learning algorithm, such as a neural network. Condition estimation could be done using image classification, or by using the results from damage detection with a learning algorithm, such as a neural network. Reverse image search may also be used to retrieve information from an image database for items similar or the same as the detected item. This retrieved information could include other properties, such as the item's cost, which could be used to help estimate values such as the replacement market value.

Figure 18:
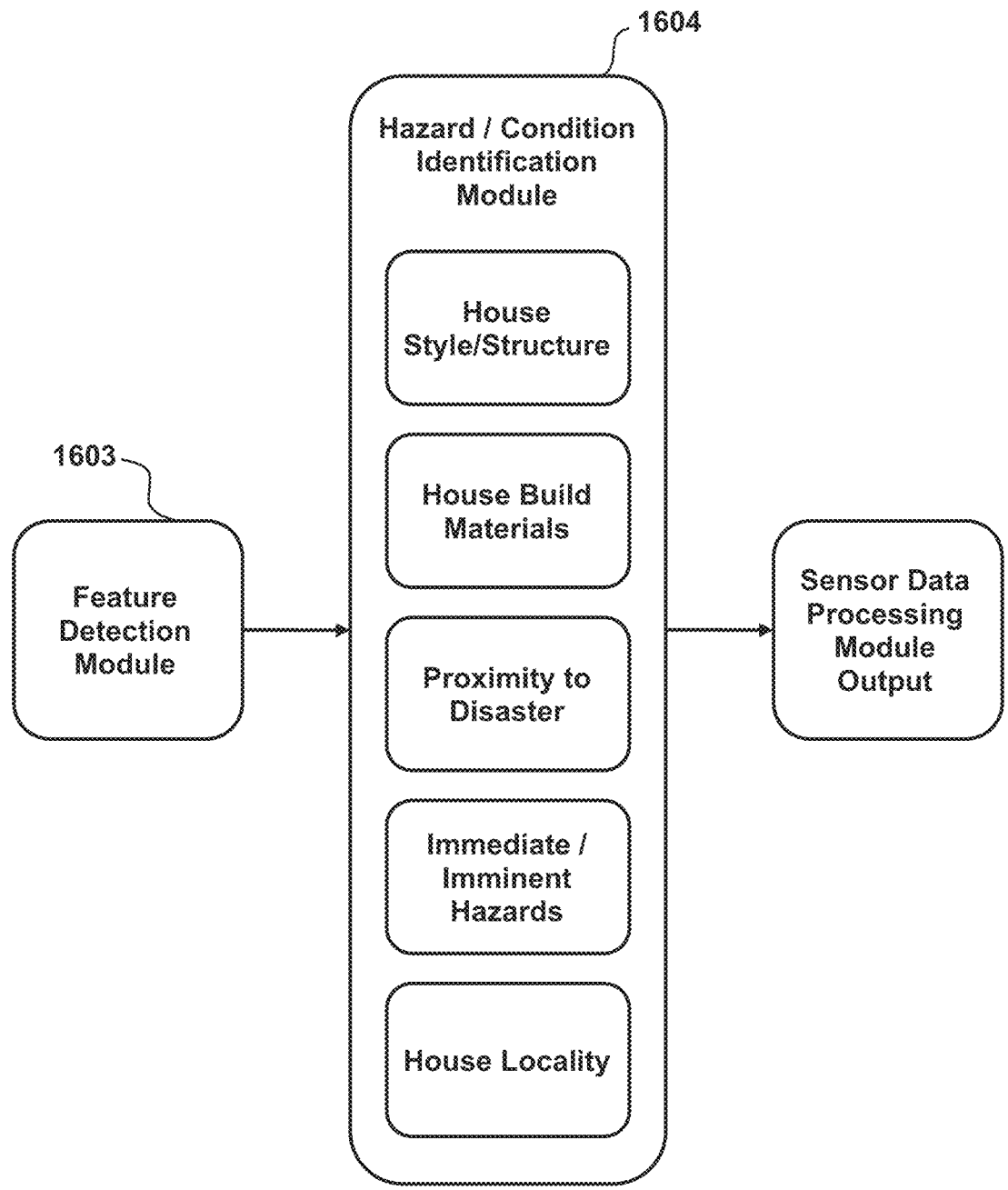
FIG. 18 illustrates aspects of a hazard/condition identification module of the present system, in accordance with one or more implementations.

FIG. 18 illustrates aspects of the hazard/condition identification module (block 1604). This module is configured to identify location hazards or other conditions, both interior and exterior. A location may include a house or other structures, surrounding property, or other components. The hazards and conditions can include, but are not limited to, the style/structure of the location (e.g., house—1 story, split-level, tri-level, overlooks a canyon/cliff-side), the materials used for building the house (e.g., wood, brick), the house's proximity to disaster prone regions (e.g., flammable brush close to property, earthquake zones, flooding zones, etc.), immediate or imminent hazards proximate to the location (e.g., trees hanging above roof, stairs without handrails), or environmental/societal risks due to house locality (e.g., dangerous neighborhood).

This module uses a mix of methods. One potential method is scene understanding for identifying location (e.g., house) style, house build materials, and immediate or imminent hazards. A scene may be a view of a portion of a location such as a portion of a house at the location, a room of the house, an area around a house, or other scenes for a location. Scene understanding can include a combination of semantic segmentation, object detection, etc. Three-dimensional mapping/reconstruction can also be used in place of scene understanding, where a user collects images/video (e.g., description data) of the location (e.g., via a smartphone associated with the user as described herein) and this data is used to create a map of the location. A variety of models can then be used to classify each of the categories like house style, house build materials, and immediate or imminent hazards. For example, an AI model (e.g., a machine learning model) can be used to classify the style of the house based on the 3D structure of the house. Another example is where an AI model (e.g., a machine learning model) can be used to draw 3D bounding box identifications on the house map and if an external object like a tree comes into contact with parts of the house, such as the roof, this is classified as a hazard. Another potential method is a look-up table and geographical map database search for identifying proximity to disaster prone regions and house locality-based hazards and conditions. This module uses visual, inertial, and other descriptive data (e.g., audio, text) to determine hazards and conditions.

Claims Adjustment

The process of getting an insurance claim adjusted today is based on filling online forms, one or more on-site adjuster visits to the insured's location to gather details to perform content claim adjustment, and property claim adjustment. The multiple manual steps are slow since an onsite visit needs to be scheduled, are inconvenient since the insured needs to be present at home, and are expensive since adjustments involve one or more on-site visits.

In order to provide a faster, easier and a less expensive claims adjustment process, the present systems and methods are configured for processing insurance claims utilizing a machine learning model. The processing may be performed with one or more hardware processors (e.g., processors 128 shown in FIG. 1) configured by machine-readable instructions (e.g., 106 shown in FIG. 1). Machine-readable instructions 106 may include various components (e.g., components 108, 110, 112, etc. shown in FIG. 1). These components may include various modules or other components. The modules may include programmed instructions or code, instructions stored on a storage medium, or other components configured to facilitate the operations described below.

The one or more processors may be configured to receive description data of a location. As described above, the description data may be generated via at least one of a camera, a user interface, an environment sensor, an external location information database, or other components. An inventory list comprising a plurality of items in or around the location may be generated, utilizing a machine learning model, based on the description data. The inventory list may comprise inventory attributes associated with the plurality of items related to a context of the plurality of items in the location. The one or more processors may be configured to determine, utilizing the machine learning model, based on the description data, interior or exterior condition information for the location. The interior or exterior condition information may describe a quality of structural components of the location or hazards in or around the location, for example. The one or more processors may receive a request for an insurance payment related to one or more items of the plurality of items in the inventory list or related to the location; and process, utilizing the machine learning model, based on the inventory list, the interior or exterior condition information, and the request for the insurance payment, payment for one or more items of the plurality of items in the inventory list or the location. The following paragraphs provide additional description of these operations.

By way of a non-limiting example, in some implementations, the one or more processors may be configured such that a consumer (or a representative of the insurance company such as an adjuster) launches an app (web app or native) on their smartphone to take pictures and quick videos (e.g., description data) of the interior and exterior of a home (or other portions of a location). The photos and videos may be time-stamped, geo-stamped (with latitude/longitude), device stamped (smartphone device details including device model, operating system, IP address, browser information, etc.) or user stamped (user profile details). Other accessorial details can be captured through voice or text. In addition to the above, the one or more processors can also record sensor data—accelerometer and gyroscope readings along with their time stamps.

The one or more processors, via the machine learning model (e.g., computer vision and AI technology as described below), may use the videos and pictures (the description data to: (1) create a unique inventory of the home after performing duplicate detection (as described herein); (2) estimate the value of the detected inventory, taking brand name (as one example attribute) into consideration as well as risk assessment based on exterior attributes; (3) estimate the premium, fair market value of contents and replacement market value of contents; (4) create a 3D view of the individual rooms and the floor plan of a location; or perform other operations. The one or more processors may be configured to present visual results to a desk adjuster (e.g., via a user computing platform 104 such as a smartphone). The desk adjuster can follow up with the consumer for additional information to make adjustments for the premium estimation. The one or more processors may be configured such that the desk adjuster can interact with the pictures and videos to derive measurement information if needed. For example, if a portion of a dry wall needs replacement, they can highlight the portion in the photos and the system can derive measurements for the highlighted section.

The one or more processors may include several different modules. The different modules may include a consumer interaction module configured to ingest one or more text, video, inertial data, pictures, audio, or other inputs (e.g., description data) from a user. In-app algorithms can be used to improve the data recording process. For example, when the app (e.g., the one or more processors) detects that a scene is dark, it could give the user feedback to switch on the lights or open curtains/windows so that videos recorded would be clearer. Once the AI processing is done the results can be presented to the user.

The different modules may include a machine learning model that includes a deep neural net such as a convolutional neural network (CNN), recurrent neural network (RNN), long short-term memory (LSTM) network, etc. It is not limited to only these types of networks. The model may be configured to read images either sequentially or as a batch and identify those it can recognize. Other algorithms such as linear regression may also be used. Multiple different algorithms may be used to process one or more different inputs. As an example, besides object detection using a convolutional neural network, another different convolutional neural network may be used to classify the location of the user to be a type of a room such as a bedroom or kitchen. The output of these algorithms can be a 2D or 3D bounding box or a mask around the objects of interest, or in the case of audio, a text string that processes/translates the user voice input, etc., for example.

The modules may include a mapping module configured to map the inventory items (objects)/scene (areas in or around a location) in 3D. The visual information the model reads is 2D images, although this information is sometimes enough to represent the scene, a 3D representation of the scene is more descriptive and accurate. It includes, but is not limited to, methods like SLAM, 3D reconstruction, visual odometry, end-to-end deep learning (neural nets), etc. This module may use data apart from camera, such as inertial, audio, and also text data given by the user which describes the scene. The output map can be either sparse or dense depending on the use case.

The modules may include a map adjuster module. The map generated by the mapping module can be inconsistent/incomplete. Geometric filtering algorithms may be applied, by the map adjuster module, to this map to create a more consistent/accurate 3D map. For example, Bundle Adjustment is an algorithm used to estimate the camera trajectory and map parameters more accurately using a bigger batch of data compared to what is used in the Mapping/Reconstruction module. Deep neural nets can also be used as a map adjuster along with geometrical and statistical methods.

The modules may include a spatial or temporal data breakdown module. The description data, such as video or audio data, may be divided into smaller segments (units) using spatial, or temporal constraints (e.g., included in the description data) as well as other data such as context. For example, a video may be divided into multiple frames and poor-quality images with low lighting or high blur may be filtered out. Similarly, an audio input may filter out segments comprising background noise and create units of audio where the speaker is actively communicating.

The modules may include a spurious identifications suppression module. The output of the object identification module can be noisy. Spurious identifications and detections can be filtered out, by the spurious identifications suppression module, by using techniques such as non-maximum suppression between objects from the same or different classes needed to generate the itemized statement. An artificially intelligent (e.g., machine learning) algorithm may use variable optimized thresholds for achieving greater spurious suppression without affecting true detections. For example, it is quite likely to have two chairs or tables located next to each other. Thus, two chair detections with highly overlapping bounding boxes are likely to both be correct. However, two detections of large refrigerators with high overlap are likely to contain one spurious detection. Similarly, it is likely to detect a jet ski and kayak next to each other, however, it is likely that a jet ski detected next to a bed is spurious. The AI (e.g., machine learning) algorithm can also utilize context such as room and object class for suppression. Outputs from multiple units may be combined on a logical basis (such as data belonging to a particular room or area) to form a block of data that is used for generating part of the inventory. For example, all frames for a video segment for a particular room may form a block of data.

The modules may include a correlation on batch data module. An object may be present in multiple units of data, and thus be counted multiple times within a block of data. An artificially intelligent (e.g., machine learning) algorithm can be used to correlate the object across multiple past and future units present in the batch of data and ensure that the inventory estimate for the block data is accurate.

The modules may include a spurious and duplicate detection module for batch data. An AI (e.g., machine learning) algorithm may use multiple techniques such as feature matching for objects, detecting a pan change in the input video, etc., to determine if some units within a block of data are duplicates of previous inputs. As an example, a user may inadvertently make multiple recordings of a given area such as by recording first from left to right and then right to left in order to arrive at a new location for recording. Similarly, techniques for suppressing spurious identifications or transforming identified classes using context can be deployed. These suppression algorithms can benefit from the processing of the data at the block level. For example, spurious detections at the level of an image frame can be suppressed using weighted temporal filtering. As another example, objects detected inside the bounding box of other objects such as mirrors and television sets may be suppressed. Similarly, if a mattress is detected close to a headboard, the mattress is likely on top of a bed frame and the AI algorithm can lower the confidence threshold for detecting bed frames in the block of data.

The modules may include a temporal filtering based attribute generation module. Many objects may not be identifiable within a unit of data. As an example, an object may be partially occluded from a particular view, but may become more visible later in a customer recorded video. Similarly, a large object may never be completely visible within a single unit of data. In another case an object may be identified as belonging to different classes in different units of data. An artificially intelligent (e.g., machine learning) algorithm may utilize techniques such as weighted temporal filtering, strict class rank hierarchy, contextual information, etc., to generate the attributes of the objects identified in the block of data.

The modules may include a spurious and duplicate detection for an entire dataset module. An artificially intelligent (e.g., machine learning) algorithm may be used to remove spurious objects across multiple blocks of data. For example, an inventory estimate of kitchen items may inadvertently include items from the living room that were present in the video segment for the kitchen as well as the living room.

The modules may include a data presentation module. An artificially intelligent (e.g., machine learning) algorithm may also be used to select the units or fractions of units that can be used to present to the user. For example, an object may be present on multiple units, however, to present the object to the user only a single unit or a box identifying the object within that unit may be selected. The algorithm to select these presentation segments can optimize for one or more metrics such as review time, aesthetics, etc.

The modules may include an AI identification module. In the systems and methods disclosed, AI identification may include, but is not limited to, marking the spatial region of the item in the user data by drawing a bounding box (2D/3D) or segmentation mask, labeling items such as chair/table etc., and finding spatial location information with respect to the scene.

It should be noted that one or more of the modules described above may be used for one or more of the embodiments or applications described herein. For example, one or more of these modules may be used for insurance underwriting, waterline insurance claims, dimension estimation, or other applications instead of or in addition to claims adjustment.

Waterline Insurance Claims

In some implementations, the present systems and methods may include systems or methods configured for evaluating flood insurance claims utilizing a machine learning model. In such implementations, one or more hardware processors configured by machine-readable instructions to receive description data of a location. As described herein, the description data may be generated via at least one of a camera, a user interface, an environment sensor, or from other sources. The one or more processors may be configured to generate, utilizing the machine learning model, an inventory list comprising a plurality of items (e.g., objects) in or around the location based on the description data or other information. The inventory list may comprise inventory attributes associated with the plurality of items related to positions of the plurality of items in the location or other information.

The one or more processors may be configured to determine, utilizing the machine learning model, based on the description data, a flood line level for a flood previously present at the location. In some implementations, an adjuster can mark or change the flood line level (e.g., via a user computing platform 104 associated with the adjuster).

The one or more processors may be configured to project, utilizing the machine learning model, a virtual flood plane in or around the location based on the flood line level.

The one or more processors may be configured to determine, utilizing the machine learning model, based on the positions of the items in the location and the flood line level, which individual items in the inventory list were likely to sustain flood damage. Determining which individual items in the inventory list were likely to sustain flood damage may comprise comparing the positions of the plurality of items in the location to the virtual flood plane projection. In some implementations, comparing the positions of the plurality of items in the location to the virtual flood plane projection comprises one or more of generating a three dimensional reconstruction electronic model of one or more portions of the location, performing a lowest point identification of detected items in three dimensions, performing a three dimensional cuboid fitting for the one or more portions of the location, performing a single shot classification, or other operations.

In some implementations, the one or more hardware processors may be configured to determine whether individual items in the inventory list are covered by an insurance policy based on the positions of the plurality of items in the location relative to the virtual flood plane projection.

As described above, the processing may be performed with one or more hardware processors (e.g., processors 128 shown in FIG. 1) configured by machine-readable instructions (e.g., 106 shown in FIG. 1). Machine-readable instructions 106 may include various components (e.g., components 108, 110, 112, etc. shown in FIG. 1). These components may include various modules or other components. The modules may include programmed instructions or code, instructions stored on a storage medium, or other components configured to facilitate the operations described herein. The following paragraphs and corresponding figures provide additional detail related to waterline insurance claims.

In some implementations, the modules include a waterline identification and plane projection module. This module may identify, in the description data (e.g., in images), the traces left by the waterline in a room or larger scene to construct lines or contours across the room or scene (e.g., in 2 or 3D images) to represent the level at which the room/scene was flooded. These lines/contours can be either detected on 2D images or on a 3D map created from images. A surface plane may be constructed using these lines/contours and then projected to cover the area of the room/scene that was flooded. This may include, for example, an imaginary plane parallel to the floor/ground projected to cover the entire area of the floor/ground at a certain height from the floor/ground (e.g., a former water level or clearance height).

The modules may include a covered/not covered classification module configured to use geometric methods or a machine learning (e.g., AI) model, or both to classify items (e.g., objects) as covered/not covered by an insurance policy given the waterline projection on the room/scene. Geometric methods can be used to determine which items are above/below the waterline in 2D images. In the 3D case, the water/flood affected portion of the scene is determined based on the water plane projection. The items which this plane intersects (and items below these objects) are classified as covered, and the rest of the items are not covered, for example. A machine learning model can also classify the items based on spatial information of the items and the waterline with respect to the scene. The machine learning model can simultaneously identify the waterline, the items, and how the items are spatially related to the waterline such that it can classify which items are covered or not covered.

Figure 19:
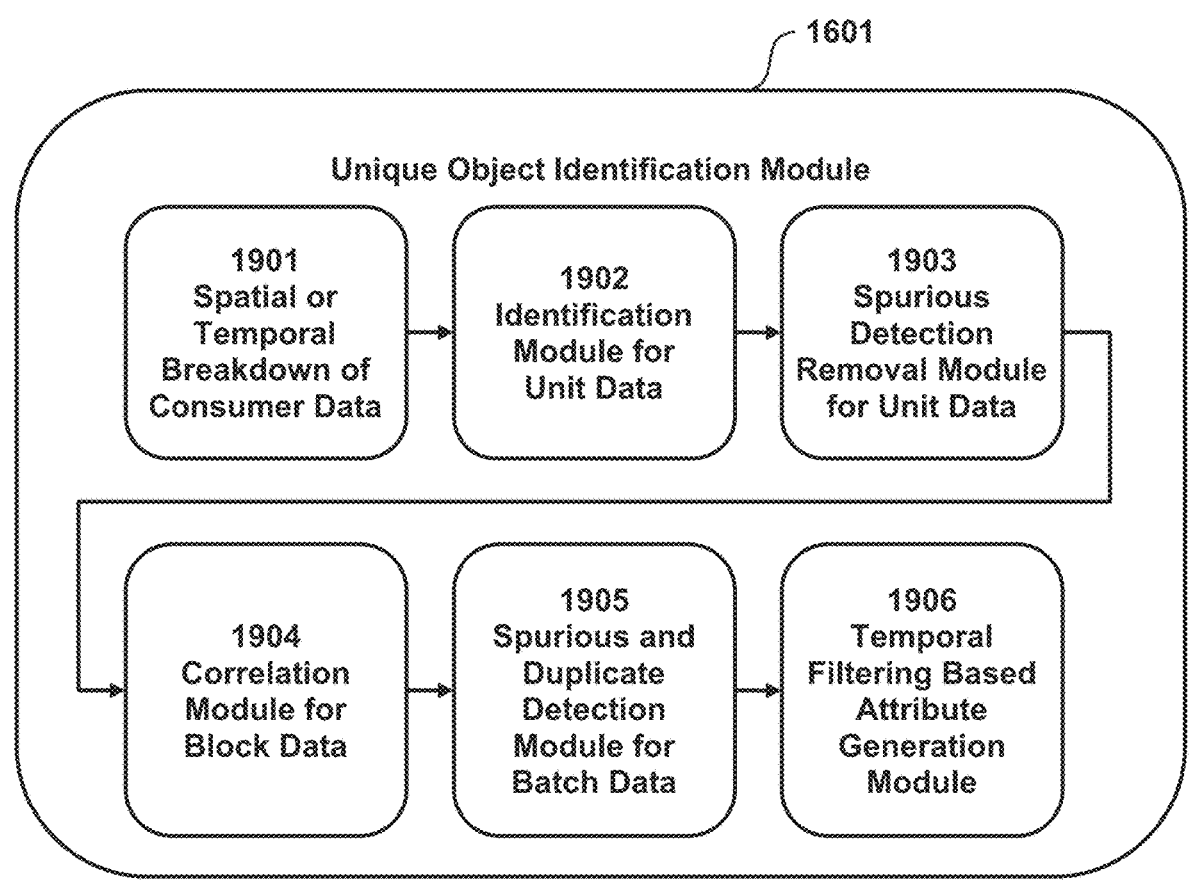
FIG. 19 illustrates a unique object identification module of the present system, in accordance with one or more implementations.

FIG. 19 illustrates a unique object identification module (block 1601 shown in FIG. 16). The unique object identification module may be used for insurance underwriting (as described above), claims adjustment, waterline insurance claims (as described here), or for other purposes. This module may be configured to identify and count the inventory items (e.g., objects) in the (e.g., user submitted) description data which may include camera frames, inertial data, video, text data describing a scene, or other sensor and non-sensor data as described herein. The inventory items might include furniture items, floors, walls, ceilings, items used to cover these surfaces, etc. Block 1901 illustrates a data segmentation/breakdown (spatial or temporal breakdown of consumer data) module as described above (related to claims adjustment). Block 1902 illustrates an identification module for unit data. This may be a machine learning (e.g., AI) model, generally (but not limited to) a deep neural network, used to identify the inventory items. Block 1903 illustrates a detection filtering module (spurious detection removal module for unit data) as described above. Block 1904 illustrates a correlation module for block data. This module can either be another machine learning model such as a deep neural network or a traditional computer vision algorithm which can correlate the items identified across the input description data for determining an accurate item count. These two functionalities can be either split or can be performed by a single model, such as with a recurrent neural network (RNN) or a long short term memory (LSTM) network which can do both identification and keep track of spatio-temporal context across the user submitted data. Block 1905 is a duplicate filtering module as described above, and block 1906 is an object attribute temporal update module (temporal filter based attribute generation module) as described above.

Figure 20:
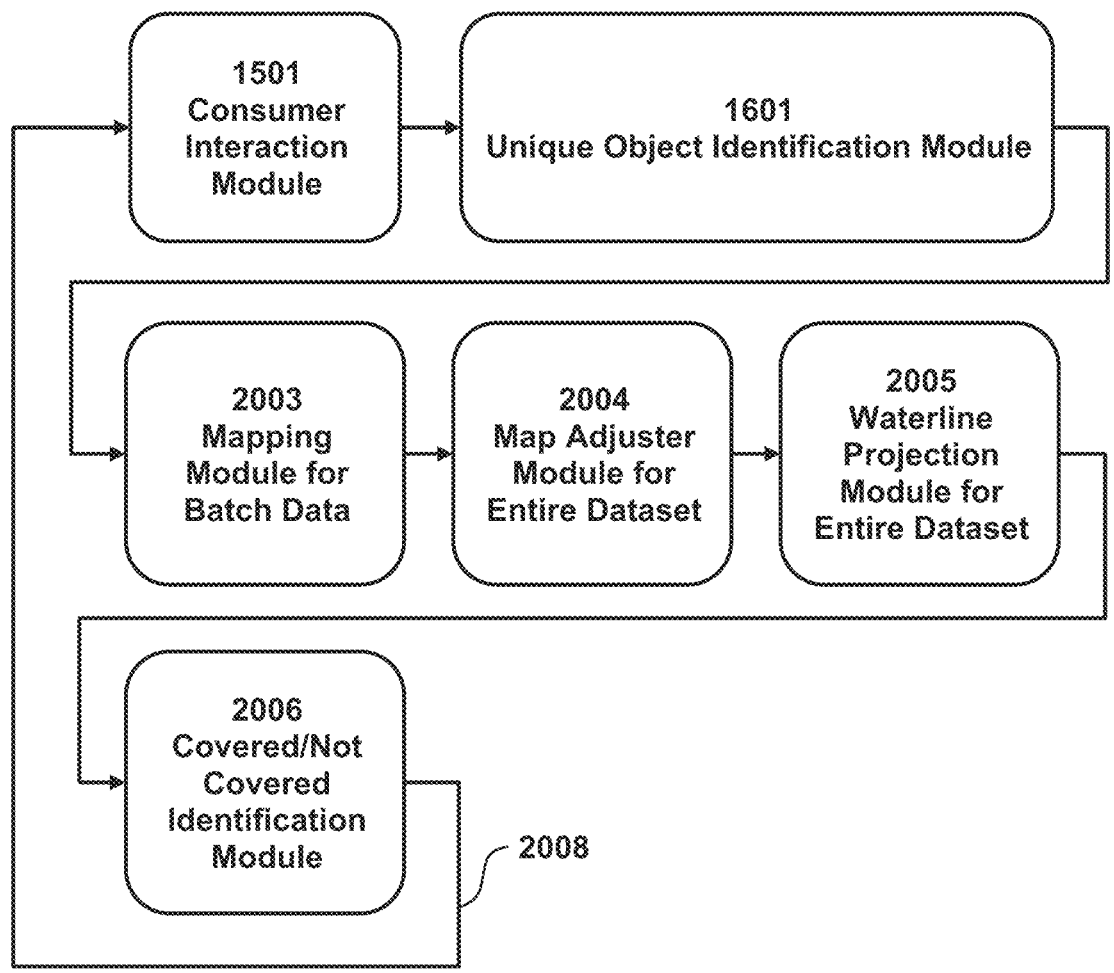
FIG. 20 illustrates a portion of the present system which identifies and classifies inventory items present in a flood affected room/scene/location as covered/not covered by insurance, in accordance with one or more implementations.

FIG. 20 illustrates a portion of the present system (e.g., modules of processors 128 shown in FIG. 1) which identifies and classifies the (detected) inventory items present in a flood affected scene as covered/not covered by insurance. Block 1501 is a consumer interaction module as described herein. Block 1601 is a unique object identifier module, configured to identify the inventory items as described above. Block 2003 is a mapping module which is used to convert the 2D image data into a 3D representation of a room, scene, or another portion of a location. The mapping technique used may leverage the output from block 1601 to map the inventory items (e.g., objects) in 3D, including, but not limited to, methods like SLAM, 3D reconstruction, visual odometry, etc. This module may use sensor data apart from camera data, such as IMU data or text data given by the user to describe the scene. Block 2004 is a post processing module for the mapping module. Once a map is created using the spatio-temporal data (described above), geometric filtering algorithms may be applied to this map to create a more consistent/accurate 3D map. Block 2005 is a waterline identification and plane projection module configured to identify traces left by the waterline in the room/scene/location to construct lines/contours across the scene representing the level at which the room/scene was flooded. For example, the waterline traces left by the flooding may be found in images (e.g., description data) using geometric computer vision methods or a machine learning model. The image pixels which are consistent with a waterline are identified first and the system can use a line fitting algorithm like Hough Transform, Split and Merge with RANSAC (RANdom SAmple Consensus), etc., to construct a line. This can be done either within an image coordinate system or in a reconstructed scene 3D coordinate system. Using these lines/contours and the map created from block 2004, a surface plane is projected to cover the area of the room/scene/location that was flooded. The volume/part of the room/scene that intersects or is underneath this plane is the volume affected by the flooding. Inventory items may then be classified as covered/not covered by the module illustrated in block 2006 (e.g., as described above). The output 2008 may be reviewed/edited by the adjusters of the insurance company via an app that is launched on their end which includes images, inventory details, etc.

Figure 21:
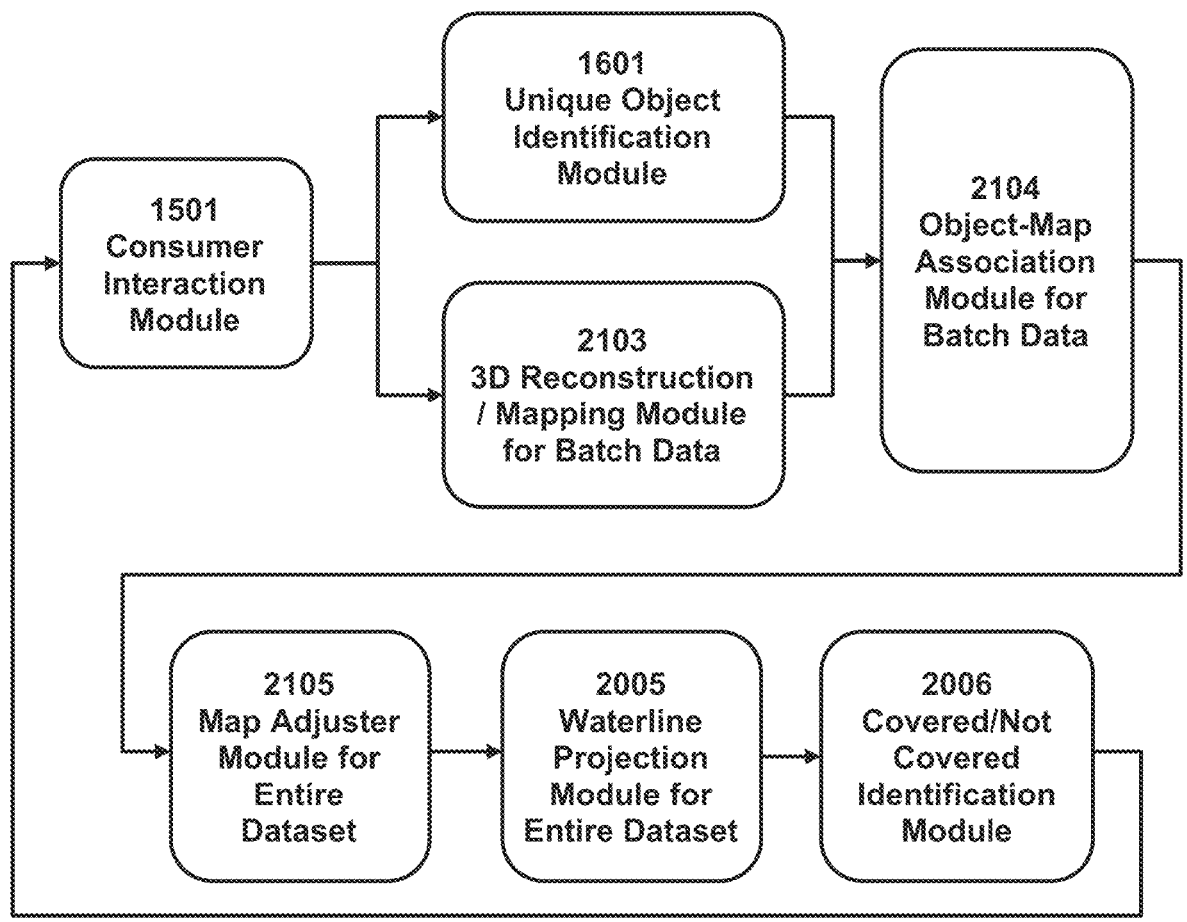
FIG. 21 illustrates another embodiment of the portion of the present system which identifies and classifies the inventory items present in the flood affected room/scene/location as covered/not covered by insurance, in accordance with one or more implementations.

FIG. 21 illustrates another embodiment of the portion of the present system (e.g., modules of processors 128 shown in FIG. 1) which identifies and classifies the inventory items (e.g., objects) present in the flood affected scene as covered/not covered under the insurance claims. Block 1501 illustrates the consumer interaction module. Block 1601 illustrates the unique object identification module. Block 2103 illustrates a mapping module which is used to convert 2D image data into 3D. The module uses methods like SLAM, 3D reconstruction, visual odometry, etc. Blocks 1601 and 2103 may run independently (either sequential or in parallel) and the outputs from these two blocks may be associated in block 2104 (with an object map association module for batch data) such that inventory items get matched with their respective 3D parts of the map. Block 2105 illustrates a map adjuster module for an entire dataset. This module may be a post processing module for the mapping module (block 2103). Once the map is created using the spatio-temporal data, geometric filtering algorithms may be applied to that map to create a more consistent/accurate 3D map. Block 2005 illustrates a waterline identification and plane projection module that identifies the traces left by the waterline in the room/scene/location to construct lines/contours across the room/scene/location representing the level at which the room/scene was flooded (e.g., as described above). Using these lines/contours, a surface plane may be projected to cover the area of the room/scene/location that was flooded. The volume/part of the room/scene/location that intersects or is underneath this plane is the volume affected by the flooding. Inventory items may then be classified as covered/not covered by the module illustrated in block 2006. The final output of this system can be reviewed/edited by the adjusters of the insurance company via an app that is launched on their end which includes images, inventory details, etc.

Figure 22:
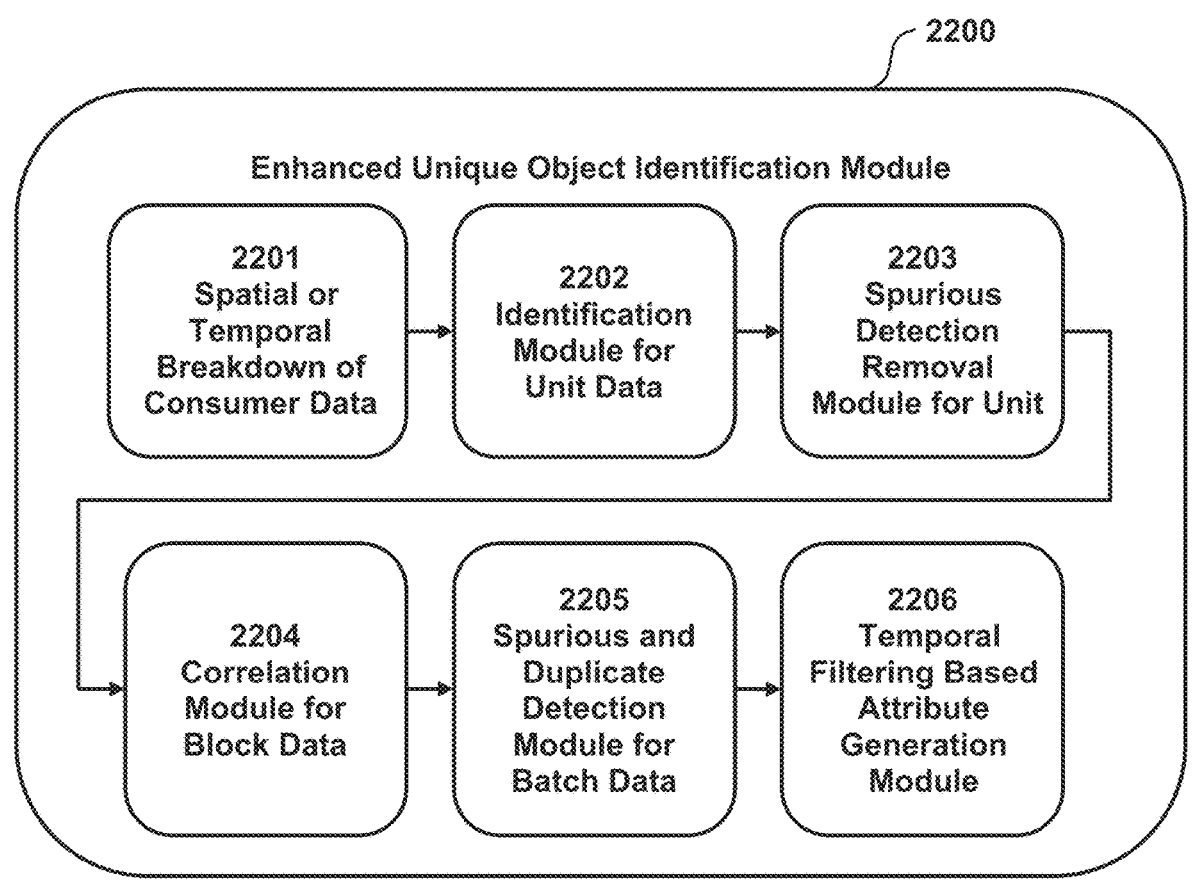
FIG. 22 illustrates an enhanced unique object identification module, in accordance with one or more implementations.

FIG. 22 illustrates an enhanced unique object identification module 2200. Module 2200 may be configured to identify and count the inventory items in the description data which may include camera frames, inertial data, or text data describing the scene/location. The inventory items might include furniture items, floors, walls, ceilings, items used to cover these surfaces, etc. Block 2201 illustrates a data segmentation/breakdown module similar to or the same as the corresponding module described above. Block 2202 illustrates an identification module for unit data. This module may be or include a machine learning model, generally (but not limited to) a deep neural network, used to identify the inventory items, along with the information regarding how the items are spatially located in the scene. An example case is identifying a point/pixel in an image of the item that is closest to the floor/ground of a 2D image scene. Block 2203 illustrates a detection filtering module that is similar to or the same as the corresponding module described above. Block 2204 illustrates a correlation module for block data. This module can either be another machine learning model like a deep neural network or a traditional computer vision algorithm which can correlate the items identified across the input data in order to get an accurate count of unique items. These two functionalities can be split or they can be performed by a single model, such as with a recurrent neural network (RNN) or a long short term memory (LSTM) network which can do both identification and keep track of spatio-temporal context across the user submitted data. Block 2205 illustrates a duplicate filtering module and block 6 illustrates an object attribute temporal filtering module that are similar to or the same as corresponding modules described above.

Figure 23:
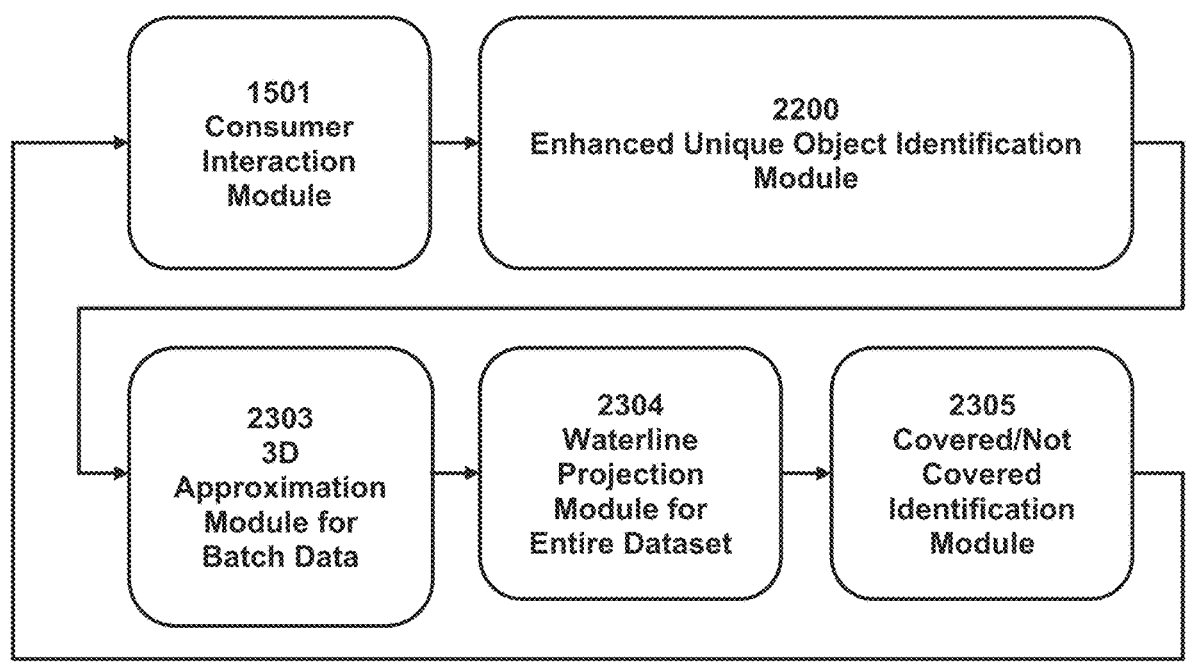
FIG. 23 illustrates another embodiment of the portion of the system which identifies and classifies the inventory items present in the flood affected room/scene/location as covered/not covered by insurance, in accordance with one or more implementations.

FIG. 23 illustrates another embodiment of the portion of the system which identifies and classifies the inventory items present in the flood affected scene as covered/not covered. In this example, a 3D approximation with object spatial information system may be formed. Block 1501 illustrates the consumer interaction module as described herein. Block 2200 uses the object identifier system of FIG. 22 to identify the inventory items. Block 2303 illustrates a 3D scene approximation module which is used to convert the information from 2D image data into a 3D representation. The module uses methods like 3D cuboid fitting, 3D reconstruction by creating a scene panorama, etc. This module uses output from the previous one to represent the 3D spatial approximation of the inventory items in the scene/location. Block 2304 illustrates a waterline identification and plane projection module, which identifies the traces left by the waterline in the room/scene/location to construct lines/contours across the scene representing the level at which the room/scene was flooded. Using these lines/contours, a surface plane is projected to cover the area of the room/scene/location that was flooded. This module is similar to or the same as the corresponding module(s) described above. The volume/part of the room/scene/location that intersects or is underneath this plane is the volume affected by the flooding. Inventory items may then be classified as covered/not covered by the module illustrated in block 2305. The final output of this portion of the system can be reviewed/edited by the adjusters of the insurance company via an app that is launched on their end which includes images, inventory details, etc.

Figure 24:
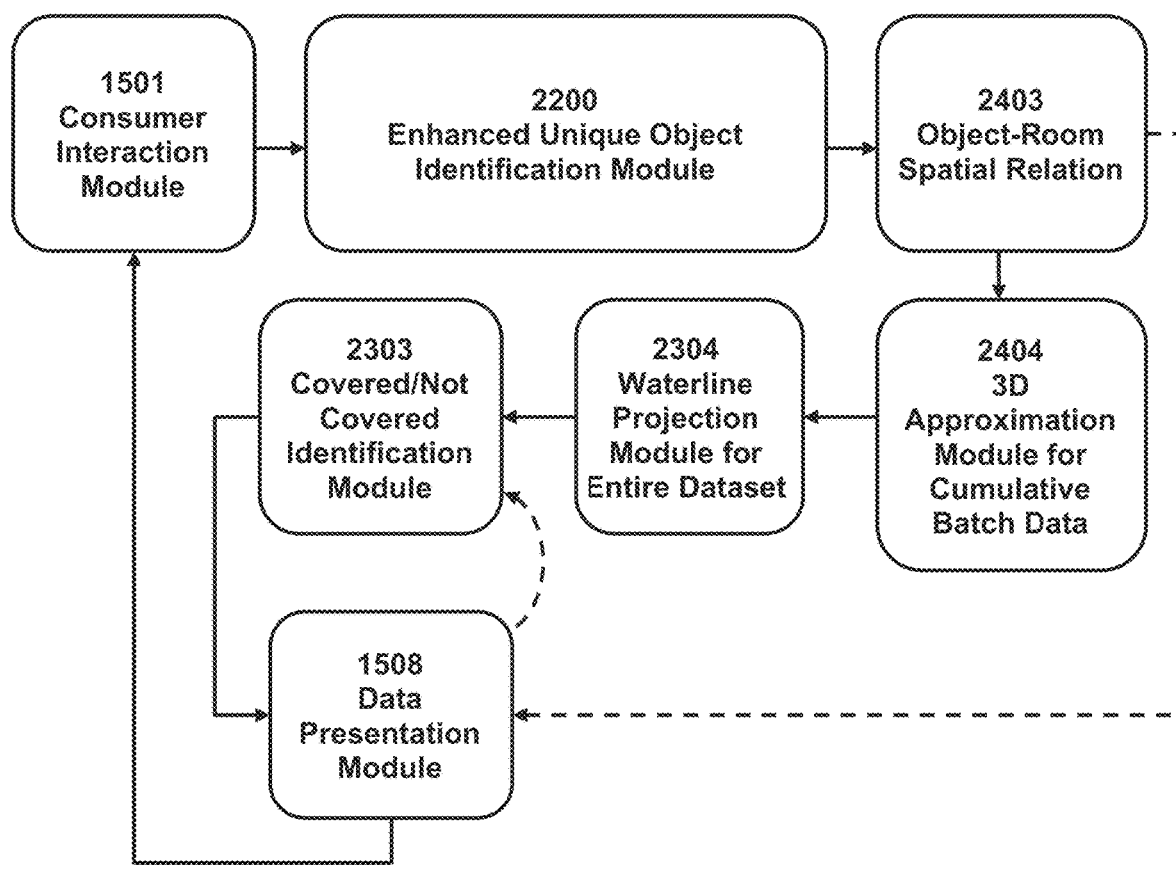
FIG. 24 illustrates another embodiment of a portion of the system which identifies and classifies the inventory items present in the flood affected room/scene/location as covered/not covered by insurance, in accordance with one or more implementations.

FIG. 24 illustrates another embodiment of a portion of the system which identifies and classifies the inventory items present in the flood affected scene as covered/not covered. Block 1501 illustrates the consumer interaction module. Block 2200 illustrates the enhanced unique object identification module. Block 2403 illustrates an object-room spatial relation module. This module is a classification module which categorizes the inventory items into multiple categories such as wall mounted, ceiling mounted, grounded, stacked on other items, etc. In general, the items that are in the grounded category can be determined as covered under insurance without any further machine learning algorithm processing (because since they are located on the ground, they were likely touched by water/flooding), with exception to few cases. Block 2404 illustrates a 3D scene approximation module which is used to convert information from 2D image data into 3D (e.g., as described above). The module uses methods like 3D cuboid fitting, 3D reconstruction by creating a scene panorama, etc. This module uses output from block 2200 and block 2403 for 3D spatial representation of the inventory items in the room/scene/location. Block 2304 illustrates the waterline projection module for an entire dataset (e.g., as described above). Block 2303 illustrates the covered/not covered identification module (as described above). Block 1508 illustrates the data presentation module (e.g., as described above). The final output of this system can be reviewed/edited by the adjusters of the insurance company via an app that is launched on their end which includes images, inventory details, etc.

Figure 25:
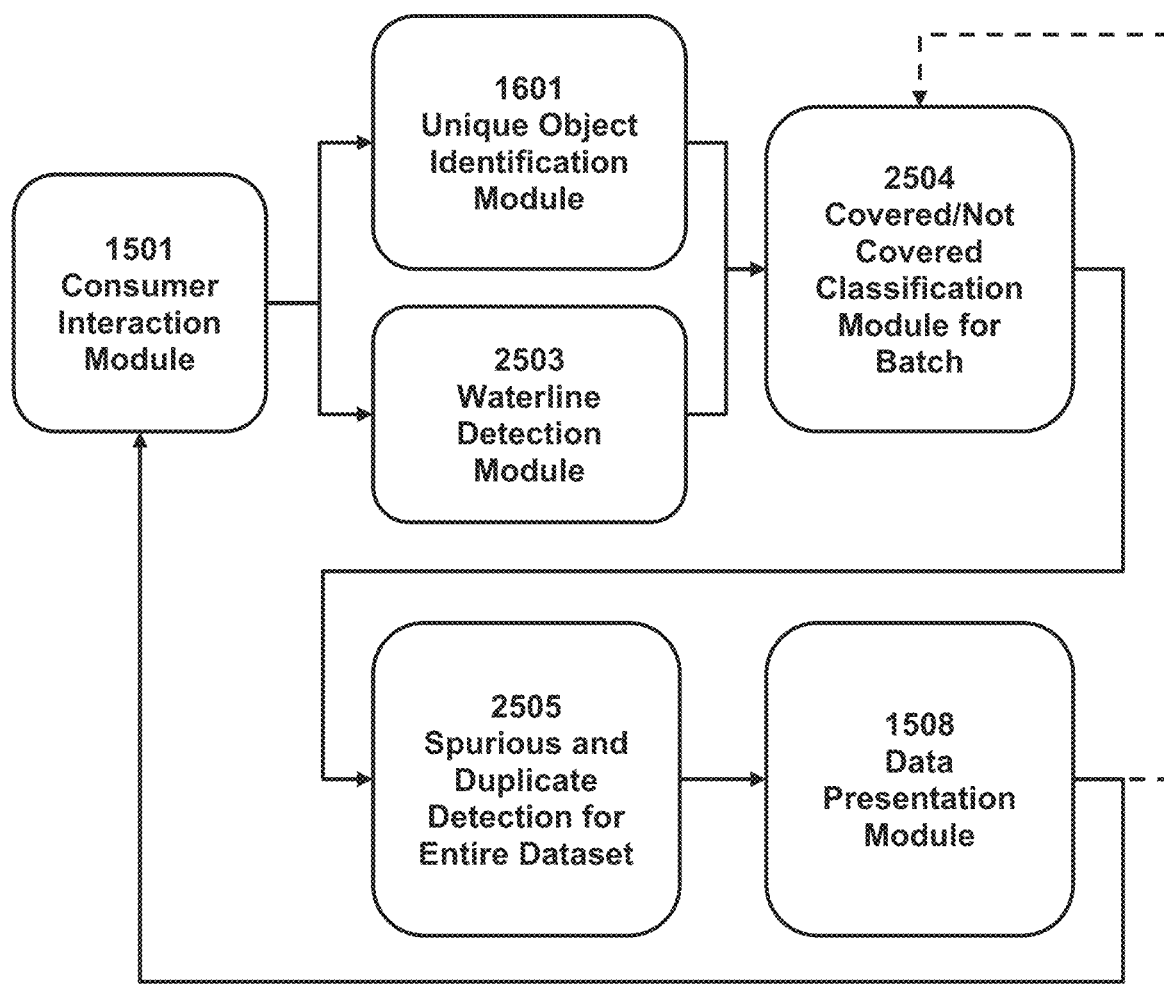
FIG. 25 illustrates another embodiment of the portion of the system which identifies and classifies the inventory items present in the flood affected room/scene/location as covered/not covered by insurance, in accordance with one or more implementations.

FIG. 25 illustrates another embodiment of the portion of the system which identifies and classifies the inventory items present in the flood affected room/scene/location as covered/ not covered by insurance. In this embodiment, object identification and waterline detection occur in parallel. Block 1501 illustrates the consumer interaction module. Block 1601 illustrates the unique object identification module. Block 2503 illustrates a waterline detection module. This module identifies the waterline in 2D camera image frames and runs independent/parallel to block 1601. Block 2504 illustrates a covered/not covered classification module for a batch of data. This module is or includes a machine learning model, generally a deep neural network (but this is not intended to be limiting), that classifies the inventory items detected as covered/not covered based on the waterline information from block 2503. Block 2505 illustrates a spurious and duplicate detection module. This module removes any duplicates in the inventory item list using object correlations across the input description data. This is used as a post processing step before presenting the final output to the user. Block 1508 illustrates the data presentation module. This module is a data presentation module which includes algorithms configured to summarize the output through a minimal set of images along with respective determined identification information. The final output of this system can be reviewed/edited by the adjusters of the insurance company via an app that is launched on their end which includes images, inventory details, etc.

Figure 26:
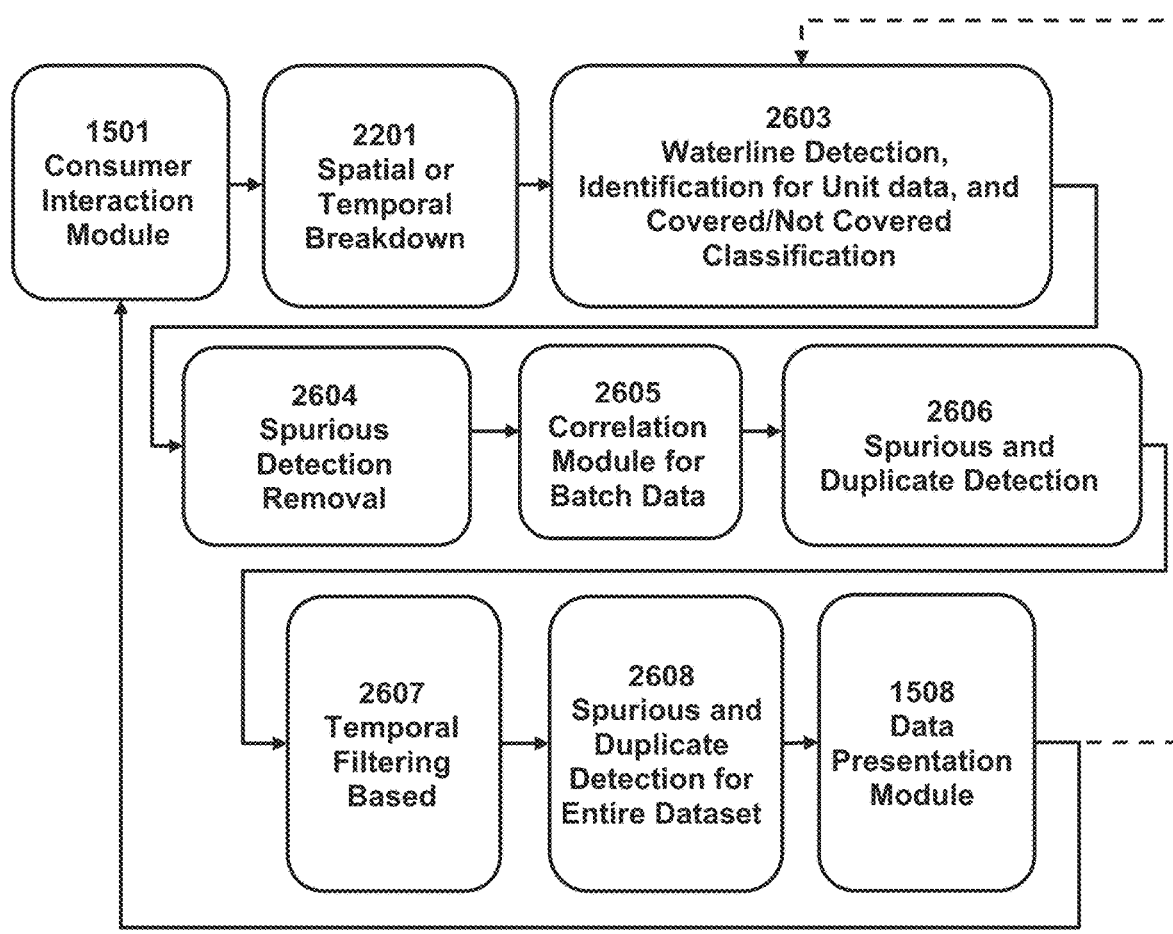
FIG. 26 illustrates another embodiment of the portion of the system which identifies and classifies the inventory items present in the flood affected room/scene/location as covered/not covered by insurance, in accordance with one or more implementations.

FIG. 26 illustrates another embodiment of the portion of the system which identifies and classifies the inventory items present in the flood affected room/scene/location as covered/ not covered by insurance. Block 1501 illustrates the consumer interaction module. Block 2201 illustrates a spatial or temporal breakdown module similar to or the same as corresponding modules described above. Block 2603 illustrates a machine learning module which can identify the inventory items, waterline, and directly classify the items as covered/not covered by insurance. Block 2604 illustrates a spurious detection removal module similar to or the same as corresponding modules described above. Block 2605 illustrates a correlation module for batch data. This module can either be another machine learning model such as a deep neural network or a traditional computer vision algorithm which can correlate the items identified in the description data across the description data for getting an accurate item count. These two functionalities can either be split or can be performed by just one model, such as with a recurrent neural network (RNN) or a long short term memory (LSTM) network which can do both identification and keep track of spatio-temporal context across the user submitted data.

Block 2606 illustrates an intermediate duplicate filtering module with batch data as similar to or the same as corresponding modules described above, and block 2607 is an object attribute temporal update module similar to or the same as corresponding modules described above. Block 2608 describes a module configured for a final post processing step, similar to or the same as corresponding modules described above. Block 1508 illustrates the data presentation module. The final output of this system can be reviewed/edited by the adjusters of the insurance company via an app that is launched on their end which includes images, inventory details, etc.

Figure 27:
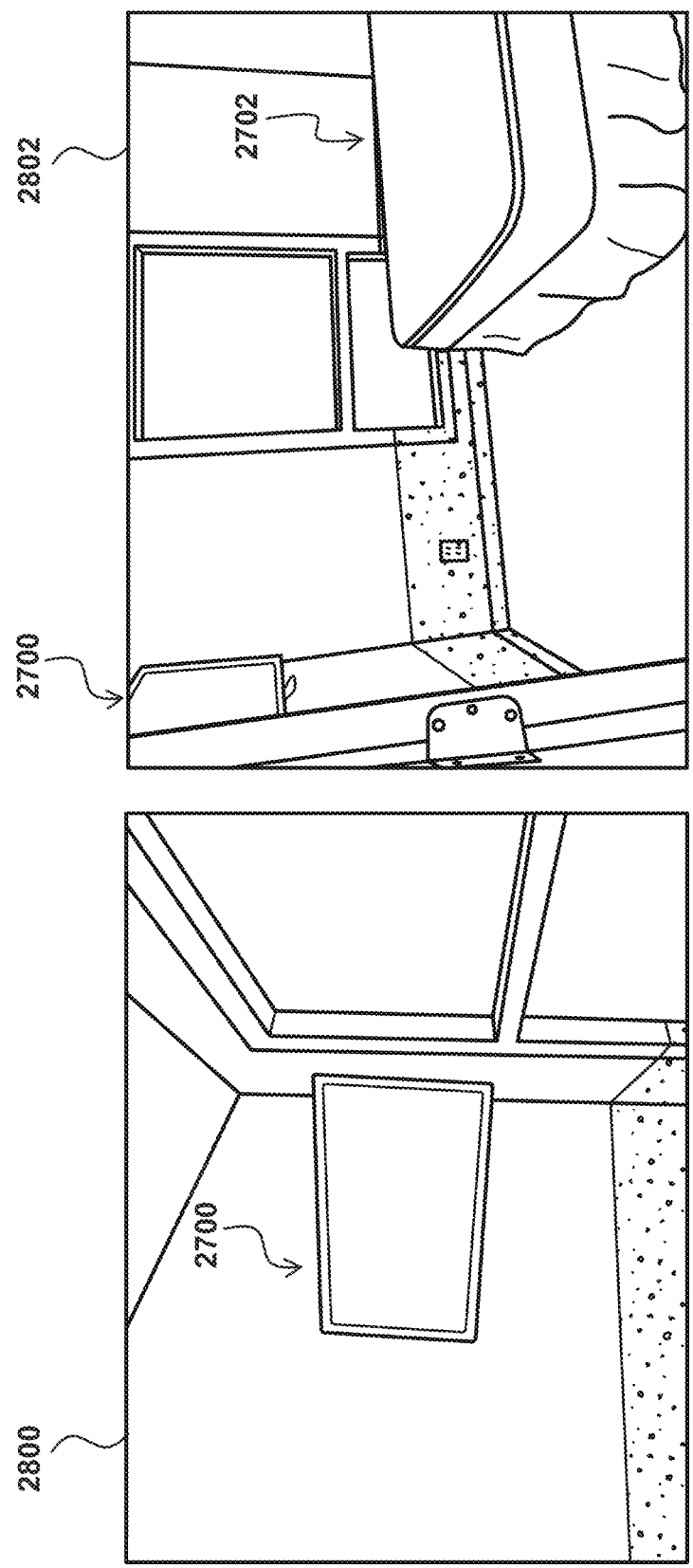
FIG. 27 illustrates two dimensional images of a room at a location which includes a television and a bed, in accordance with one or more implementations.
Figure 28:
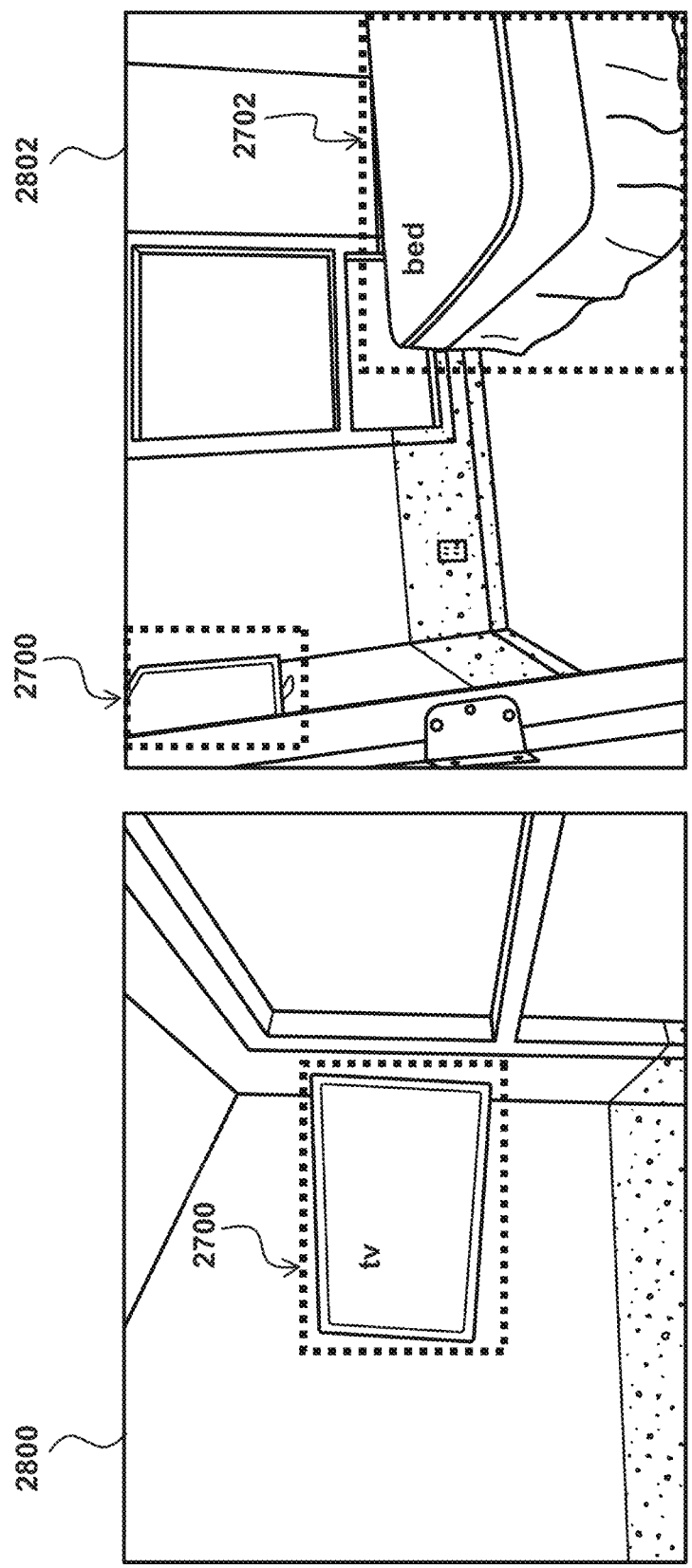
FIG. 28 illustrates detection of a television and a bed in the two-dimensional images shown in FIG. 27, in accordance with one or more implementations.

By way of a non-limiting example, FIG. 27-39 illustrate evaluating flood insurance claims utilizing a machine learning model. FIGS. 27 and 28 illustrate how the one or more processors (e.g., FIG. 1, and the various modules described herein) may be configured to generate, utilizing the machine learning model, an inventory list comprising a plurality of items (e.g., objects) in or around a location based on the description data or other information. In this example, a television 2700 and a bed 2702 are identified in two separate 2D images 2800 and 2802.

Figure 29:
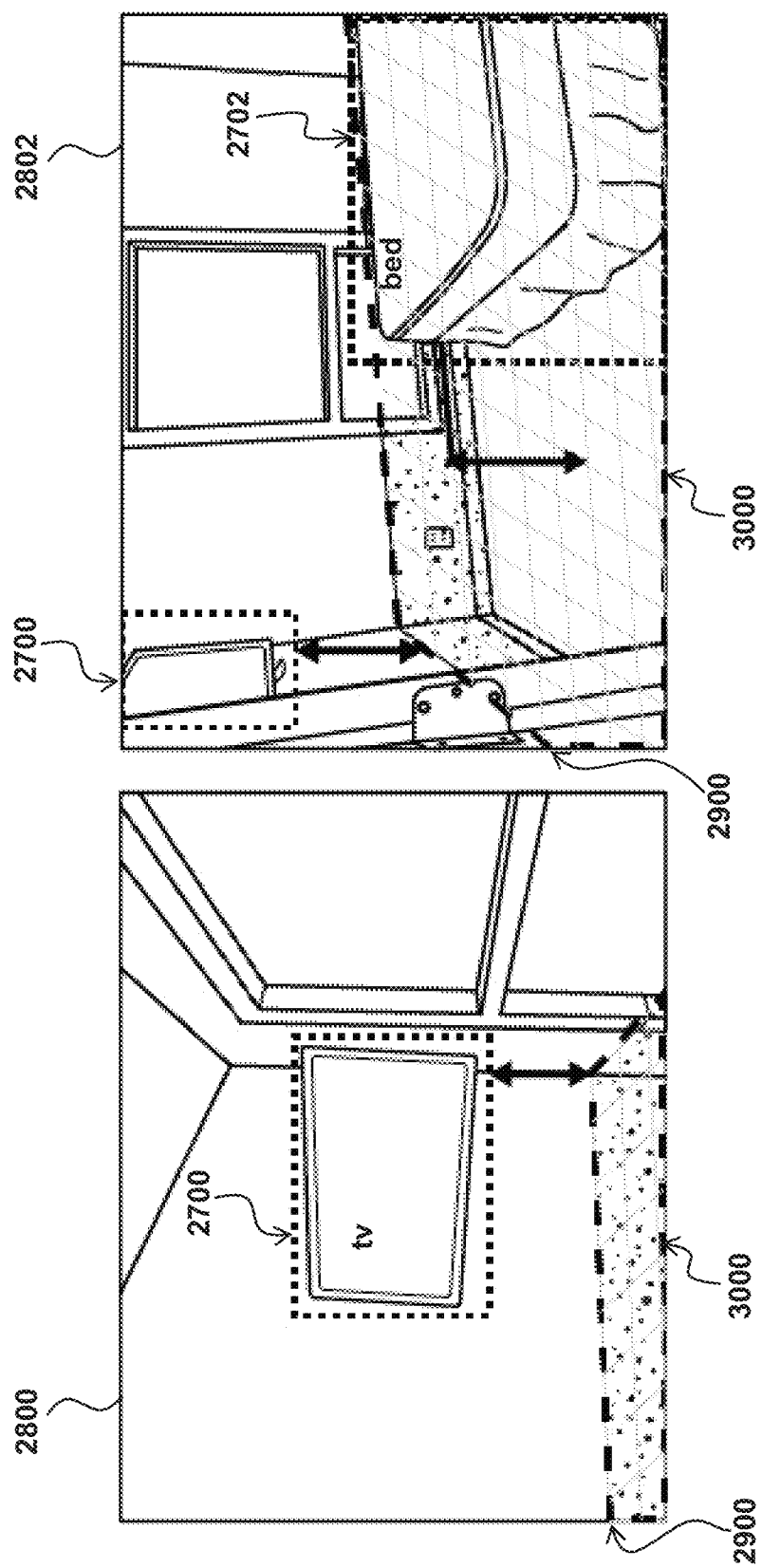
FIG. 29 illustrates detection of a waterline and a projection of a plane that corresponds to the water line, and the relative positions of the television and the bed compared to the water line, in accordance with one or more implementations.

FIG. 29 illustrates how the one or more processors may be configured to determine, utilizing the machine learning model, based on the description data, a flood line level 2900 for a flood previously present at the location. In some implementations, an adjuster can mark or change the flood line level (e.g., via a user computing platform 104 (FIG. 1) associated with the adjuster). FIG. 29 illustrates how the one or more processors may be configured to project, utilizing the machine learning model, a virtual flood plane 3000 in or around the location based on flood line level 2900. As shown in FIG. 29, the one or more processors may be configured to determine, utilizing the machine learning model, based on the positions of the items in the location and the flood line level, which individual items in the inventory list were likely to sustain flood damage. Determining which individual items in the inventory list were likely to sustain flood damage may comprise comparing the positions of the plurality of items in the location to the virtual flood plane projection. In some implementations, comparing the positions of the plurality of items in the location to the virtual flood plane projection comprises one or more of generating a three dimensional reconstruction electronic model of one or more portions of the location, performing a lowest point identification of detected items in three dimensions, performing a three dimensional cuboid fitting for the one or more portions of the location, performing a single shot classification, or other operations. Here, television 2700 is above plane 3000, while bed 2702 is below plane 3000. In some implementations, the one or more hardware processors may be configured to determine whether individual items in the inventory list are covered by an insurance policy based on the positions of the plurality of items in the location relative to the virtual flood plane projection. In this example, bed 2702 would be covered by insurance while television 2700 would not.

Dimension Estimation

In some implementations, the present systems and methods may include systems and methods for estimating dimensions of items (e.g., the inventory items, one or more portions of a structure at a location, one or more other portions of a location, etc.) in or around a location utilizing a machine learning model. The one or more hardware processors configured by machine-readable instructions (e.g., the processor modules described herein) may perform the estimation, for example.

The one or more processors may be configured to receive the description data of a location. As described herein, the description data may be generated via at least one of a camera, a user interface, an environment sensor, an external location information database, or other components. The one or more processors may also be configured for generating, utilizing the machine learning model, the inventory list comprising the plurality of items in or around the location based on the description data.

The one or more processors may be configured for receiving one or more dimensions for a reference item. The reference item may be included in the plurality of items in the inventory list, for example. The one or more processors may be configured for determining, utilizing the machine learning model, based on the one or more dimensions of the reference item, dimensions and relative positions of other items in the plurality of items. The one or more processors may be configured for determining the dimensions and relative positions of the other items in the plurality of items with the machine learning model based on detected wall plates and corner points of wall plates with known dimensions or dimensions specified by a user, or by detecting tiles on a floor and corner points of tiles with known dimensions or dimensions specified by a user.

The output from one or more of the modules described herein can be reviewed/edited by the adjusters/reviewers of the insurance company that provides quotes, via an app that is launched on the insurance company end which includes images, inventory items, etc. The mapping or dimension estimating modules in the present systems and methods may be interactive in a way such that the outputs from the modules can be modified/updated as per user adjustments on a user interface (e.g., provided by a user computing platform shown in FIG. 1).

These operations are further described below with reference to FIG. 30-32.

Figure 30:
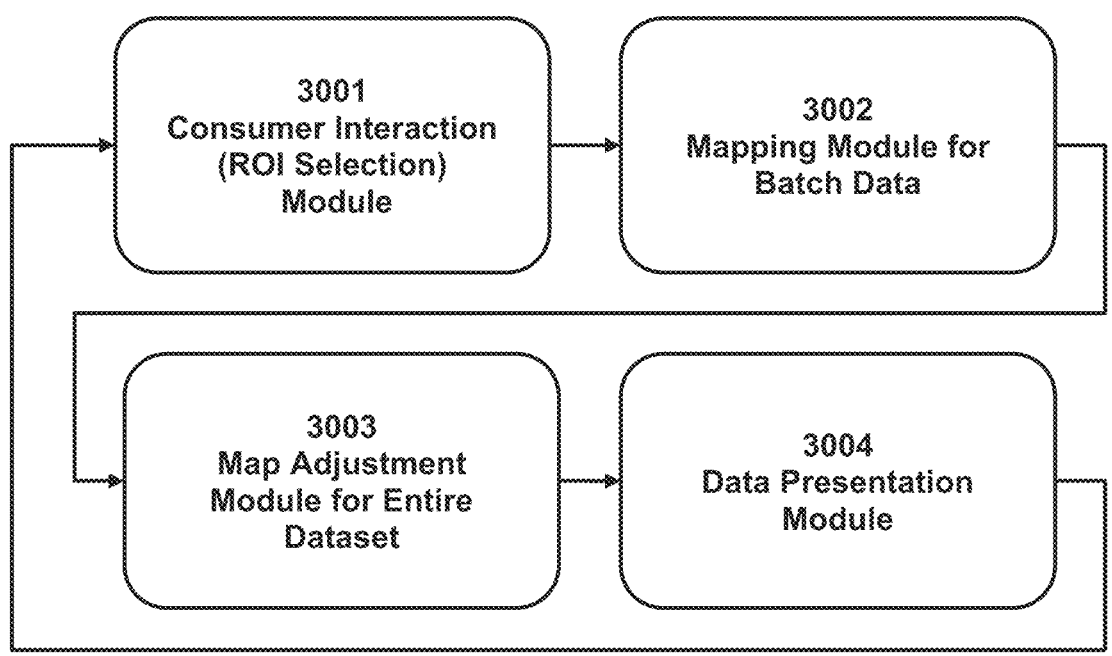
FIG. 30 illustrates an embodiment of a portion of the present system which performs 3D map construction/area estimation in order to estimate the dimensions of inventory items, surfaces, or other objects, in accordance with one or more implementations.

FIG. 30 illustrates an embodiment of a portion of the present system which performs 3D map construction/area estimation in order to estimate the dimensions of inventory items, surfaces, or other objects. Block 3001 is a consumer interaction module similar to or the same as corresponding consumer interaction modules described herein. Block 3001 may facilitate selection of a region of interest, or ROI, (of the location) by the user (e.g., via a user interface presented to the user on a user computing platform shown in FIG. 1). Block 3002 is a mapping module that outputs a 3D reconstruction of the inventory in the room/scene/location, which can then be used to estimate item dimensions. For inventory like walls and floor carpet, the user can interactively select an ROI represented in the description data such that estimation can be limited to a specific area/regions but not the entire surface/item. The blocks illustrated in FIG. 30 and in other figures are user interactive such that the user can at any point specify a reference item dimension in the description data so that it can be used to scale the related parts of the output to be more accurate real world units, using geometric methods. Block 3003 illustrates a post processing module for the mapping module. Once the map is created using all the spatio-temporal data, geometric filtering algorithms are applied to this map to create a more consistent/accurate 3D map. Block 3004 summarizes the machine learning output for the input description data and represents the output in the form of either a set of images or with a 3D rendering of the room/scene/location, with its respective identification and dimension information.

A reference object which has standard dimensions can be used to determine the dimensions of other items that are on the same plane as the reference item. One example to consider is if a user wants to estimate the floor plan/dimensions of a house or other portions of a location. The present system may be configured such that the user captures images of a room which has a floor made of tiles. A computer vision algorithm, such as mapping/3D reconstruction, that is processing these images can estimate the array of tiles in the scene and the user can then enter the size/dimensions of a single tile. This information can then be used to find the dimensions of other items in the whole scene.

Figure 31:
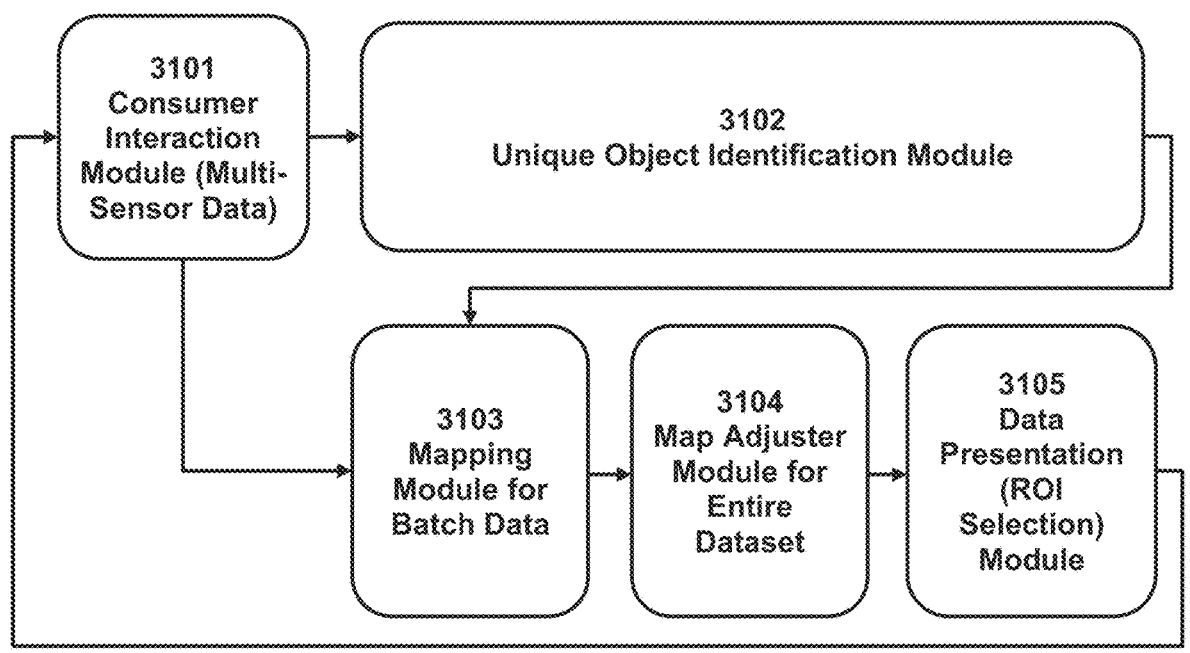
FIG. 31 illustrates another embodiment of the portion of the present system which performs 3D map construction/area estimation in order to estimate the dimensions of inventory items, surfaces, or other objects, in accordance with one or more implementations.

FIG. 31 illustrates another embodiment of the portion of the present system which performs 3D map construction/area estimation in order to estimate the dimensions of inventory items, surfaces, or other objects. Block 3101 illustrates a consumer interaction module similar to or the same as corresponding consumer interaction modules described herein. Block 3102 illustrates a unique object identification module similar to or the same as corresponding unique object identification modules described herein. Block 3103 illustrates a mapping module for batch data. This module uses detections from the unique object identification module to reconstruct items of interest in 3D. Block 3104 illustrates a post processing module for the mapping module (block 3103). Once the map is created using all the spatio-temporal data, geometric filtering algorithms are applied to this map to create a more consistent/accurate 3D map. Block 3105 summarizes machine learning output across the description data and represents the output in the form of a 3D rendering or a set of images where a region of interest (ROI)/item of interest, for which respective identification and dimension information is outputted.

Using a reference item which has standard dimensions, the dimensions of other items that are on the same plane as the reference item can be determined. For example, consider a scene with a standard wall plate and a whiteboard that are attached to a wall. If the user captures a video while panning across the wall, it is hard to identify the real world units with data only from a monocular camera. In this case the present system can use a machine learning model to identify the items by drawing a 2D bounding box around them, and then, within these bounding boxes, extract the corner points of each item. Based on the view, the items in the image can appear skewed. A coordinate system (x, y) can be assigned to the skewed plane on which the items are and then all the items can be deskewed based on the known shape and corner points of each reference item. By using multiple views of the same scene, depth can be estimated at an arbitrary scale (but not real world scale) and plane dimensions can be calculated. Once the real measurements of the reference item are provided, the whole plane can be scaled accordingly, thereby estimating the real world dimensions.

One example to consider is if a user wants to estimate the floor plan/dimensions of a house. The user captures a video of the room which has a floor made of tiles. A machine learning model (like the ones described herein) is used to identify tiles along with the other items and can count the number of such unique items. Then a mapping module can be used for reconstruction of the scene/room on some arbitrary scale. The user can then enter the size/dimensions of a single tile, which can be used to find the dimensions of the whole scene after rescaling.

Figure 32:
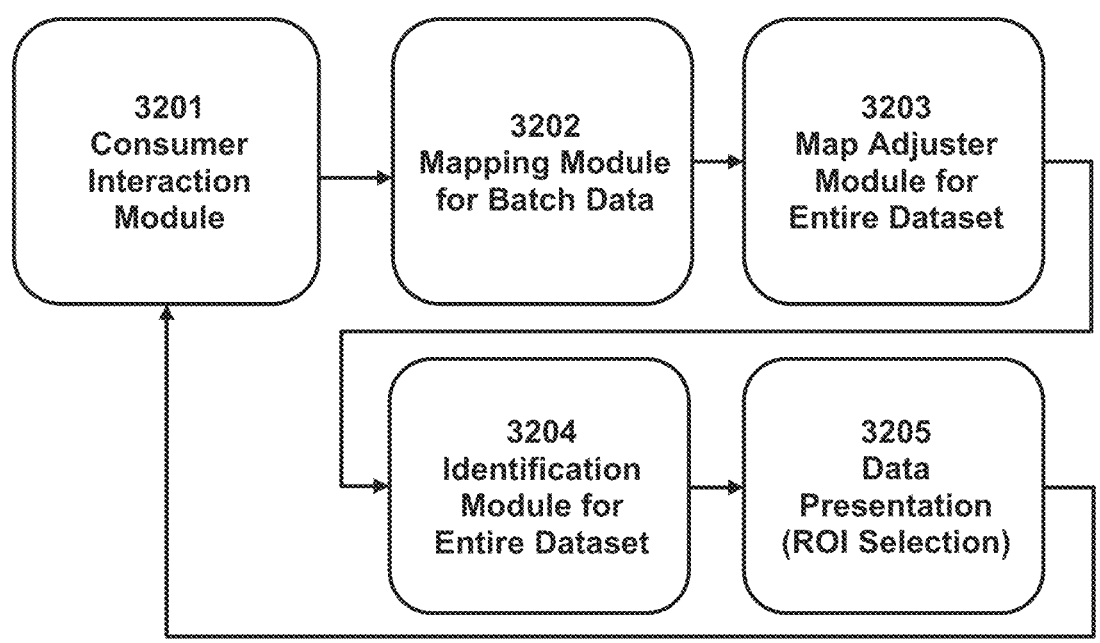
FIG. 32 illustrates another embodiment of the portion of the present system which performs 3D map construction/area estimation in order to estimate the dimensions of inventory items, surfaces, or other objects, in accordance with one or more implementations.

FIG. 32 illustrates another embodiment of the portion of the present system which performs 3D map construction/area estimation in order to estimate the dimensions of inventory items, surfaces, or other objects. Block 3201 illustrates a consumer interaction module similar to or the same as corresponding consumer interaction modules described herein. Block 3202 illustrates a module configured to create a 3D map of a room/scene/location from description data. The map generated can sometimes be incomplete due to occlusions, items being far away from the camera view, etc. In order to account for these challenges this module may be, include, or use a machine learning model (e.g., to interpolate between different images, etc.) to make the map more consistent/complete. Block 3203 is a post processing module for the mapping module similar to or the same as other corresponding post processing modules described herein. Once the map is created using the spatio-temporal data, geometric filtering algorithms may be applied to this map to create a more consistent/accurate 3D map. Block 3204 illustrates a module comprising a machine learning model which reads the 3D map generated from block 3203 and identifies inventory items associated with that map. The identification here in general is a 3D bounding box around the item of interest. One example scenario is using a model, like a 3D convolutional neural network (CNN), on top of a point cloud that specifies a chair which is occluded by an artificial plant in the scene. The model may comprise a 3D bounding box drawn around a chair (for example), specifying the volume of the chair completely so that the dimensions of the chair can be estimated more accurately. Block 3205 summarizes the output across the description data and represents the output in the form of a 3D rendering or a set of images where a user can select any region of interest (ROI) or item of interest, for which respective identification and dimension information is given as output.

Figure 33:
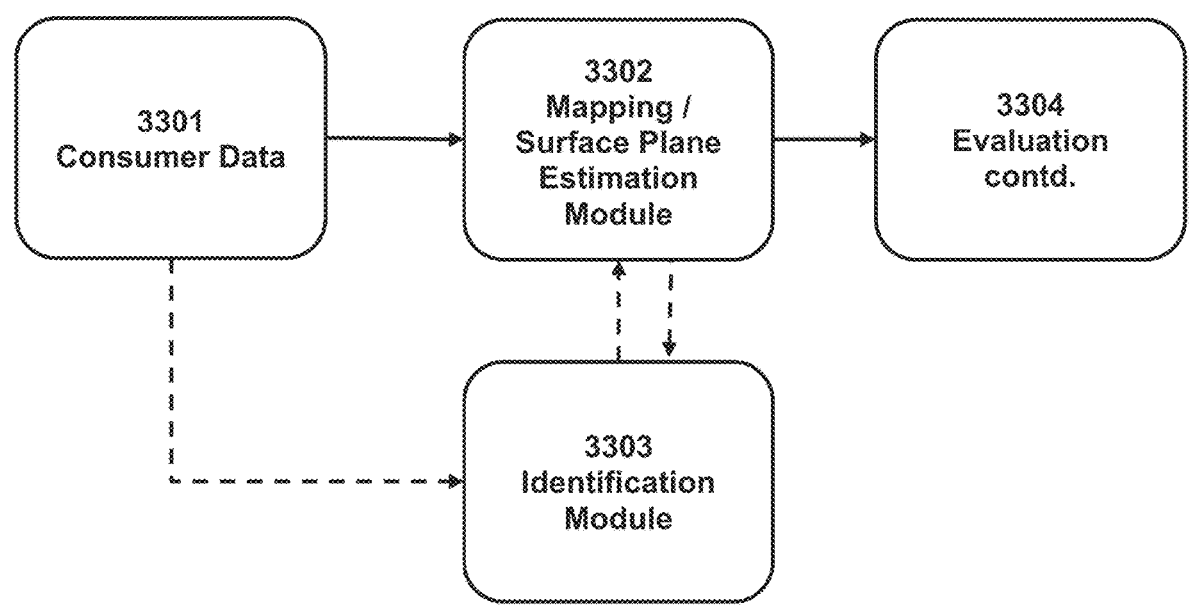
FIG. 33 illustrates another embodiment of the portion of the present system which estimates the dimensions of inventory items, surfaces, or other objects, in accordance with one or more implementations.

FIG. 33 illustrates another embodiment of the portion of the present system which estimates the dimensions of inventory items, surfaces, or other objects. Block 3301 illustrates the description data (e.g., consumer data) from one or more sensors, such as a camera, gyroscope, accelerometer, microphone, etc. Block 3302 illustrates a mapping module similar to or the same as the corresponding mapping modules described herein. This module is used to reconstruct the room/scene/location from the description data in 3D such that dimensions of the items can be calculated. Block 3303 is a machine learning (e.g., AI) identification module similar to or the same as the corresponding machine learning/AI identification modules described herein, and is used optionally to help the mapping module reconstruct the scene using different methods. This module can identify the items in the room/scene/location such as furniture, walls, floors, etc., which can be associated with the 3D map. These identifications can be used to group items when estimating replacement value for multiple items that belong to the same category. For example, if the system needs to estimate the replacement/repaint value of a specific set of walls in a room as chosen by an adjuster, the dimensions of the parts of the 3D room map that are identified by the machine learning algorithm as "wall" can be used to automatically arrive at the total square footage of the specific set of walls. The square footage can then be combined with other information such as type of wall (for e.g., drywall) and cost of materials to arrive at a cost for replacement. The adjusters can also manually annotate/identify items on the 3D interactive map. Block 3304 illustrates continued evaluation, which includes replacement market value estimation and data presentation as described herein. (Note that the consumer data block (in FIG. 33) represents a consumer interaction module as described herein, the mapping module (in FIG. 33) collectively represents mapping and map adjuster modules described herein, the identification module (FIG. 33) represents the unique object identification module shown in FIG. 31, and the identification module shown in FIG. 32.)

Content Claims Example

Figure 34:
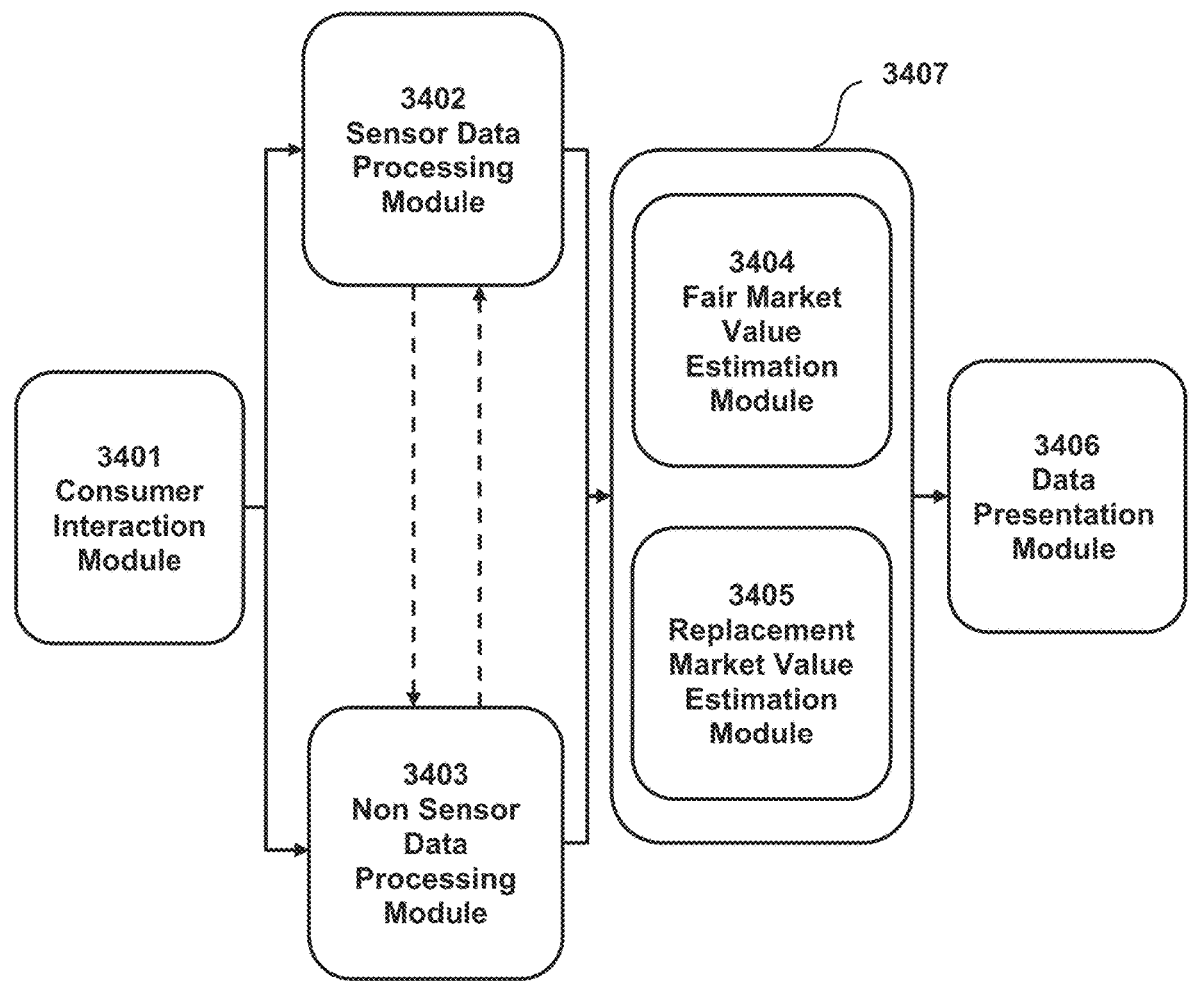
FIG. 34 illustrates a portion of the present system configured for addressing a content claim, in accordance with one or more implementations.

FIG. 34 illustrates a portion of the present system configured to collect relevant information for addressing a content claims adjustment by using sensor and non-sensor data (e.g., illustrated in blocks 3401, 3402, 3403, which illustrate modules similar to or the same as corresponding modules described herein) to estimate the fair market value (block 3404 illustrates a fair market estimation value module), and replacement market value of the items (block 3405 illustrates a replacement market value estimation module) of items listed in a claim. Blocks 3404 and 3405 may collectively form a content claims estimations module 3407, for example. Block 3406 illustrates a data presentation module similar to or the same as corresponding data presentation modules described herein. This portion of the system may form a subset of the blocks shown in FIG. 15, for example. For the purposes of content claims adjustment, the feature detection module (block 1603 in FIG. 16) and hazard/condition identification module (block 1604 in FIG. 16) of the sensor data processing module (block 1502 shown in FIG. 15 and FIG. 16) are not used.

Relevant insurance information that could be identified through sensor data in block 3402 could include, but is not limited to, items detected at the location. The system is agnostic to interior/exterior context differences. Both contexts can take advantage of sensor and non-sensor data processing to aid in the contents claim process. Relevant insurance information that could be retrieved or looked up from a database or third-party source in block 3404 could include, but is not limited to, underwriting information for the items listed in the contents claim, such as their fair market value, replacement market value, damage, condition, etc., as well as current market prices for items or materials, etc. Relevant insurance information discovered through the sensor data processing can be used to enhance the relevant insurance information gathered via lookup/retrieval in non-sensor data processing and vice versa.

A rule-based system or a machine learning algorithm, such as a neural network, could be used for estimating the fair market value and replacement market value of the contents claim items in blocks 3404 and 3405, respectively. The adjusters can also manually update the replacement market value.

Dwelling Claims Example

Figure 35:
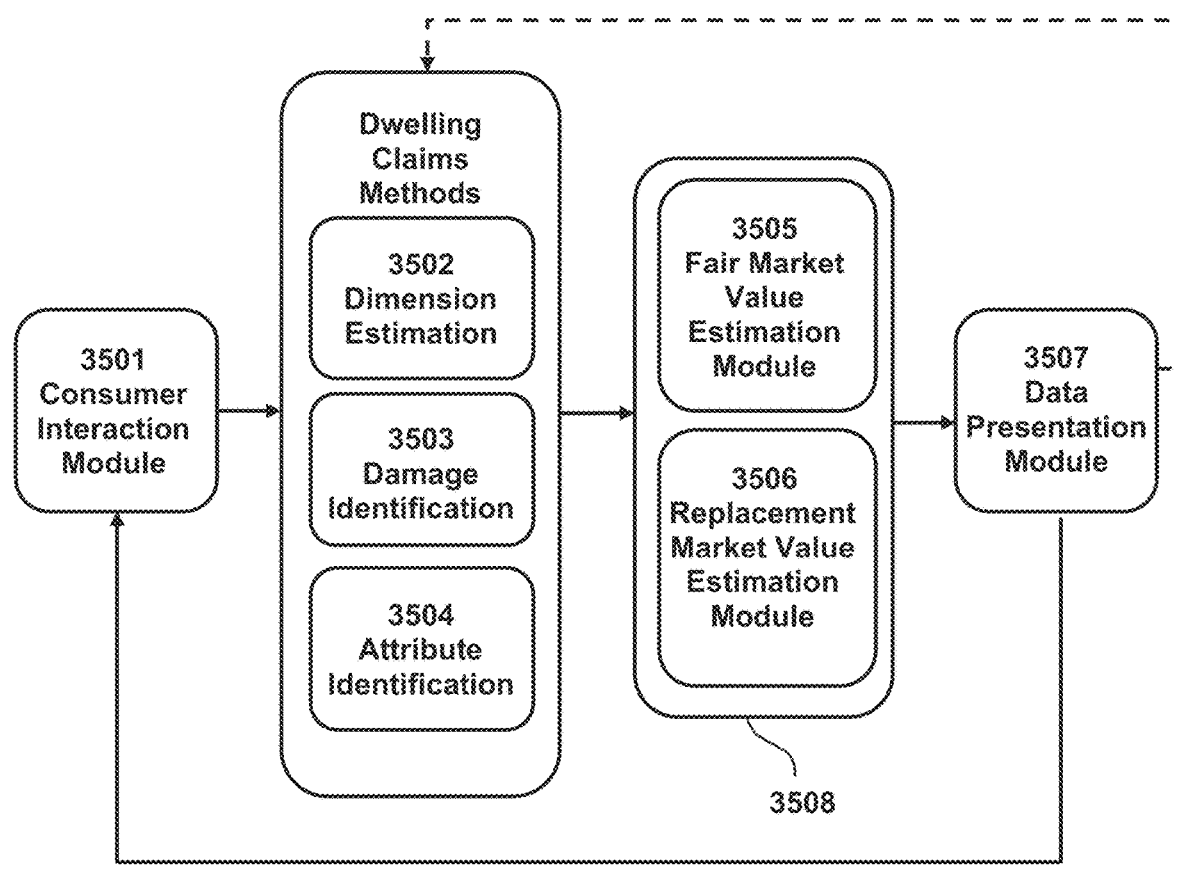
FIG. 35 illustrates a portion of the present system configured for addressing a dwelling claim, in accordance with one or more implementations.

FIG. 35 illustrates a portion of the present system configured for addressing a dwelling claim. Block 3501 illustrates a consumer interaction module that is the same or similar to corresponding consumer interaction modules described herein. Block 3502 illustrates a module which can perform dimension estimation of the particular dwelling component that is subject to a replacement claim. An example where dimension estimation could be used for a replacement claim would be a wall that has to be replaced because of damage due to flooding (note this is just one example).

Block 3503 illustrates a damage Identification module which generally uses a machine learning model to identify damaged portions of the dwelling. For example, a convolutional neural network which does instance segmentation can be used to identify the region on a wall which has damages such as dents, scratches, scuffs, cracks, holes, etc. Block 3502 is not always dependent on block 3503 (and vice versa), in some implementations, the system may be configured to directly estimate the dimensions of walls without having to identify the damage explicitly using a model.

An attribute identification module (illustrated in block 3504) is generally a machine learning algorithm such as decision trees, neural net, etc., which is used to identify the attributes of an item such as material, condition, etc. These attributes are later used in value estimation modules to compare with those of a similar item in new condition or match with a similar item whose value estimate is predetermined and is stored in a database.

The collective information from damage identification, dimension estimation, and attribute identification modules can be used to determine whether the item can be repaired or replaced. For example, glass windows having smaller cracks are most likely to be replaced than repaired and walls with scratches can be repainted/repaired.

In the fair market value estimation module (block 3505) the item identifications and their attributes, such as dimensions, material type, condition, etc., are used to determine relevant information including, but not limited to, value estimates of same items from underwriting, and items that have similar attributes whose value estimates are pre-determined. The module can also update the fair market value based on the dimensions, item counts, etc., of each item before sending this information to the next module. The adjusters can also make changes to the fair market value.

The replacement market value estimation module (illustrated in block 3506) uses either a rule-based system or a machine learning algorithm, such as a decision tree, random forest, neural net, etc., to estimate the cost of replacing the particular item, given attributes such as materials, dimensions, etc., of that item. For example, a part of the wall is damaged and needs to be replaced. The machine learning model compares the attributes of the wall such as its materials, dimensions, etc., to those of a similar wall in new condition, and thereby estimates the replacement value of the damaged wall, regressing from the value of the new wall. The adjusters can also manually update the replacement market value. Block 3507 illustrates a data presentation module similar to or the same as corresponding data presentation modules described herein. Blocks 3505 and 3506 may collectively form a dwelling claims estimation module 3508, for example.

Dwelling Claim Dimension Estimation Example

Figure 36:
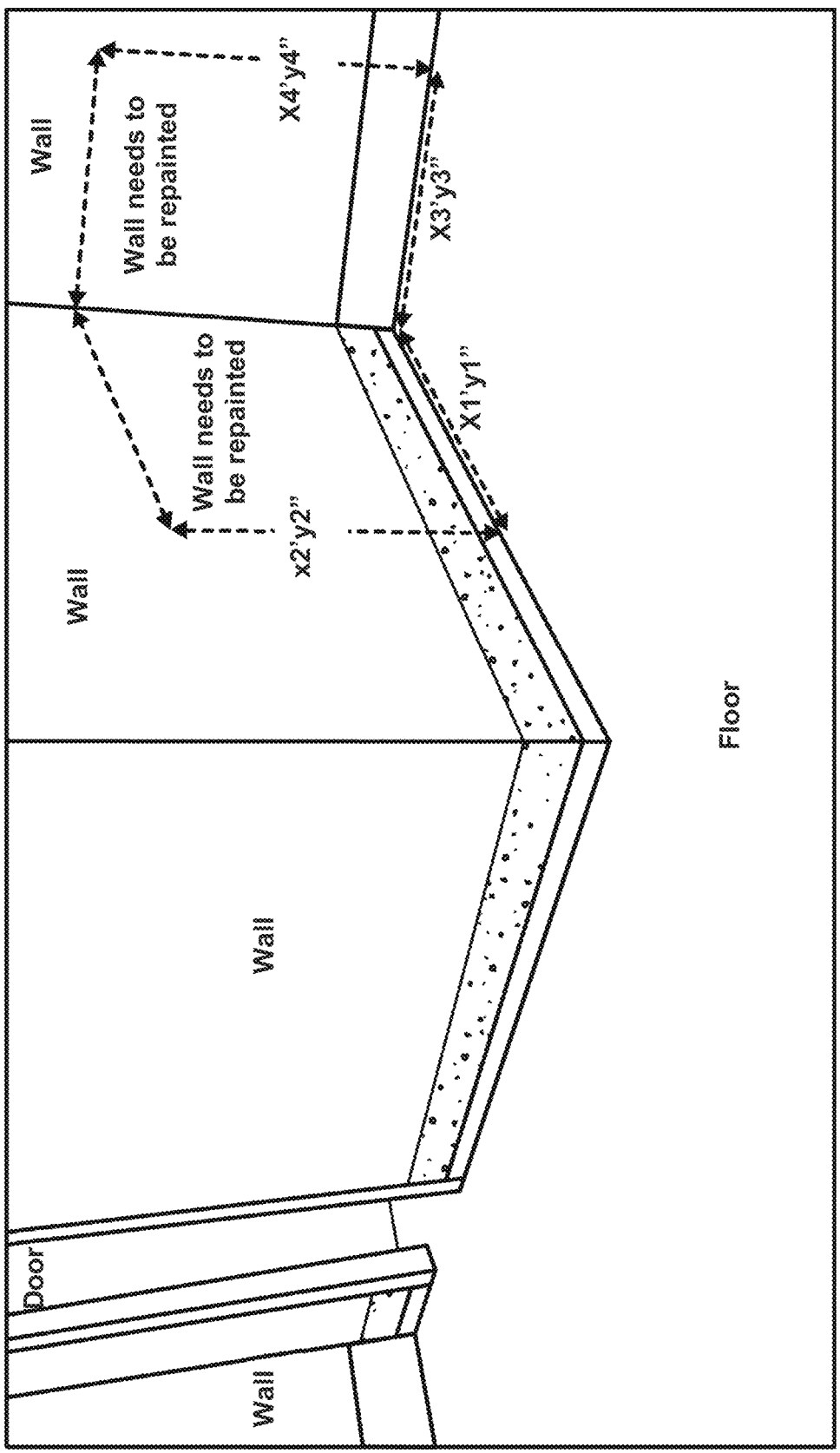
FIG. 36 illustrates an example of how dimension estimation may be used for dwelling claims, in accordance with one or more implementations.

FIG. 36 illustrates an example of how dimension estimation may be used for dwelling claims. Consider an example where portions of two walls covered by dotted lines need to be repainted/replaced, in order to estimate the replacement cost, first the areas of those particular portions need to be measured. Dimension estimation methods as described herein may be used to measure those areas on the walls. A machine learning algorithm can be used to identify the parts of the dwelling, such as wall, floor, door, etc., and the scene can be mapped digitally such that adjusters can review/edit the region of interest (ROI) on the map before the system estimates the replacement value.

Waterline Damage Identification

Figure 37:
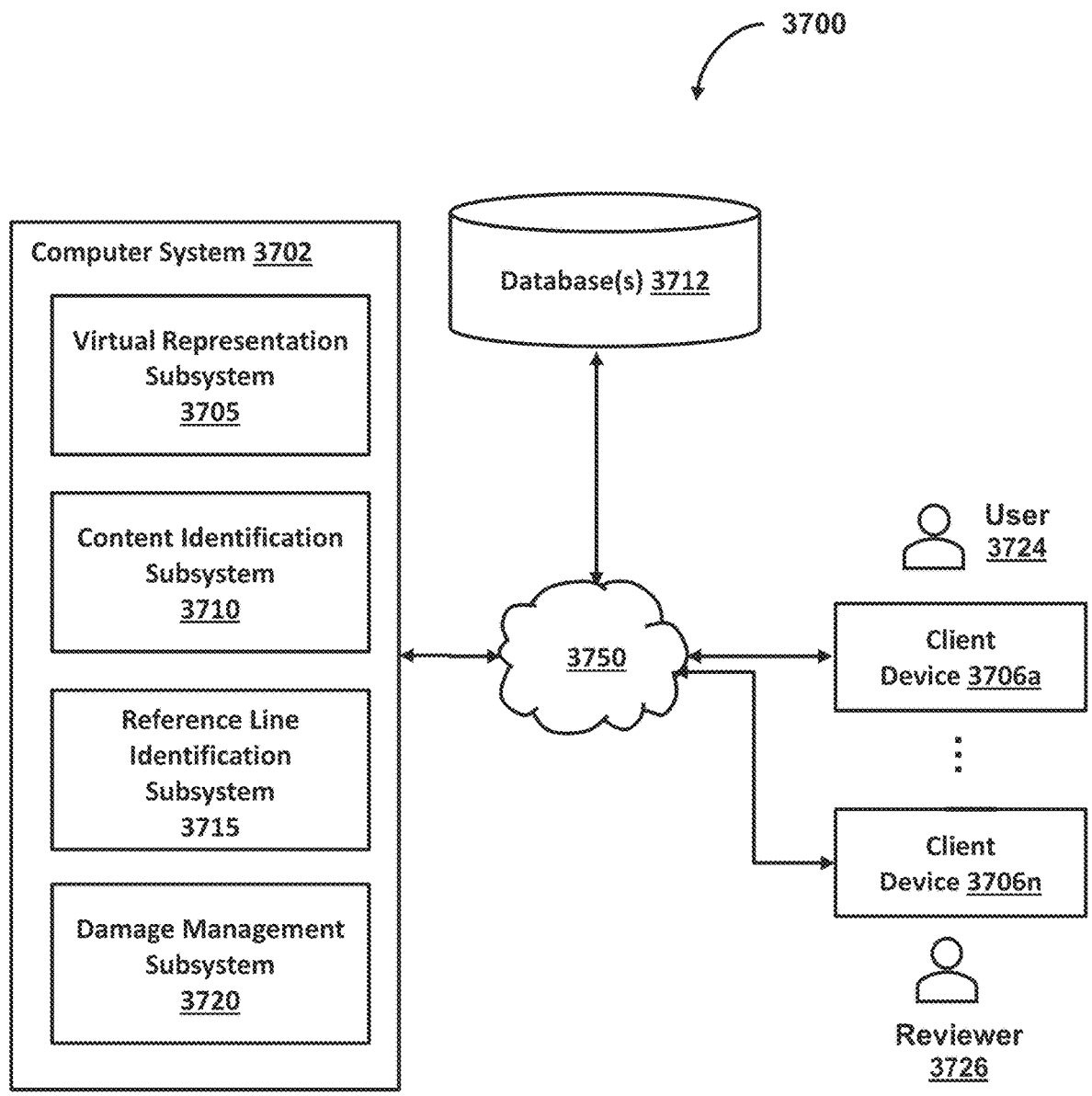
FIG. 37 is a block diagram of a system for determining damage information of content in a physical scene using a virtual representation of the physical scene, in accordance with one or more embodiments.

Continuing with and expanding on the waterline insurance claims description above, FIG. 37 is a block diagram of a system 3700 for determining damage information of content in a physical scene using a virtual representation of the physical scene, in accordance with one or more embodiments. In some embodiments, the system 3700 may be part of system 100 of FIG. 1. For example, system 3700 may comprise an improved processing architecture in networked computer systems. In particular, system 3700 may include a new function routine that automatically determines flood damage to an indoor environment based on virtual representation of a physical scene of the indoor environment. As shown in FIG. 37, system 100 may include computer system 3702, client device 106 (or client devices 3706a-3706n), or other components. By way of example, computer system 3702 may include any computing device, such as a personal computer (PC), a laptop computer, a tablet computer, a hand-held computer, other computer equipment. The computer system 3702 may include virtual representation subsystem 3705, content identification subsystem 3710, reference line identification subsystem 3715, damage management subsystem 3720, or other components. Each client device 106 may include any type of mobile terminal, fixed terminal, or other device. By way of example, client device 106 may include a desktop computer, a notebook computer, a tablet computer, a smartphone, a wearable device, or other client device. Users may, for instance, utilize one or more client devices 106 to interact with one another, one or more servers, or other components of system 3700. As an example, a user 3724 may acquire and upload images of a flood damage to a house to computer system 3702 using the client device 3706a.

A component of system 3700 may communicate with one or more components of system 100 via a communication network 3750 (e.g., Internet, a mobile phone network, a mobile voice or data network, a cable network, a public switched telephone network, or other types of communications network or combinations of communications networks). The communication network 3750 may be a wireless or wired network. As an example, the client device 106 and the computer system 3702 may communicate wirelessly.

It should be noted that, while one or more operations are described herein as being performed by particular components of computer system 3702, those operations may, in some embodiments, be performed by other components of computer system 3702 or other components of system 3700. As an example, while one or more operations are described herein as being performed by components of computer system 3702, those operations may, in some embodiments, be performed by components of client device 3706.

It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, the system 3700 may be configured for identifying flood damage to an indoor environment (e.g., a residential building, a commercial building, or other indoor environments) using a virtual representation of the indoor environment. The damage information may be then used for evaluating flood insurance claims. As an example, the user 3724 may upload images or videos of a physical scene of an indoor environment (e.g., an interior of a house) that shows flood damage in the physical scene. The system 3700 may analyze the images or videos, or generate other virtual representations of the physical scene (e.g., three-dimensional (3D) digital model of the physical scene), identify contents in the physical scene from the virtual representation (e.g., objects such as bed, television, sofa, or other objects; non-objects such as a wall, etc.), determine an extent of flood damage by determining a reference line in the virtual representation that is indicative of a height of the flooding in the physical scene, and then determine content that is damaged based on the reference line. The system 3700 may also facilitate in determining an extent of the damage by obtaining a measurement of the content damaged, obtaining a cost of the content and then determining the cost of the damage based on the measurement information and the cost. The above operations may be performed automatically by the system 3700 or may be supplemented with input from a reviewer 3726 (e.g., a human user who is reviewing the damage to the indoor environment). As an example, the reviewer 3726 may provide input in identifying the contents of the physical scene in the virtual representation, in identifying the reference line, in identifying the damaged content, in determining the cost of a damaged content, or in other operations. The computer system 3702 may be configured to communicate with external resources (e.g., computer servers associated with third-party entities that provide various information, such as cost related information of the contents) to obtain any information that is necessary for determining the extent of flood damage to the indoor environment.

Subsystems 3705-3720

In some embodiments, the virtual representation subsystem 3705 facilitates management of a virtual representation of a physical scene that is subjected to flood damage. For example, the virtual representation subsystem 3705 obtains images or videos of the physical scene from the user 3724 and stores them in the database 3712. In some embodiments, the user 3724 at the site of the damage acquires a virtual representation of the physical scene at the metric scale of the physical scene. This may be in the form of a collection of unordered images with overlapping fields of view, a video, images or video with associated depth information, or a 3D digital model. For example, the virtual representation may be a 3D model, such as a 3D mesh or 3D point cloud, representing the physical scene at a true metric scale. These representations can also be derived from other 3D representations such as a voxel grid or implicit function. In some embodiments, the virtual representations may be geometric in nature or be textured with color. An example of a 3D digital model as viewed in three different ways is illustrated in FIG. 38. The 3D digital model in the FIG. 38 is generated in the form of a textured mesh. A first example 3805 shows a 3D digital model of a first view of the physical scene, a second example 3810 shows a 3D digital model of a second view of the physical scene, and a third example 3815 shows a 3D digital model of a third view of the physical scene. In some embodiments, a mesh is a representation of a 3D surface consisting of vertices connected by edges. The vertices may include the same information as a 3D point cloud, while the edges may define planar surfaces called faces, typically triangular or quadrilateral, which themselves may include color information, surface normal information, texture coordinates, or other such data. In some embodiments, a point cloud is a collection of 3D points in which each point may have information including 3D position, color information, surface normal information, or other such data. In some embodiments, a textured mesh is a mesh representation in which the color is applied to the mesh surface by mapping the mesh surface to RGB images called texture maps that contain the color information for the mesh surface, sometimes at multiple scales.

The 3D digital models may be provided by the user 3724 or may be generated from other virtual representations (e.g., images or video) provided by the user 3724. In some embodiments, the virtual representation subsystem 3705 may generate the 3D digital model using geometric estimation methods such as Structure from Motion (SfM), Simultaneous Localization and Mapping (SLAM), Multi-View Stereo (MVS), machine learning models (e.g., deep learning methods), or other methods.

In some embodiments, the received virtual representation may be a collection of posed RGB-D images, which may have the form of a collection of depth maps with corresponding camera intrinsic and pose information and associated color images. The virtual representation subsystem 3705 may generate a 3D digital model from this virtual representation using any of a number of methods, e.g., RGB-D integration methods such as truncated signed distance function (TSDF) fusion, Kinect Fusion, and Bundle-Fusion (e.g., as described in publication Dai, Angela, et al. "Bundlefusion: Real-time globally consistent 3d reconstruction using on-the-fly surface reintegration." ACM Transactions on Graphics (ToG) 36.4 (2017): 1, which is incorporated by reference in its entirety), or other methods. In some embodiments, a red, green and blue (RGB) image is a 3-channel image representing a view of a captured scene using a color space wherein the color is broken up into red, green, and blue channels. In some embodiments, an RGB-D image is a 4-channel image consisting of an RGB image augmented with a depth map as the fourth channel. The depth may represent a straight-line distance from an image plane to a point in the real world, or represent a distance along a ray from the camera's center of projection to a point in the real world. The depth information may contain unitless relative depths up to a scale factor or metric depths representing an absolute scale. The RGB-D image may also be a RGB image with an associated 1-channel depth map (e.g., both information may not be contained in the same image file). The RGB-D images may include camera intrinsic information, such as extrinsic matrix or an intrinsic matrix. The extrinsic matrix may be a representation of the rigid-body transformation between a fixed 3D Cartesian coordinate system defining the space of a virtual world and a 3D Cartesian coordinate system defining that of a real world from the viewpoint of a specific camera. The intrinsic matrix may be a representation of physical attributes of a real camera comprising focal length, principal point, and skew. In some embodiments, the pose information in the virtual representation may be a pose matrix, which may be a representation of a camera's relative or absolute orientation in the virtual world, comprising a 3-degree-of-freedom rotation of the camera and the 3-degree-of-freedom position in the real world. The pose matrix may be considered as an inverse of the extrinsic matrix. In some embodiments, a posed image is a 2D image with associated information describing the capturing camera's relative orientation in the real world, comprising the intrinsic matrix and the pose matrix or extrinsic matrix.

In some embodiments, the virtual representation may also be a manually designed 3D model, created by a human user such as an architect, using any of a number of applications, such as computer-aided design (CAD) software applications or other applications.

In some embodiments, the content identification subsystem 3710 facilitates determination of a list of contents (e.g., objects and non-objects) in the physical scene by spatially-localizing and identifying content of the physical scene on the virtual representation. A content may be an object such as a bed, a television, a sofa, or other item in the real world. The content may also be a structure or non-object such as a wall, a pillar, a roof, or other structure in the real world. The content identification subsystem 3710 may identify the content automatically, e.g., using a machine learning model, or may provide a graphical user interface (GUI) that may allow the user 3724 to provide identification information of the content. For example, the GUI may provide tools that enable the user 3724 to identify (e.g., annotate) the content.

Such tools may allow the user 3724 to draw polygonal shapes (e.g., 2D bounding boxes, segmentation outlines, or other shapes), polyhedral shapes (e.g., 3D bounding boxes, 3D mesh face selection/segmentation, or other shapes) localizing the spatial position of contents in the virtual representation of the physical scene. The tools may also enable the user 3724 to add natural language labels for contents to provide various information (e.g., information describing what the contents are, their material composition, their purpose, their value, or other desired informational content). The tools may provide other methods for associating information with contents in the virtual representation.

Figure 39:
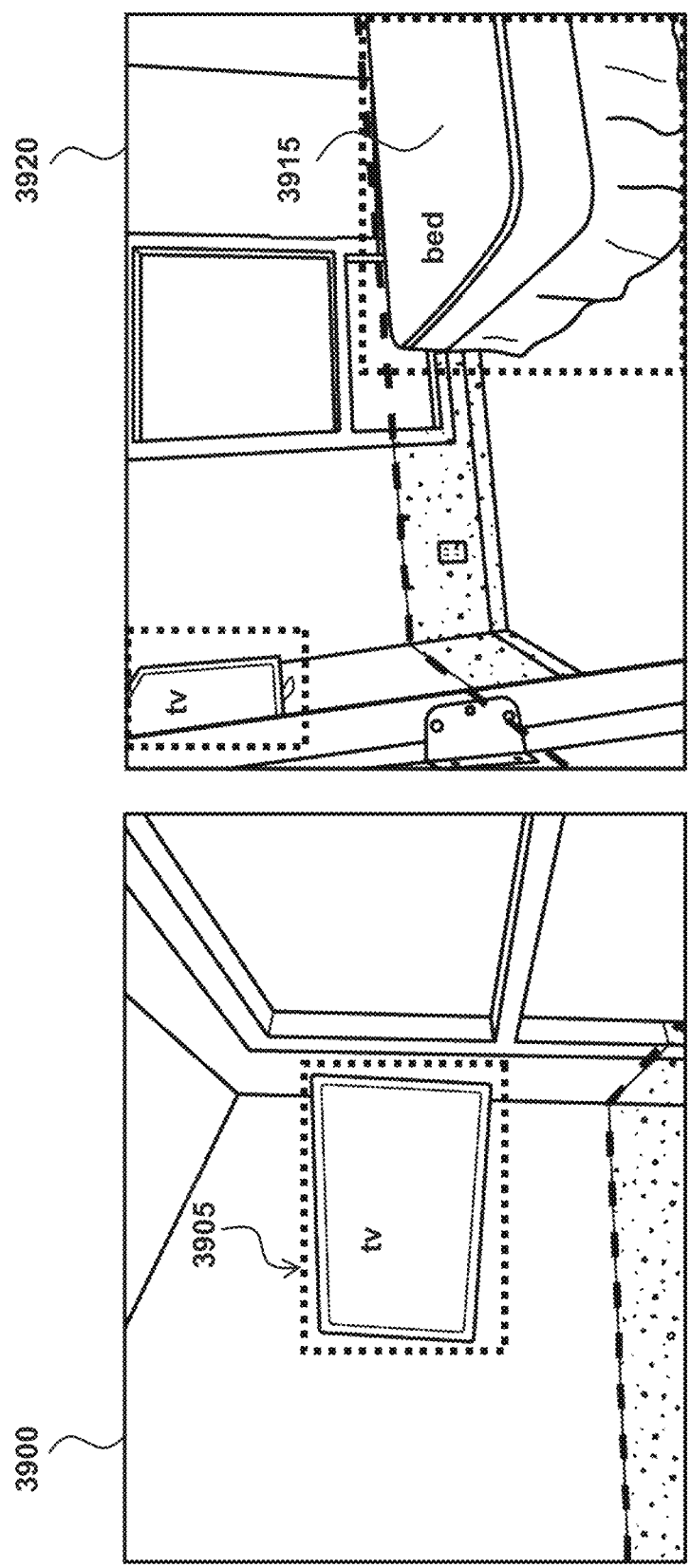
FIG. 39 shows content identification in a 2D virtual representation of a physical scene, in accordance with one or more embodiments.

In some embodiments, the content identification subsystem 3710 may also be configured to identify the contents in the virtual representation using a machine learning model that is trained to spatially localize and identify contents in the virtual representation. For example, for a virtual representation comprising a collection of images, the content identification subsystem 3710 may use a machine learning model that is implemented using 2D image recognition algorithms that facilitate object detection, semantic segmentation, instance segmentation, or panoptic segmentation. The content identification subsystem 3710 may use any of a number of methods to spatially localize and identify content in ordered images, such as frames sampled from a video. For example, the content identification subsystem 3710 may use a method implemented using an image processing algorithm, a statistical or geometrical estimation algorithm, or another algorithm. In another example, the content identification subsystem 3710 may use a machine learning model that may be implemented using tracking algorithms such as single or multi-object tracking, feature-matching methods, optical flow estimation, relative camera pose estimation, multi-view projection, or other such methods. FIG. 39 shows content identification in a 2D virtual representation of a physical scene, in accordance with one or more embodiments. The virtual representations 3900 and 3920 are 2D images of a room in a house. The content identification subsystem 3710 analyzes the virtual representation 3900 to spatially localize and identify contents of the physical space on the virtual representation 3900. For example, the content identification subsystem 3710 adds an annotation 3905, such as "tv," to an object in the virtual representation 3900 that corresponds to a television in the room. In another example, the content identification subsystem 3710 adds an annotation 3915, such as "bed," to an object in the virtual representation 3920 that corresponds to a bed in the room.

Figure 40:
FIG. 40 shows content identification in a 3D virtual representation of a physical scene, in accordance with one or more embodiments.

In some embodiments, the content identification subsystem 3710 may use a machine learning model that is implemented using 3D recognition algorithms including object detection, semantic segmentation, instance segmentation, or other methods to spatially localize and identify content in a 3D digital model-based virtual representation. FIG. 40 shows content identification in a 3D digital model of a physical scene, in accordance with one or more embodiments. The virtual representation 4005 is a 3D digital model of a room in a house. The content identification subsystem 3710 analyzes the virtual representation 4005 to spatially localize and identify contents of the physical space on the virtual representation 4005. For example, the content identification subsystem 3710 adds an annotation 4010, such as "Desk Chair," to an object in the virtual representation 4005 that corresponds to a chair in the physical scene.

In some embodiments, the content identification subsystem 3710 may use a machine learning model that is implemented using 2D object recognition algorithms, including object detection, semantic segmentation, instance segmentation, panoptic segmentation, or other methods, for identifying content in 3D digital models with associated images and geometric camera information (e.g., intrinsic and extrinsic matrices). The outputs of the 2D object recognition algorithms on each image may then be transferred to the 3D digital model using the associated geometric camera information.

After the contents are identified in the virtual representation, in some embodiments, the content identification subsystem 3710 may then post-process the output of the machine learning model to suppress any duplicate recognition of the content. The content identification subsystem 3710 may be configured to identify and remove duplicates using any of a number of duplicate suppression methods, e.g., non-maximum suppression, confluence, class-based suppression, heuristic suppression (such as for duplication that may occur due to properties of contents in the physical scene such as reflectance in windows, mirrors, or televisions), similarity matching, object re-identification, or other methods. The content identification subsystem 3710 may be configured to identify and remove duplicates in a single virtual representation or across multiple virtual representations of the physical scene. The content identification subsystem 3710 may display the post-processed virtual representation to the user 3724 through a GUI. The post-processed virtual representation may include annotated information of a list of contents identified by the content identification subsystem 3710. The GUI may provide tools that enable the user 3724 to add, remove, edit, or otherwise modify the spatial localizations or labels (e.g., annotations) that have been automatically generated.

In some embodiments, the machine learning model used by the content identification subsystem 3710 is trained to identify contents (e.g., objects and non-objects) in the virtual representation. For example, training data used to train the machine learning model may include a number of virtual representations, such as images, videos, 3D digital models or other virtual representations of an indoor environment such as residential or commercial buildings. The virtual representations in the training data may be annotated, or include labels, to identify the contents in each of the virtual representations. The training process may be an iterative process and each iteration may include inputting a virtual representation from the training data to the machine learning model, obtaining an output of the machine learning model (e.g., a predicted identification of the content) for a specified content in the virtual representation, computing a cost function that is indicative of a difference between the predicted identification information and the actual identification information in the label for the specified content, and adjusting parameters (e.g., weights or biases) of machine learning model to reduce the cost function. The above training process is repeated by inputting other virtual representations from the training data until a training condition is satisfied. In some embodiments, the training condition is satisfied when the number of iterations satisfies a threshold number, when the cost function is minimized, when a rate at which the cost function reduces is below a threshold, or other such condition. After the training process concludes, the machine learning model may be considered to be "trained" and the trained machine learning model may be used to predict or identify content from an unseen virtual representation (e.g., a virtual representation that has not been previously processed by the machine learning model). In some embodiments, the content identification subsystem 3710 may use a number of machine learning models to identify or spatially localize the content on the virtual representation.

Figure 41A:
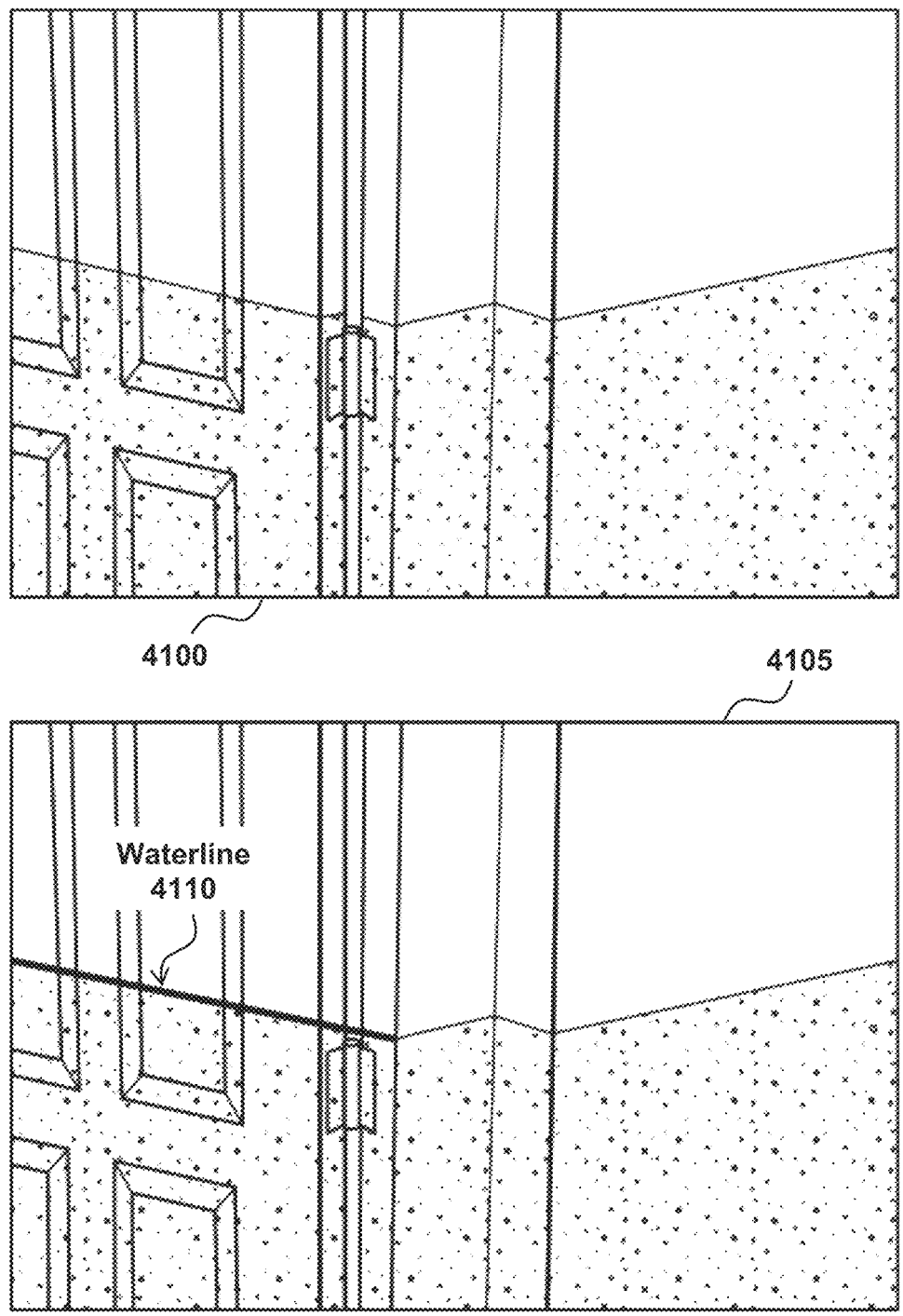
FIG. 41A shows waterline identification in a 2D virtual representation of a physical scene, in accordance with one or more embodiments.

In some embodiments, the reference line identification subsystem 3715 facilitates determination of a reference line in the virtual representation that is indicative of a vertical extent of the damage in the physical scene. For example, if the damage is flood damage, the reference line may be a waterline that indicates a maximum height to which water level had risen in the physical scene. In the context of the virtual representation, the waterline denotes a plane orthogonal to the vertical axis of the virtual world's coordinate system that indicates the highest level that water has risen in the physical scene. The reference line identification subsystem 3715 may be configured to identify, in the virtual representation (e.g., in images), traces left by the waterline to construct lines or contours across the physical scene (e.g., in the virtual representation) to represent the level at which the physical scene was flooded. FIG. 41A shows waterline identification in a 2D virtual representation of a physical scene, in accordance with one or more embodiments. The virtual representation 4105 is a 2D image of a building that is damaged due to flooding. The reference line identification subsystem 3715 analyzes the virtual representation 4105 to determine a reference line on the virtual representation 4105 that corresponds to a vertical extent of the damage due to flooding. For example, the reference line identification subsystem 3715 adds a waterline 4110 in the virtual representation 4105 that corresponds to a height to which the water level had risen in the building.

The reference line identification subsystem 3715 may determine the reference line in various ways. In some embodiments, the reference line identification subsystem 3715 may provide the virtual representation of the physical scene (e.g., image 4105) in a GUI. The user 3724 may use the GUI to manually set a reference line (e.g., waterline 4110) in the virtual representation denoting a maximal vertical extent that water has risen in the physical scene. This waterline may represent a plane orthogonal to the vertical axis of the virtual representation. The volume beneath this plane may encompass the scope of the flood damage to the contents. For example, given a virtual representation aligned to a 3D Cartesian coordinate system wherein −Y indicates the direction of gravity in the corresponding physical scene and Y=0 indicates the ground level of the physical scene, the user 3724 may set the waterline to Y=1 meter, which would indicate that water has risen to a maximum height of 1 meter above the ground, inclusive, and has potentially impacted all contents within 1 meter of the ground. In the image 4105, the waterline 4110 may indicate a height to which the water has risen and that potentially all contents below the waterline 4110 are impacted.

Figure 41B:
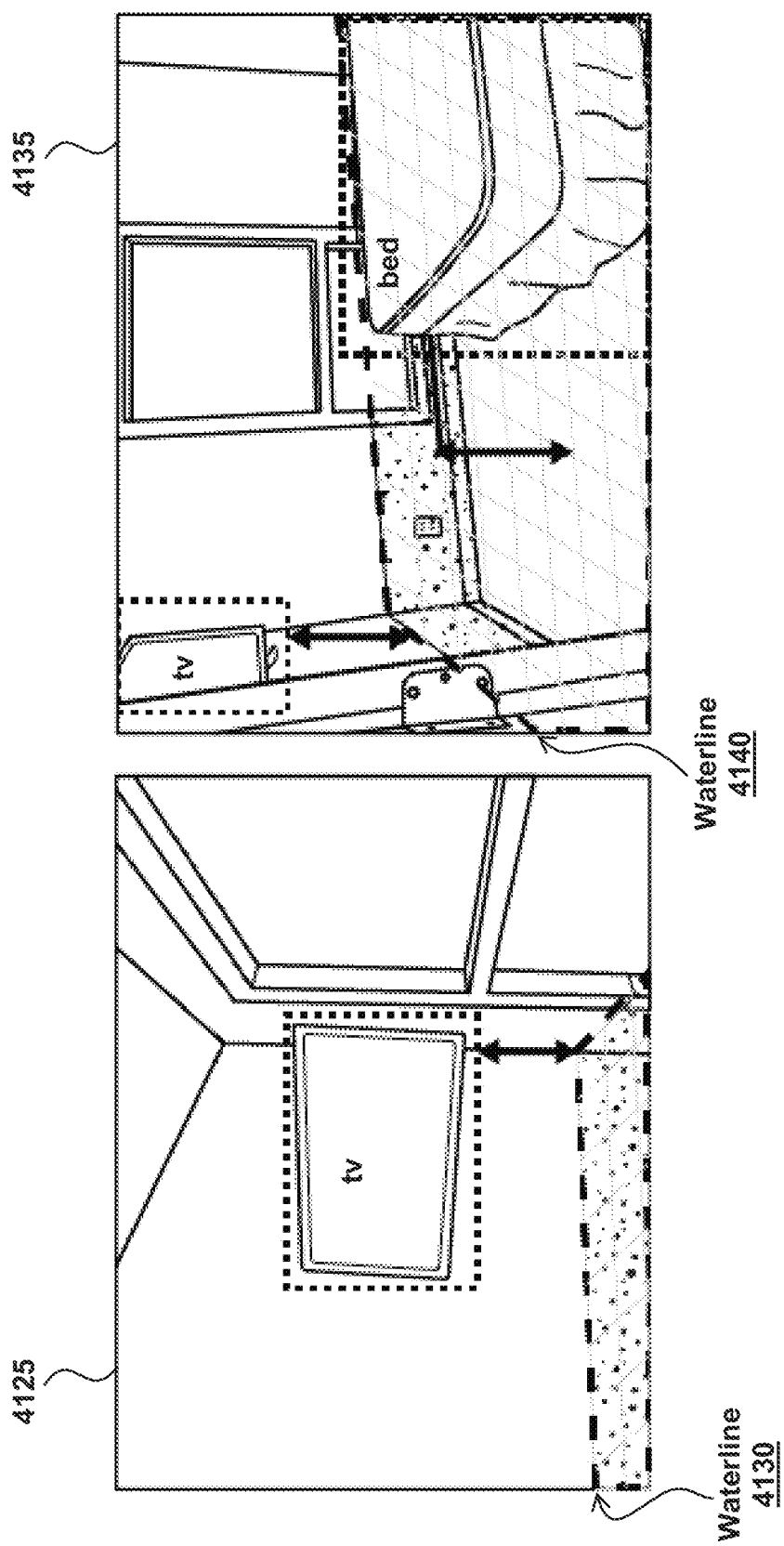
FIG. 41B shows waterline identification in a 2D virtual representation of a physical scene, in accordance with one or more embodiments.

The GUI may enable the user 3724 to set and adjust this waterline value through natural language, a slider element, directly on the virtual representation, or other methods. The representations of the reference line on the virtual representation may include a set of 2D lines imposed on one or more images, as illustrated in FIG. 41B.

In some embodiments, the reference line identification subsystem 3715 may use a machine learning model or an image processing model to determine the reference line from the virtual representation of the physical scene. In some embodiments, the reference line identification subsystem 3715 may identify visual artifacts such as lines, contours, traces left by the waterline in the physical scene, or color changes caused by the flood damage to contents in the physical scene in the images associated with the virtual representation.

The reference line identification subsystem 3715 may be configured to determine the reference line using several methods. One such method may involve modeling the reference line identification subsystem 3715 to determine the reference line as a line detection or line fitting problem, where edges are detected in the image using image processing methods (e.g., Canny edge detection, Sobel filtering, etc.) and lines are fit to these edges using any of a number of line fitting algorithms (e.g., Hough transform), template matching with various predesigned image templates that match a typical reference line. In some embodiments, when there are several images of the reference line available (e.g., in a video), the detected line may be filtered and tracked in continuous frames using any of a number of techniques, such as a Kalman filter. In some embodiments, the reference line identification subsystem 3715 may use a machine learning model, e.g., deep learning techniques such as convolutional neural networks (CNN), to localize and optionally segment the reference line on the 2D image. The machine learning model may output a binary classification indicating whether or not each pixel contains the presence of a reference line. This output may be further refined using methods such as random sample consensus (RANSAC) to perform outlier rejection or by minimizing an energy function using an optimization framework such as a conditional random field (CRF) to create a smooth contour of the reference line on the virtual representation.

In some embodiments, the machine learning model is trained to determine the reference line in the virtual representation. For example, the training data used to train the machine learning model may include a number of images with a reference line in the image, with a variety of cases where the reference line marks are not contiguous, occluded, appear as patches, etc. The training process may be an iterative process and each iteration may include inputting an image from the training data to the machine learning model, obtaining an output of the machine learning model (e.g., a predicted reference line position in the image) for the specified image, computing a cost function that is indicative of a difference between the predicted reference line information and the actual reference line information, and adjusting parameters (e.g., weights or biases) of machine learning model to reduce the cost function. The above training process is repeated with other virtual representations from the training data until a training condition is satisfied. The images may be input repeatedly and in random order until the training condition is satisfied. In some embodiments, the training condition is satisfied when the number of iterations satisfies a threshold number, when the cost function is minimized, when a rate at which the cost function reduces is below a threshold, or other such condition. After the training process concludes, the machine learning model may be considered to be "trained" and the trained machine learning model may be used to predict or determine a reference line from an unseen virtual representation (e.g., a virtual representation that has not been previously processed by the machine learning model). For example, by inputting an image 4100, which is a 2D virtual representation of a physical scene that has sustained flood damage, to the machine learning model, an output such as the image 4105 with the waterline 4110 may be generated from the machine learning model. In some embodiments, the output of the machine learning model may be pixel information indicating a presence or absence of the waterline 4110 in each pixel of the image 4100, and the reference line identification subsystem 3715 may use a renderer or other image processing application to render the waterline 4110 on the image 4100 based on the pixel information. In some embodiments, the reference line identification subsystem 3715 may use a number of machine learning models to determine the reference lines on the virtual representation.

In some embodiments, the machine learning model is trained to determine a flood plane height in the virtual representation. For example, the training data used to train the machine learning model may include a number of 3D virtual representations with associated flood plane heights, with a variety of cases where visual indicators of flood damage are not obvious, the vertical extent is not clearly defined, etc. The training process may be an iterative process and each iteration may include inputting one or more images associated with the 3D virtual representation or the 3D virtual representation itself to the machine learning model, obtaining an output of the machine learning model (e.g., a height of the flood plane in the 3D virtual representation) for a specified 3D virtual representation, computing a cost function that is indicative of a difference between the predicted flood plane information and the actual flood plane information, and adjusting parameters (e.g., weights or biases) of machine learning model to reduce the cost function. The above training process is repeated with other virtual representations from the training data until a training condition is satisfied. The inputs may be provided repeatedly and in random order until the training condition is satisfied. In some embodiments, the training condition is satisfied when the number of iterations satisfies a threshold number, when the cost function is minimized, when a rate at which the cost function reduces is below a threshold, or other such condition. After the training process concludes, the machine learning model may be considered to be "trained" and the trained machine learning model may be used to predict or determine a reference line from an unseen virtual representation (e.g., a virtual representation that has not been previously processed by the machine learning model). For example, by inputting a 3D virtual representation 4145, which is a 3D virtual representation of a physical scene that may have sustained flood damage, to the machine learning model, an output such as the flood plane indicated by waterline 4150 may be generated from the machine learning model. In some embodiments, the output of the machine learning model may be a single scalar value representing the height of the flood plane and the reference line identification subsystem 3715 may use a renderer or other image processing application to render the waterline 4150 on the virtual representation 4145 based on the flood plane information. In some embodiments, the reference line identification subsystem 3715 may use a number of machine learning models to determine the flood planes on the virtual representation.

In some embodiments, the reference line identification subsystem 3715 may provide a GUI for adjusting the reference line determined by the machine learning or image processing models. The user 3724 may adjust the reference line using the GUI.

FIG. 41B shows waterline identification in a 2D virtual representation of a physical scene, in accordance with one or more embodiments. The virtual representation 4125 is a 2D image of a room that is damaged due to flooding. The reference line identification subsystem 3715 analyzes the virtual representation 4125 to determine a reference line 4130 on the virtual representation 4125 that corresponds to a height to which the water level had risen in the building and therefore, a vertical extent of the damage due to flooding.

Figure 41C:
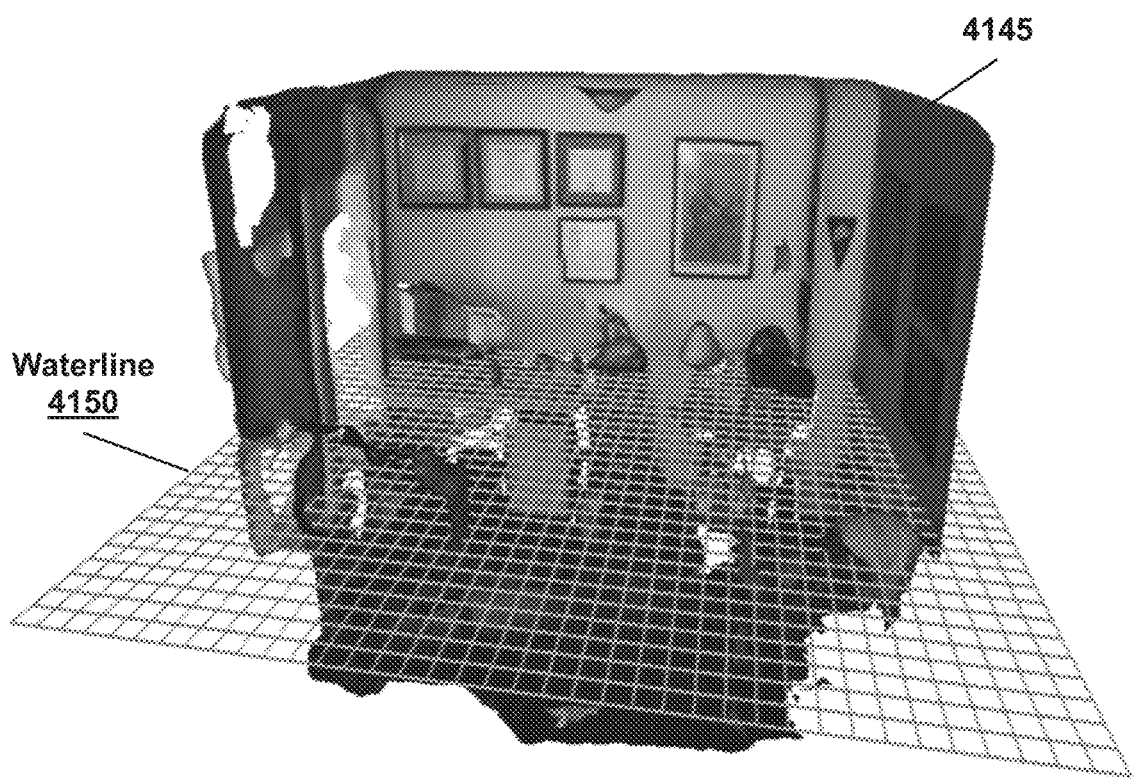
FIG. 41C shows waterline identification in a 3D virtual representation of a physical scene, in accordance with one or more embodiments.

The representations of the reference line on the virtual representation may include a set of 2D lines or a virtual plane imposed on a 3D digital model, as illustrated in FIG. 41C. FIG. 41C shows waterline identification in a 3D virtual representation of a physical scene, in accordance with one or more embodiments. The virtual representation 4145 corresponds to a 3D digital model of a room that is damaged due to flooding. The reference line identification subsystem 3715 analyzes the virtual representation 4145 to determine a reference plane 4150 on the virtual representation 4145 that corresponds to a height to which the water level had risen in the building and therefore, a vertical extent of the damage due to flooding. The damaged regions (e.g., water-affected regions) may be represented in various ways, e.g., by a shaded area or volume beneath the reference line representation.

In some embodiments, the damage management subsystem 3720 facilitates determining content damage information (e.g., identification of content in the virtual representation that is damaged in the real world). For example, the damage management subsystem 3720 may provide a GUI to facilitate the user 3724 to identify the spatially-localized contents (e.g., the list of contents identified using content identification subsystem 3710) as damaged or not damaged on the virtual representation. For example, the user 3724 may select a spatially-localized region, denoting content, and indicate if the region is damaged or not damaged. In some embodiments, the GUI may also facilitate the user 3724 to indicate a type of damage. Damage to certain contents may require more information beyond the binary indication of damaged or not damaged. For example, flood damage may lead to rotten wood or mold growth, both of which may render a structure hazardous and in need of repair or replacement. The user 3724 may indicate these or other specific types of damage to spatially-localized contents through the GUI.

Figure 42:
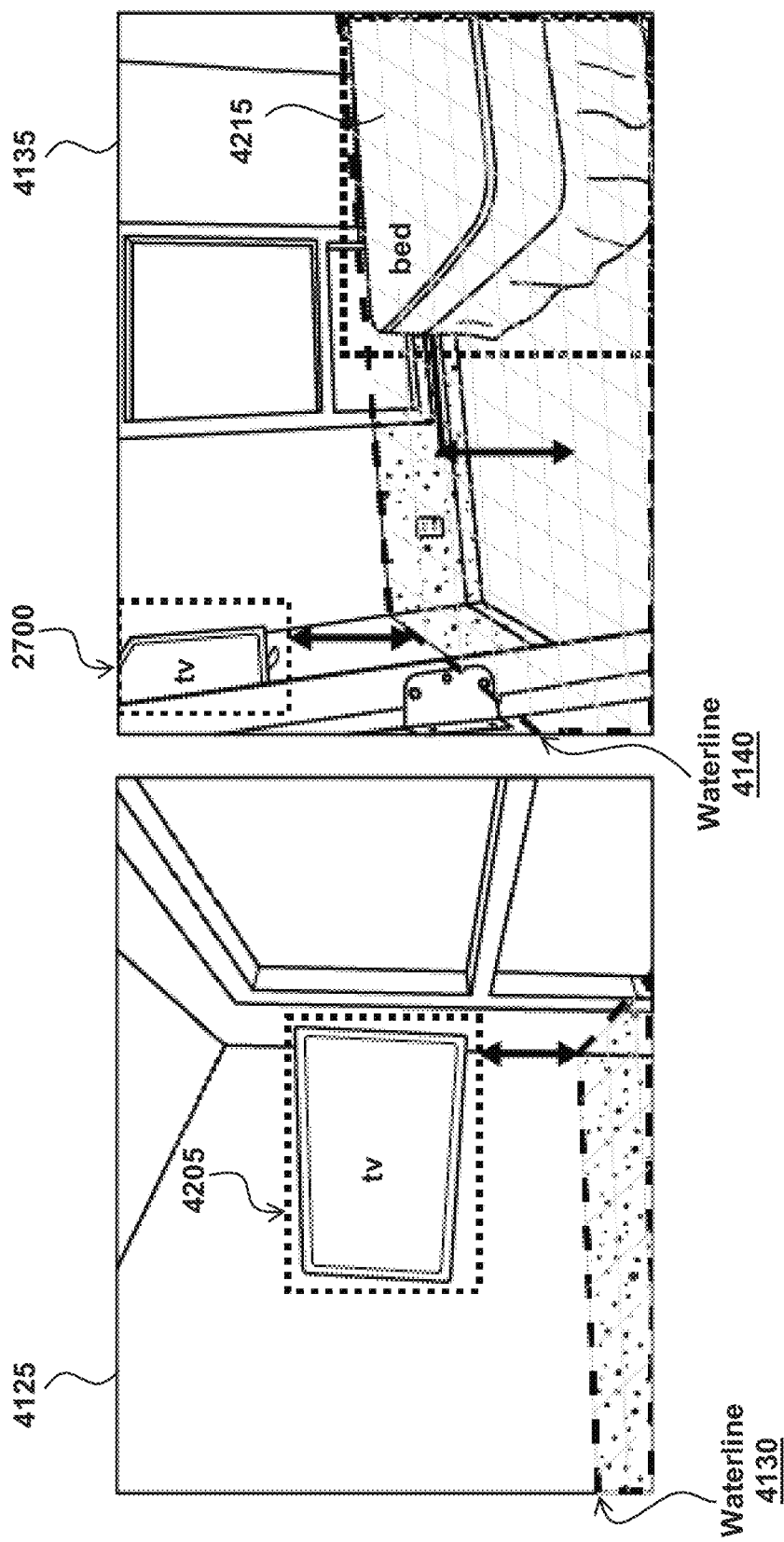
FIG. 42 shows damage identification in a 2D virtual representation of a physical scene, in accordance with one or more embodiments.

In some embodiments, the damage management subsystem 3720 may automatically identify the spatially-localized contents using the reference line. The damage management subsystem 3720 may determine, based on the positions of the reference line and the content in the virtual representation, which individual items in the list of contents is likely to sustain flood damage. As the reference line indicates the highest level that water has risen in the physical scene, it may be assumed that the contents located beneath the reference line are likely to have been impacted by the water. Accordingly, the damage management subsystem 3720 may be configured to automatically identify the contents that fall into this spatial region (e.g., intersecting with or below the reference line) in the virtual representation as damaged, and automatically identify contents above the reference line as not damaged. FIG. 42 shows damage identification in a 2D virtual representation of a physical scene, in accordance with one or more embodiments. The damage management subsystem 3720 aligns the plane represented by the reference line 4140 (e.g., determined using reference line identification subsystem 3715) with the virtual representation 4135 and checks the spatially-localized contents (e.g., identified using content identification subsystem 3710) against the reference line 4140 to determine the damage. For example, the damage management subsystem 3720 is configured to determine the spatially-localized contents at or below the plane represented by the reference line 4140 as damaged (e.g., bed 4215) and those above the plane represented by the reference line 4140 as not damaged (e.g., tv 4205). Similarly, the damage management subsystem 3720 is configured to determine the spatially-localized contents at or below the plane represented by the reference line 4130 as damaged (e.g., carpet) and those above the plane represented by the reference line 4130 as not damaged (e.g., tv).

In some embodiments, the damage management subsystem 3720 may be configured to apply heuristics to determine if certain contents above the reference line should also be identified as damaged and if certain contents below or intersecting with the reference line should be identified as not damaged. For example, structural elements such as walls that intersect the waterline may be identified as fully damaged, as their structural integrity may be compromised due to the flood damage and flood damage to walls is known to lead to further damages such as mold and bacteria infestations.

After the contents and structure have been automatically specified as damaged or not damaged, the user 3724 may add, remove, edit, or otherwise modify the identified damage and any associated information through the GUI. For example, anything that was misidentified as damaged by the damage management subsystem 3720 may be corrected by the user 3724 using the GUI. Similarly, any contents that were not identified as damaged may be annotated as such with the relevant information.

In some embodiments, the damage management subsystem 3720 may also facilitate determination of an extent of the damage. The damage management subsystem 3720 may provide a GUI that enables the user 3724 to measure the extent of the damage. The damage management subsystem 3720 may automatically compute or determine distance, surface area, volume, or other such measurements based on some user input. For example, the GUI may provide tools to enable the user 3724 to draw curves and polygonal or polyhedral regions on the virtual representation from which the above measurements may be automatically computed. The GUI may also enable the user 3724 to select a spatially-localized region and display an aggregated surface area and volume measurement of the selected region. These measurements may denote the spatial extent of the flood damage and may be associated with their corresponding spatial locations on the virtual representation. These associated measurements may be saved along with the virtual representation for the purposes of communicating the information to relevant parties for the insurance claims adjustment process. The extent of damage information (e.g., contents damaged, measurement of the contents damaged, or other such information) may be stored in the database 3712 for further use by insurance claims adjustment process or for further transmission to another entity (e.g., entity associated with insurance claims adjustment process). In some embodiments, the insurance claims adjustment process may determine the cost of the damage.

In some embodiments, the damage management subsystem 3720 may also facilitate determination of the cost of damage (e.g., repair and replacement costs) in terms of real currency based on information about the type, scope, and extent of damages determined as described above. The cost of the damage may be determined in a variety of ways. For example, the damage management subsystem 3720 may provide a GUI, which enables the user 3724 to input repair and replacement costs, or ranges of costs, for each individual content item identified as damaged. In another example, repair and replacements costs may also be obtained from the database 3712, which stores the cost information (e.g., obtained from a number of third-party entities). The database 3712 may contain variations of content items common to indoor environments and variations on building materials commonly used for indoor structures, as well as other pertinent information about contents that are common to indoor environments. The database 3712 may be pre-populated and also be updated with data contributed from users such as user 3724. In another example, the repair and replacements costs may be obtained from computer servers associated with a number of third-party entities, such as merchants, vendors, e-commerce websites, or other entities. The repair and replacement costs may be obtained as values or ranges for each individual item. Further, the costs obtained from the database 3712 or third party-entities may be subsequently adjusted by the user 3724 through a GUI.

The computed costs and the content damage information may be provided to an insurance claim adjustment process, which may determine or update the damage information or costs of damage, and execute a process to approve or decline the claim submitted by the user 3724. In some embodiments, the process may adjust the damage information (e.g., determine a damaged content as not damaged or vice versa, increase or decrease the determined costs) prior to approving the claim. In some embodiments, a human user, such as a reviewer 3726, may review the damage information or the costs in addition to or instead of the insurance claim adjustment process. The reviewer 3726 may also approve or decline the claim with or without adjusting the damage information or the costs.

Further, it should be noted that while the foregoing paragraphs describe some of the operations as being performed by the user 3724, those operations may also be performed by the reviewer 3726. For example, after the user 3724 submits the virtual representation to the computer system 3702, the reviewer 3726 may perform operations such as identifying content in the virtual representation, identifying the waterline, identifying damage contents, or other such operations.

In some embodiments, the subsystems 3705-3720 may be similar to or perform the functions of the systems or modules described with reference to FIGS. A9-A19 in the provisional application to which the current application claims priority.

Figure 43:
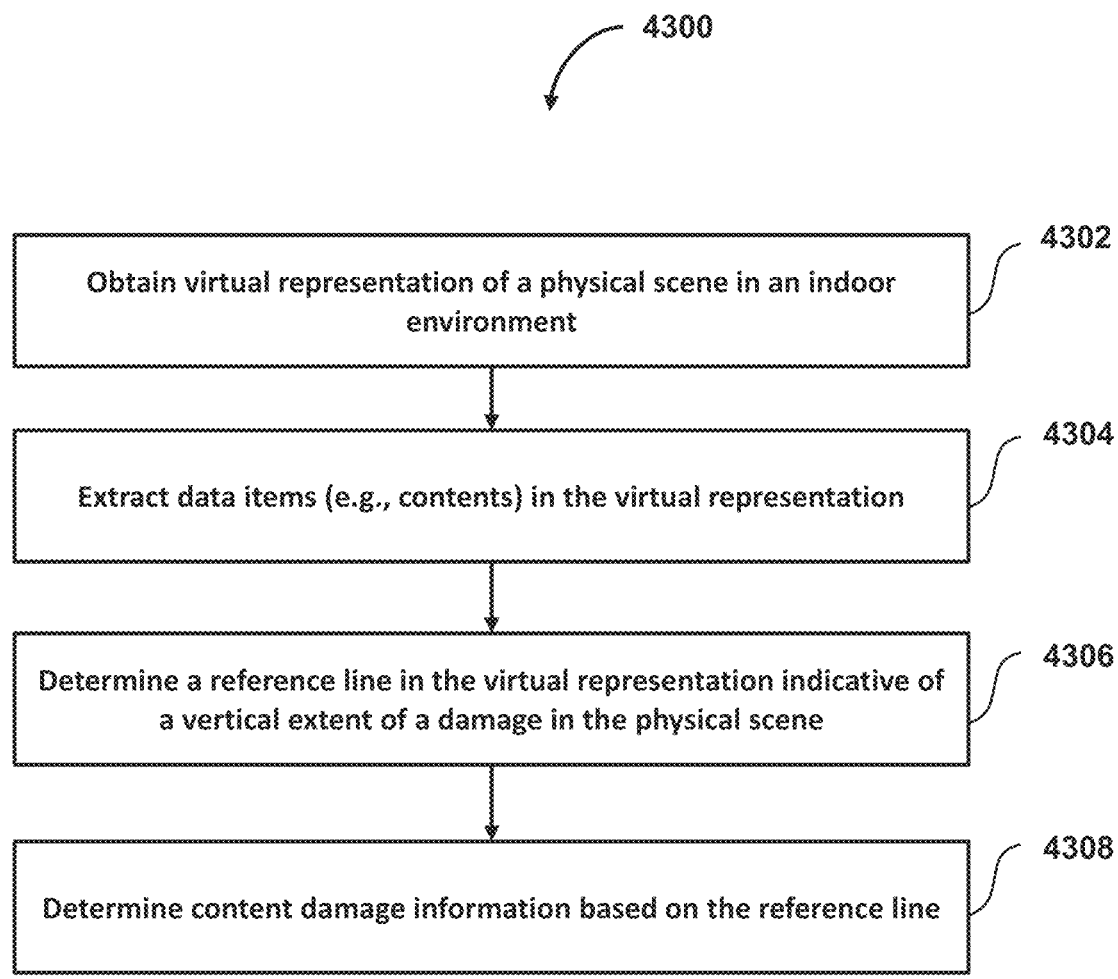
FIG. 43 is a flow diagram of a process for determining damage information of content in a physical scene using a virtual representation of the physical scene, in accordance with one or more embodiments.

FIG. 43 is a flow diagram of a process 4300 for determining damage information of content in a physical scene using a virtual representation of the physical scene, in accordance with one or more embodiments.

In an operation 4302, a virtual representation of a physical scene is obtained. In some embodiments, the physical scene may be an indoor environment that has sustained flood damage. The virtual representation may include images (ordered or unordered), videos, video with depth information, a 3D digital model of the physical scene, or other virtual representation. The virtual representation may be provided by the user 3724 or generated from input provided by the user 3724. For example, the user 3724 may provide images (e.g., 2D representation) or a 3D digital model of the physical scene, or may provide images from which a 3D digital model of the physical scene may be generated.

Operation 4302 may be performed by a component that is the same as or similar to the virtual representation subsystem 3705, in accordance with one or more embodiments. Additional details with respect to obtaining virtual representations are described at least with reference to the virtual representation subsystem 3705 in FIG. 37.

In an operation 4304, data items are extracted from the virtual representation. The data items may include contents in the physical scene (e.g., objects or non-objects). In some embodiments, extracting the data items includes spatially-localizing or identifying the contents. The contents may be identified or spatially localized in a number of ways. For example, machine learning models that are implemented using 2D or 3D image recognition algorithms that facilitate object detection, semantic segmentation, instance segmentation, or panoptic segmentation; tracking algorithms such as single or multi-object tracking, feature-matching methods, optical flow estimation, relative camera pose estimation, multi-view projection, or other such methods. The machine learning model may be trained using a number of virtual representations (e.g., 2D images, 3D models, or other virtual representations) that are annotated with the information of the contents (e.g., names or other descriptions of the content) in the virtual representations. In some embodiments, the contents identified by the machine learning model may be further processed to identify and remove any duplicates. In another example, a GUI may be presented to the user 3724 who may input the content information, or update the content information generated by the machine learning model.

Operation 4304 may be performed by a component that is the same as or similar to the content identification subsystem 3710, in accordance with one or more embodiments. Additional details with respect to identifying the contents of the physical scene in the virtual representation are described at least with reference to the content identification subsystem 3710 in FIG. 37.

In an operation 4306, a reference line that is indicative of a vertical extent of the damage in the physical scene is determined from the virtual representation. For example, if the damage is flood damage, the reference line may be a waterline that indicates a maximum height to which the water level had risen in the physical scene. The reference line may be determined in various ways. For example, a machine learning model or an image processing model may be used to determine the reference line from the virtual representation of the physical scene. In another example, visual artifacts such as lines, contours, and traces left by the waterline in the physical scene, or color changes caused by the flood damage to contents in the physical scene may be identified in the images associated with the virtual representation to determine the reference line. In another example, the reference line may be determined by using any of a number of line fitting algorithms (e.g., Hough transform) where edges are detected and lines are fit to these edges, or template matching with various predesigned image templates that match a typical reference line. In another example, a machine learning model is trained to determine the reference line in the virtual representation. The machine learning model may process the image and produce an output predicting whether each pixel of the input image is part of the reference line or not. The reference line may be estimated based on the pixel information. In another example, a GUI may be presented to the user 3724 who may set the reference line on the virtual representation, or update the reference line generated by the machine learning model.

Operation 4306 may be performed by a component that is the same as or similar to the reference line identification subsystem 3715, in accordance with one or more embodiments. Additional details with respect to determining the reference line in the virtual representation are described at least with reference to the reference line identification subsystem 3715 in FIG. 37.

In an operation 4308, a list of contents likely to be damaged in the physical scene is determined from the virtual representation based on the reference line. In some embodiments, the contents that are likely to be damaged are determined based on the positions of the content in the virtual representation and the reference line. As the reference line indicates the highest level that water has risen in the physical scene, it may be assumed that the contents located at the intersection of, or beneath, the reference line are likely to have been damaged by the water. The plane represented by the reference line (e.g., determined using reference line identification subsystem 3715) is aligned with the virtual representation, and the spatially-localized contents (e.g., identified using content identification subsystem 3710) are checked against the plane to determine the contents that are likely to be damaged. The contents that are located at or below the plane represented by the reference line in the virtual representation may be identified as damaged, and contents located above the plane represented by the reference line may be identified as not damaged.

In some embodiments, a GUI may be presented to the user 3724 who may identify the list of contents that are damaged, or update the damage information generated by the system.

Operation 4308 may be performed by a component that is the same as or similar to the damage management subsystem 3720, in accordance with one or more embodiments. Additional details with respect to determining the contents that are damaged are described at least with reference to the damage management subsystem 3720 in FIG. 37.

In some embodiments, an extent of the damage may also be measured using the system 3700. For example, measurements such as distance, surface area, volume, or other such measurements may be determined based on some user input. For example, a GUI may provide tools to enable the user 3724 to draw curves and polygonal or polyhedral regions on the virtual representation from which the above measurements may be automatically computed. In some embodiments, a cost of the damage (e.g., repair and replacement costs) in terms of real currency may also be determined based on information about the type, scope, and extent of damages determined as described above. Additional details with respect to determining the extent of damage and damage costs are described at least with reference to the damage management subsystem 3720 in FIG. 37.

In some embodiments, the various computers and subsystems illustrated in FIG. 37 may include one or more computing devices that are programmed to perform the functions described herein. The computing devices may include one or more electronic storages (e.g., database(s) 3712, or other electronic storages), one or more physical processors programmed with one or more computer program instructions, or other components. The computing devices may include communication lines or ports to enable the exchange of information within a network (e.g., network 3750) or other computing platforms via wired or wireless techniques (e.g., Ethernet, fiber optics, coaxial cable, Wi-Fi, Bluetooth, near field communication, or other technologies). The computing devices may include a plurality of hardware, software, or firmware components operating together. For example, the computing devices may be implemented by a cloud of computing platforms operating together as the computing devices. Cloud components may include control circuitry configured to perform the various operations needed to implement the disclosed embodiments. Cloud components may include cloud-based storage circuitry configured to electronically store information. Cloud components may also include cloud-based input/output circuitry configured to display information.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; or other mechanisms for configuring processing capabilities on the processors.

It should be appreciated that the description of the functionality provided by the different subsystems 3705-3720 described herein is for illustrative purposes, and is not intended to be limiting, as any of subsystems 3705-3720 may provide more or less functionality than is described. For example, one or more of subsystems 3705-3720 may be eliminated, and some or all of its functionality may be provided by other subsystems 3705-3720. As another example, additional subsystems may be programmed to perform some or all of the functionality attributed herein to one of subsystems 3705-3720.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for identifying damage in an indoor environment by analyzing a virtual model representative of the indoor environment, the method comprising:
    obtaining a virtual representation of a physical scene in an indoor environment, wherein the virtual representation:
        comprises a textured or untextured three-dimensional mesh with vertices connected by edges, defining triangular or quadrilateral planar faces, wherein the vertices and the faces each separately comprise position, color, and surface normal information;
    extracting data items from the virtual representation with a trained first machine learning model, wherein the data items correspond to contents in the physical scene;
    determining a reference line in the virtual representation, the reference line indicative of a vertical extent of the damage in the physical scene, the reference line is determined by:
        line detection or line fitting, where edges are detected in the virtual representation using image processing methods including Canny edge detection, and/or Sobel filtering and lines are fit to the edges using one or more line fitting algorithms,
        template matching with predesigned image templates that match a typical reference line, wherein a detected line is filtered and tracked in continuous frames of multiple images using techniques including Kalman filtering; and
        using a trained second machine learning model to localize and segment the reference line in the virtual representation; and
    determining content damage information based on the reference line, the content damage information indicative of the contents damaged in the physical scene.

2. The method of claim 1, wherein obtaining the virtual representation further includes: obtaining a collection of images of the physical scene.

3. The method of claim 1, wherein obtaining the virtual representation further includes: generating a three-dimensional (3D) digital model of the physical scene.

4. The method of claim 3, wherein generating the 3D digital model includes:
    generating the 3D digital model based on depth data associated with the physical scene.

5. The method of claim 3, wherein generating the 3D digital model includes:
    generating the 3D digital model based on the collection of images or video data of the physical scene.

6. The method of claim 1, wherein extracting the data items includes:
    providing the virtual representation as an input to the first machine learning model to identify the data items, wherein the first machine learning model comprises a convolutional neural network (CNN) and is trained to identify objects and structures in multiple physical scenes as the data items.

7. The method of claim 6, wherein the first machine learning model is trained by:
    obtaining physical scene data associated with a specified physical scene of the indoor environment, wherein the physical scene data includes an image, a video or a 3D digital model associated with the specified physical scene; and
    training the first machine learning model with the physical scene data to predict a specified set of contents in the specified physical scene such that a cost function that is indicative of a difference between a reference set of contents and the specified set of contents is minimized.

8. The method of claim 6, wherein the first machine learning model is configured to predict spatial localization data of the data items, the spatial localization data corresponding to location information of the contents in the physical scene.

9. The method of claim 1, wherein the reference line indicates the vertical extent of flood water in the physical scene.

10. The method of claim 1, wherein the reference line corresponds to a plane in the physical scene that separates a first set of contents damaged from a second set of contents not damaged in the physical scene.

11. The method of claim 1, wherein determining the reference line includes:
providing the virtual representation as an input to the second machine learning model to obtain the reference line, wherein the second machine learning model is trained to identify reference lines in multiple physical scenes.

12. The method of claim 11, wherein the second machine learning model is trained by:
obtaining physical scene data associated with a specified physical scene of a specified indoor environment, wherein the physical scene data includes an image, a video or a 3D digital model associated with the specified physical scene; and
training the second machine learning model with the physical scene data to predict a specified reference line in the specified physical scene such that a cost function that is indicative of a difference between an actual reference line and the predicted specified reference line is minimized.

13. The method of claim 1, wherein determining the content damage information based on the reference line includes:
determining the content damage information based on a height of the reference line in the virtual representation.

14. The method of claim 13, wherein determining the content damage information includes:
identifying a set of contents that is below a plane of the reference line as the contents damaged in the physical scene.

15. The method of claim 14, wherein the set of contents correspond to contents in a volume of the physical scene beneath the reference line in the virtual representation.

16. The method of claim 1 further comprising:
processing the virtual representation based on the content damage information to determine measurement information associated with the damage, the measurement information indicative of an extent of the damage.

17. The method of claim 16 further comprising:
computing a cost associated with the damage based on the measurement information and the content damage information.

18. A non-transitory computer-readable medium comprising instructions that, when executed by one or more processors, cause operations comprising:
obtaining a virtual representation of a physical scene in an indoor environment, wherein the virtual representation:
comprises a textured or untextured three-dimensional mesh with vertices connected by edges, defining triangular or quadrilateral planar faces, wherein the vertices and the faces each separately comprise position, color, and surface normal information;
extracting data items from the virtual representation with a trained first machine learning model, wherein the data items correspond to contents in the physical scene;
determining a reference line in the virtual representation, the reference line indicative of a vertical extent of a damage in the physical scene, the reference line is determined by:
line detection or line fitting, where edges are detected in the virtual representation using image processing methods including Canny edge detection, and/or Sobel filtering and lines are fit to the edges using one or more line fitting algorithms,
template matching with predesigned image templates that match a typical reference line, wherein a detected line is filtered and tracked in continuous frames of multiple images using techniques including Kalman filtering; and
using a trained second machine learning model to localize and segment the reference line in the virtual representation; and
determining content damage information based on the reference line, the content damage information indicative of the contents damaged in the physical scene.

19. The computer-readable medium of claim 18, wherein obtaining the virtual representation further includes:
obtaining a collection of images of the physical scene or generating a three-dimensional (3D) digital model of the physical scene.

20. The computer-readable medium of claim 18, wherein extracting the data items includes:
providing the virtual representation as an input to the first machine learning model to identify the data items, wherein the first machine learning model comprises a convolutional neural network (CNN) and is trained to identify objects and structures in multiple physical scenes as the data items.

21. The computer-readable medium of claim 18, wherein the reference line indicates the vertical extent of flood water in the physical scene.

22. The computer-readable medium of claim 18, wherein determining the reference line includes:
providing the virtual representation as an input to the second machine learning model to obtain the reference line, wherein the second machine learning model is trained to identify reference lines in multiple physical scenes.

23. The computer-readable medium of claim 18, wherein determining the content damage information based on the reference line includes:
determining the content damage information based on a height of the reference line in the virtual representation.

24. A system comprising:
a computer system comprising one or more processors programmed with computer program instructions that, when executed, cause operations comprising:
obtaining a virtual representation of a physical scene in an indoor environment, wherein the virtual representation:
comprises a textured or untextured three-dimensional mesh with vertices connected by edges, defining triangular or quadrilateral planar faces, wherein the vertices and the faces each separately comprise position, color, and surface normal information;
extracting data items from the virtual representation with a trained first machine learning model, wherein the data items correspond to contents in the physical scene;
determining a reference line in the virtual representation, the reference line indicative of a vertical extent of a damage in the physical scene, the reference line is determined by:
line detection or line fitting, where edges are detected in the virtual representation using image processing methods including Canny edge detection, and/or Sobel filtering and lines are fit to the edges using one or more line fitting algorithms,
template matching with predesigned image templates that match a typical reference line, wherein a detected line is filtered and tracked in continuous frames of multiple images using techniques including Kalman filtering; and using a trained second machine learning model to localize and segment the reference line in the virtual representation; and determining content damage information based on the reference line, the content damage information indicative of the contents damaged in the physical scene.

25. The system of claim 24, wherein obtaining the virtual representation further includes:

obtaining a collection of images of the physical scene or generating a three-dimensional (3D) digital model of the physical scene.

26. The system of claim 24, wherein the reference line indicates the vertical extent of flood water in the physical scene.

27. The system of claim 24, wherein determining the content damage information based on the reference line includes:

determining the content damage information based on a height of the reference line in the virtual representation.

28. The system of claim 24, wherein extracting the data items includes providing the virtual representation as an input to the first machine learning model to identify the data items, wherein the first machine learning model comprises a convolutional neural network (CNN) and is trained to identify objects and structures in multiple physical scenes as the data items.

29. The method of claim 1, wherein the virtual representation comprises a three-dimensional digital model generated based on a collection of images or video data of the physical scene, and wherein:

each of the images in the collection of images or the video data comprises a posed RBG-D image, with the collection of images having a form of a collection of depth maps the with the pose information;

RGB-D images include camera intrinsic information comprising an extrinsic matrix or an intrinsic matrix, the extrinsic matrix comprising a representation of a rigid-body transformation between a fixed 3D Cartesian coordinate system defining a space of a virtual world and a 3D Cartesian coordinate system defining that of a real world from a viewpoint of a specific camera, the intrinsic matrix comprising a representation of physical attributes of a real camera comprising focal length, principal point, and skew, the pose information comprising a pose matrix, the pose matrix comprising a representation of a camera's relative or absolute orientation in the virtual world, comprising a 3-degree-of-freedom rotation of the camera and a 3-degree-of-freedom position in the real world.

30. The method of claim 1, wherein extracting the data items from the virtual representation with the trained first machine learning model comprises post-processing output of the first machine learning model to suppress any duplicate recognition of content in the virtual representation by identifying and removing duplicates using one or more of non-maximum suppression, confluence, class-based suppression, heuristic suppression, similarity matching, and object re-identification.

* * * * *